US011691819B2

(12) United States Patent
Norman et al.

(10) Patent No.: US 11,691,819 B2
(45) Date of Patent: Jul. 4, 2023

(54) CONVEYORS

(71) Applicant: Innovative Mining Services (Aust) Pty Ltd, Mt Lawley (AU)

(72) Inventors: Russell Norman, Perth (AU); Darren Waters, Perth (AU)

(73) Assignee: Innovative Mining Services (Aust.) Pty Ltd, Mt Lawley (AU)

( * ) Notice: Subject to any disclaimer, the term of this patent is extended or adjusted under 35 U.S.C. 154(b) by 0 days.

(21) Appl. No.: 17/682,540

(22) Filed: Feb. 28, 2022

(65) Prior Publication Data

US 2022/0185587 A1 Jun. 16, 2022

Related U.S. Application Data

(63) Continuation of application No. PCT/AU2020/050916, filed on Aug. 31, 2020.

(30) Foreign Application Priority Data

Aug. 30, 2019 (AU) ................................ 2019903181
Jun. 30, 2020 (AU) ................................ 2020902216

(51) Int. Cl.
*B65G 15/60* (2006.01)
*B65G 39/16* (2006.01)
(Continued)

(52) U.S. Cl.
CPC ............. *B65G 15/60* (2013.01); *B65G 39/16* (2013.01); *B65G 15/64* (2013.01); *B65G 39/12* (2013.01)

(58) Field of Classification Search
CPC ........ B65G 15/60; B65G 39/16; B65G 39/10; B65G 39/12; B65G 39/125; B65G 39/14
(Continued)

(56) References Cited

U.S. PATENT DOCUMENTS 2,914,957 A 12/1959 Johnson
3,543,597 A 12/1970 De Schamphelaere et al.
(Continued)

FOREIGN PATENT DOCUMENTS

CN 105416995 A 3/2016
CN 205257218 U 5/2016
(Continued)

OTHER PUBLICATIONS

International Search Report and Written Opinion in counterpart International Application No. PCT/AU2020/050916, dated Nov. 2, 2020, 17 pages.

(Continued)

*Primary Examiner* — Mark A Deuble
(74) *Attorney, Agent, or Firm* — Edell, Shapiro & Finnan, LLC

(57) ABSTRACT

An arrangement for use with a conveyor belt assembly is disclosed. In at least one embodiment, the arrangement includes a transmission assembly arranged in operable association with a movable support or tracking frame assembly and configured having respective means for receiving an input force and supplying an output force. The transmission assembly is configured operable for transferring a received input force for supplying an output force for facilitating an adjustment of the position, alignment, or orientation of the support or tracking frame assembly via an actuator interface assembly.

25 Claims, 38 Drawing Sheets

(51) Int. Cl.
*B65G 39/12* (2006.01)
*B65G 15/64* (2006.01)

(58) Field of Classification Search
USPC .......................................... 198/808, 823–830
See application file for complete search history.

(56) References Cited

U.S. PATENT DOCUMENTS

| | | | | |
|---|---|---|---|---|
| 3,545,599 | A | 12/1970 | Smith | |
| 5,215,422 | A * | 6/1993 | Snead | B65G 39/16 414/528 |
| 5,222,594 | A * | 6/1993 | Sumino | B65G 39/16 198/807 |
| 7,967,129 | B2 * | 6/2011 | Swinderman | B65G 39/16 198/825 |
| 7,971,705 | B2 * | 7/2011 | Jabber | B65G 39/12 198/830 |
| 2017/0305680 | A1 | 10/2017 | Mattila | |
| 2022/0063920 | A1 * | 3/2022 | Waters | B65G 21/20 |

FOREIGN PATENT DOCUMENTS

| | | | | |
|---|---|---|---|---|
| CN | 102951404 | B | 6/2016 | |
| CN | 209758347 | U | 12/2019 | |
| DE | 10217236 | A1 * | 11/2003 | B65G 39/125 |
| EP | 0569973 | A1 | 11/1993 | |
| WO | 2020/146925 | A1 | 7/2020 | |

OTHER PUBLICATIONS

International Preliminary Report on Patentability in counterpart International Application No. PCT/AU2020/050916, dated Nov. 26, 2021, 5 pages.

* cited by examiner

CONVEYORS

CROSS REFERENCE TO RELATED APPLICATIONS

This application is a continuation of PCT/AU2020/050916, filed Aug. 31, 2020, which claims priority from AU Patent Application No. 2019903181, filed Aug. 30, 2019, and from AU Patent Application No. 2020902216, filed Jun. 30, 2020, the disclosures of which are incorporated herein by reference in their entireties.

TECHNICAL FIELD

In one aspect, an arrangement for use in maintaining alignment of a moving conveyor belt is disclosed.

BACKGROUND

Conveyor belts used for the mass transfer of product (such as those used in the mining industry for conveying raw minerals) have a common problem in that the belt has the potential to 'track off' out of alignment with the overall conveyor structure.

Existing mechanical solutions for belt tracking include installing 'tracking frames' at specific intervals along the length of a conveyor belt assembly. A tracking frame is a mechanical device/assembly that carries the weight of a portion of the conveyor belt by means of one or more rollers supported or held by way of a 'reaction arm' (which is supported by the tracking frame). Each reaction arm is fitted with small rollers so as to prevent damage to the edge of the conveyor belt as it moves. A tracking frame is often arranged so as to rotate or pivot at a point that is substantially central of a properly aligned conveyor belt. In use, a tracking frame functions by way of a misaligned (or mis-tracked) belt pushing against/on a roller of a reaction arm.

Conveyor belt tracking is an issue to any business that uses conveyor belt systems for the movement of material. If such issues are left unresolved, material can spill from the conveyor belt making the area dangerous and potentially causing significant damage to the conveyor belt itself (for example, additional wear) and/or surrounding structure.

There are many reasons why conveyor belts 'track off', including (non-exhaustively) the following:

- conveyed product is not being fed onto the conveyor centrally;
- worn pulleys/rollers;
- spillage/carry back/build up;
- conveyor structure/pulleys not being square;
- belt splice(s) not properly straight/aligned;
- severe weather conditions, such as for example, rain and wind.

Most of these problems cannot be fixed (safely) during operation (or when the conveyor assembly/system is 'online'), and therefore requires the conveying system/machinery to be shut down in order to be rectified.

Most conveyor belt systems have multiple tracking frames on the 'carry' and 'return' sides of the conveyor belt to help address conveyor belt tracking issues. Tracking frames work well to realign the conveyor belt but they are not without their own issues. Tracking frames can become built up with product/spillage, causing them to seize and, consequentially, compromise their effectiveness at tracking the conveyor belt. The small rollers on the reaction arms can become damaged or snap off, and allow the belt to continue to track misaligned. A tracking frame will be activated by the conveyor belt but will change the position of the conveyor upstream of its position and have very little effect on the belt at the position of the frame.

Loading zones and mis-fed product (ie. product being fed onto the conveyor belt) are generally the biggest causes of conveyor belt tracking issues. Most conveyor belt transfer chutes contain training plates that can be moved to change the presentation of product onto the conveyor belt, helping the conveyor belt to run true. These transfer chutes are not always accessible when the conveyor assembly is operational and can require the system to be shut down in order to be adjusted. Conveyor belt transfer chutes also wear thereby changing the trajectory of the product as the wearing progresses. These are normally fixed during a scheduled maintenance shutdown. Transfer chutes also build up with product causing the trajectory of the product to change, thereby causing the conveyor belt below the chute to track off.

A common practice involves tying a length of rope onto a tracking frame and fixing it off to adjacent support structure to force the conveyor belt toward a corrective direction. This is done while an operator investigates the reason(s) causing the conveyor belt to track off. If the problem is not readily fixable, the rope is left on until the next scheduled maintenance shut down. To be safe, corrective intervention has to be undertaken/completed 'off-line' as the operator fitting the rope is in close proximity to rotating equipment. Attempts to take such steps while the system is online exposes the operator to significant hazards.

Another common practice for tracking frames subject to build up of product is to manually force/handle the frame to free them up. This should also be attempted off-line to avoid prospective safety hazards.

It is against this background that the embodiments described herein have been developed.

It is to be understood that each document, reference, patent application or patent cited in this text is expressly incorporated herein in their entirety by reference, which means that it should be read and considered by the reader as part of this text. That the document, reference, patent application, or patent cited in this text is not repeated herein is merely for reasons of conciseness.

Furthermore, in this specification, where a literary work, act or item of knowledge (or combinations thereof), is discussed, such reference is not an acknowledgment or admission that any of the information referred to formed part of the common general knowledge as at the priority date of the application. Such information is included only for the purposes of providing context for facilitating an understanding of the inventive concept/principles and the various forms or embodiments in which those inventive concepts/principles may be exemplified.

SUMMARY OF THE INVENTION

According to a first principal aspect, there is provided an arrangement for use with a conveyor belt assembly having one or more movable support or tracking frame assemblies operable for providing rolling support to a conveyor belt, the arrangement comprising:

- a transmission assembly arranged in operable association with a movable support or tracking frame assembly, and configured having respective means or arrangement to receive an input force and to supply an output force,
- the transmission assembly configured operable for transferring a received input force for supplying (modified or otherwise) an output force for facilitating an adjustment of the position, alignment, or orientation of a portion or region of the support or tracking frame assembly.

According to a second principal aspect, there is provided an arrangement for use with a conveyor belt assembly having one or more movable support or tracking frame assemblies operable for providing rolling support to a conveyor belt, the arrangement comprising:

a transmission assembly arranged in operable association with a movable support or tracking frame assembly, and configured having respective means or arrangement to receive an input force and to supply an output force, the transmission assembly configured operable for transferring a modified form of a received input force for supplying an output force for facilitating an adjustment of the position, alignment, or orientation of the support or tracking frame assembly.

According to a third principal aspect, there is provided an arrangement for use with a conveyor belt assembly having one or more movable support or tracking frame assemblies operable for providing rolling support to a conveyor belt, the arrangement comprising:

a transmission assembly arranged in operable association with a movable support or tracking frame assembly, and configured having respective means or arrangement to receive an input force and to supply an output force, the transmission assembly configured operable for transferring, in a uni-directional manner, a received input force for supplying (modified or otherwise) an output force for facilitating an adjustment of the position, alignment, or orientation of the support or tracking frame assembly.

According to a fourth principal aspect, there is provided an arrangement for use with a conveyor belt assembly having one or more movable support or tracking frame assemblies operable for providing rolling support to a conveyor belt, the arrangement comprising:

a transmission assembly arranged in operable association with a movable support or tracking frame assembly, and configured having respective means or arrangement to receive an input force and to supply an output force, the transmission assembly configured operable for transferring, in a uni-directional manner, a modified form of a received input force for supplying an output force for facilitating an adjustment of the position, alignment, or orientation of the support or tracking frame assembly.

The above described principal aspects, and those described below, may comprise any of the following features either individually or in combination.

Embodiments of the principles described herein may serve to provide arrangements for operable use with a conveyor belt assembly or system for use in adjusting the position, alignment, or orientation of a portion or region of a moveable support or tracking frame assembly for assisting in realignment of the conveyor belt in the event the belt becomes misaligned due to, for example, worn pulleys/rollers (or any of the issues noted above). Use of embodiments drawing from the principles described herein can be useful in operating and or retaining the moveable support or tracking frame assembly to an appropriate position, alignment, or orientation to allow the relevant conveyor belt assembly/system to operate/perform correctly until the cause of the misalignment can be resolved at the next scheduled maintenance shutdown.

The movable support or tracking frame assemblies are engineered or configured structures having the function of providing rolling support by way of one or more rollers generally in contact with the relevant conveyor belt as it moves (by way of motors assemblies). As the skilled reader will be aware, tracking frame assemblies (and like support assemblies) are generally configured so as to be movable relative to the conveyor belt. Movement of such a tracking frame assembly is generally by way of the tracking frame assembly being configured so as to be capable of rotation/pivoting in generally the horizontal plan about a vertical axis, so as to allow the tracking frame assembly to pivot thereabout in either the clockwise or counterclockwise direction. In this manner, the positional, alignment, or orientation of the tracking frame assembly (and the rollers carried thereby) can be adjusted relative to the conveyor belt. In this manner, the rolling contact pressure applied to the conveyor belt during operation can be adjusted and used to encourage lateral movement of the belt when needed. In order to ensure such adjustments are carried out safely, operation of the conveyor belt is ceased, which can incur a significant cost in terms of (delay) time and revenue. Thus, solutions which allow safe corrective action to occur during operation have benefit as a 'stop-gap' measure.

In one embodiment, operation for the arrangement for facilitating an adjustment of the position, alignment, or orientation of the support or tracking frame assembly occurs while the conveyor belt assembly is operating, ie. while the conveyor belt is moving. In this manner, adjustment of the support or tracking frame assembly, for the purpose of seeking to correct the alignment of the conveyor belt can be made without the need to cease operation of the conveyor belt assembly (which can have the effect of realizing a significant saving in terms of cost and time). Further purposes of operation of the arrangement may include testing the functionality of the support or tracking frame assembly, and moving/pivoting/rotating the support or tracking frame assembly to help free it up from debris and/or spilt product.

In one embodiment, the configuration of the transmission assembly is mechanical in nature.

In one embodiment, various embodiments of the arrangement of the principal aspects described herein (and those described below) are configured so as to be operated manually by a human user/operator. Such operation is generally on a selective basis as required. However, other embodiments may be realized where operation could be actioned remotely by way of an overarching control system or network (eg. allowing for networked control) configured so that such remote operation could be facilitated. In such embodiments, actuation of the arrangement could be enabled by way of electric motors, stepper motors, or servo motors (as mere non-exhaustive examples).

In one embodiment, the transmission assembly is configured operable so as to transfer an input force, achieved by way of for example, a movement, load, force, or torque received by way of the input receiving means or arrangement (such as for example, one involving a handle portion of a handle arrangement/assembly, eg. a rotatable handwheel of a handwheel assembly), for output from the transmission assembly.

In one embodiment, the transmission assembly is configured having respective means or arrangement to receive a manually provided input force and to supply an output force, and configured operable for transferring the received input force for supplying an output force for facilitating an adjustment of the position, alignment, or orientation of the support or tracking frame assembly by way of selective interaction, engagement, or urging against one or more portions of, or provided with, the support/tracking frame assembly.

In one embodiment, the arrangement is mounted (in a retrofitted-like manner or otherwise) relative to the conveyor belt assembly so as to be operable at, near, or adjacent an end of the relevant support or tracking frame assembly with which the said arrangement is to be operable.

In one embodiment, the input receiving means or arrangement and or the output supply means or arrangement is/are retrofitted or mounted (in a permanent or temporary manner) to/with support structure of the conveyor belt assembly so as to be positioned proximal or adjacent an end of the moveable support or tracking frame assembly with which the arrangement is to be operable.

In one embodiment, the transmission assembly is configured operable so that a movement, load, force, or torque received by way of the output supply means or arrangement is substantially prevented from being transferred to the input receiving means or arrangement. In this manner, the direction of transfer of any movement, load, force, or torque is from the input receiving means or arrangement to the output supply means or arrangement of the transmission assembly. Thus, in one respect, the transmission assembly is configured operable so as to isolate the input receiving means or arrangement from the effects (adverse or otherwise) of any input force (by way of, for example, movement, load, force, or torque) received at the output supply means or arrangement. Advantages of such an arrangement may be realised in situations where a safety concern exists during manual operation of the handle portion (eg. the arrangement seeking to minimise the risk of load received by the support or tracking frame assembly being transferred to the input receiving means or arrangement and causing injury to the human operator), and or protects the arrangement during its maintaining/sustaining of an adjusted position of the moveable support or tracking frame assembly in the event the moveable support or tracking frame assembly becomes subject to a significant loading event.

In one embodiment, the uni-directional nature of said transfer and or said modification is by way of the input, output means or arrangement being arranged or configured in an appropriate operable engagement with one another.

In one embodiment, the movement, load, force, or torque received by way of the input receiving means or arrangement is modified during transfer by way of the transmission assembly.

In one embodiment, the movement, load, force, or torque received by way of the input receiving means or arrangement of the transmission assembly is modified in a manner which increases a magnitude of the movement, load, force, or torque for output from the transmission assembly.

In one embodiment, the means or arrangement for receiving an input force comprises a first shaft (hereinafter, input shaft). In one form, the input shaft comprises an axis of rotation about which the input shaft may rotate. Rotation of the input shaft about its axis of rotation may be clockwise or counterclockwise. In one form, the input shaft rotates about a substantially horizontally aligned axis.

In one embodiment, the input shaft is connected to a handle portion such that movement or actuation of the handle portion causes the input shaft to move or rotate. In one form, the handle portion is splined or keyed with/to the input shaft. In one form, the handle portion is provided in the form of, or as part of, a handwheel arrangement/assembly.

In one embodiment, the handle portion is configured so as to be actuable by a human user/operator. However, the handle portion (and indeed the input shaft) could be arranged and or configured so as to be actuated by way of a further mechanical or automated means or device/mechanism, by way of, for example, electric (or otherwise) motors, stepper motors, servos and the like. As noted above, embodiments involving electric motors, stepper motors, servos and the like may be configured so as to allow for remote actuation by a user/operator when at a location remote from the relevant conveyor belt assembly. In this regard, such electric motors, stepper motors, servos and the like may be configured so as to be controlled by way of a suitable overarching control system or network allowing for the appropriate communications for facilitating remote control of the electric motors, stepper motors, servos and the like.

In one embodiment, the means or arrangement for supplying an output force is provided in the form of a second shaft (hereinafter, output shaft). In one form, the output shaft comprises an axis of rotation about which the output shaft may rotate. Rotation of the output shaft about its axis of rotation may be clockwise or counterclockwise. In one form, the output shaft rotates about a substantially vertically aligned axis.

In one embodiment, the input and output shafts are operably associated with each other by way of, and thereby providing, the transmission assembly. In this manner, the configuration of the input and output shafts and their interaction with one another forms the transmission assembly.

In one embodiment, the output shaft is configured operable, at least by way of the configuration of the transmission assembly, to be responsive to the input shaft.

In one embodiment, the input and output shafts are arranged in orthogonal relation to one another. As such, the respective axes of the input, output shaft are arranged in orthogonal relation to one another.

In one embodiment, respective portions of the input and output shafts are arranged so as to engage one another such that the output shaft is responsive to the input shaft so that movement of the input shaft facilitates movement of the output shaft. In this manner, movement of the input shaft is transferred to the output shaft.

In one embodiment, the respective portions of the input and output shafts are arranged in a meshed engagement with one another.

In one embodiment, a portion of the input shaft is provided with a first shaped feature, and a portion of the output shaft is provided with a second shaped feature.

In one embodiment, the first and second shaped features are configured so as to engage or mesh with each other in an operable manner that permits the output shaft to be responsive to the input shaft. In one form, the output shaft moves or rotates about its axis of rotation in response to movement of the input shaft. Movement of the input shaft may be in the form of rotation about its axis of rotation (either clockwise or counterclockwise).

In one embodiment, the first and second shaped features are configured so as to engage or mesh with each other in an operable manner that permits the output shaft to be responsive to the input shaft, and the input shaft to be substantially unresponsive to the output shaft. In this manner, the transfer of any movement, load, force, or torque by way of the transmission assembly is uni-directional in nature. In this manner, the transmission assembly is configured so as to substantially prevent any movement, load, force, or torque that might be experienced by the output shaft being communicated through to the input shaft (and potentially the user of the arrangement).

In one embodiment, the input shaft may be subject to a load, force, or torque which, by way of the engagement or meshing of the first, second shaped features, permits transfer of the load, force, or torque to the output shaft.

In one embodiment, the first and second shaped features are configured so as to engage or mesh with each other in an operable manner that operates to modify a movement, load, force, or torque received by or at the input shaft, for supply to the output shaft. In this manner, the first and second shaped features can be configured so as to, when engaged or meshed with each other, operate to supply to the output shaft a resulting movement, load, force, or torque that varies or is different from that received by or at the input shaft.

In one embodiment, the resulting movement, load, force, or torque supplied to the output shaft is larger than the movement, load, force, or torque received by or at the input shaft. In alternate forms, the resulting movement, load, force, or torque supplied to the output shaft may be smaller.

In one embodiment, the first shaped feature of the input shaft is substantially that of a worm drive. In one embodiment, the second shaped feature of the output shaft is substantially that of a worm gear or wheel. The sizing or dimensioning of the worm gear/wheel and the worm drive influences the nature of the response of the output shaft to the input shaft.

In one embodiment, the uni-directional nature of the transmission of the input for supply to the output is by way of the meshed engagement between the worm gear and worm drive portions. As the skilled reader will appreciate, provided that the coefficient of friction between the worm gear and the worm drive is larger than a tangent of the worm drive's lead angle, the worm gear will operate to substantially self-lock thereby operating to prevent, or seek to prevent, transmission of movement, load, force, or torque from the output shaft to the input shaft.

In one embodiment, the transmission assembly is provided in the form of a gearbox or worm gearbox. In one embodiment, the gearbox or worm gearbox is configured so as to provide a reduction gearbox.

In one embodiment, the gearbox is provided in the form of a reduction gearbox. In one embodiment, the reduction gearbox is configured so as to provide a gear ratio of substantially about 40:1 (although other ratios would be possible). For example, for this gearing ratio, an input provided to the input shaft is amplified, by way of the configuration of the means or arrangement for receiving and input for supplying an output, so as to provide substantially about a 40 fold increase in that input at the output shaft. In this manner, a human user can overcome what could be significant resistance when using the arrangement to facilitate or cause an adjustment of the position, alignment, or orientation of a relevant support or tracking frame assembly.

In other forms, the reduction gearbox may be configured so as to provide other gear ratios as may be required (for circumstances at hand).

In one embodiment, the arrangement comprises an actuator interface assembly that is arranged in operable association with the output supply means or arrangement of the transmission assembly.

In one embodiment, the actuator interface assembly is in operable association with the output shaft so as to be responsive thereto. In one form, movement, load, force, or torque experienced by the output shaft (by way of the transmission assembly) is transferred, in substance, to the actuator interface assembly.

In one embodiment, the actuator interface assembly is configured so as to interact or engage with a portion or region of, or provided with (eg. one or both of the upstream/downstream sides of the support/tracking frame assembly relative to the running direction of the conveyor belt), the moveable support or tracking frame assembly for bringing about an adjustment of the position, alignment, or orientation of same.

In one embodiment, the arrangement comprises a reaction assembly for provision with a portion or region of the moveable support or tracking frame assembly. In one form, the reaction assembly is provided at, near, or adjacent an end of the relevant moveable support or tracking frame assembly so as to be interacted with or engaged by the actuator interface assembly so as to bring about an adjustment of the position, alignment, or orientation of a portion or region of the moveable support or tracking frame assembly.

In one embodiment, the reaction assembly may be integral with, or already part of, the relevant support or tracking frame assembly.

In one embodiment, the actuator interface assembly is rotatable about an axis about which the output shaft rotates, or is substantially aligned with such an axis.

In one embodiment, the actuator interface assembly configured having at least two spaced apart (or first, second) projecting portions extending therefrom so as to be operable in respect of the moveable support or tracking frame assembly. In one form, the at least two projecting portions extend substantially parallel with each other.

In one embodiment, said at least two projecting portions are arranged so as to be operable for interacting or engaging with respective portions of, or provided with, opposite sides of the moveable support or tracking frame assembly (for example, upstream/downstream sides of the support/tracking frame assembly relative to a direction of movement of the conveyor belt).

In one embodiment, the spacing of the at least two projecting portions is configured so as to allow the moveable support or tracking frame assembly (or portion(s)/region(s) thereof) sufficient freedom to move within a spatial region defined, at least in part, by said at least two (or first, second) projecting portions as required for its normal operation/movement (for example, to perform its usual task of realignment of the conveyor belt, to the extent possible under usual operating conditions) without interference from either of the projecting portions or the actuating interface assembly when the actuator interface assembly is positioned in a 'neutral' position/condition or state in which no adjustment of the moveable support or tracking frame is undertaken by the arrangement or required. Many existing tracking frame adjustment mechanisms (manually operable or otherwise) cannot disengage physically from the tracking frame without affirmative action being taken to operate the connecting mechanism, for example, undertaking the removal of a pin or similar used in such a connection mechanism. Accordingly, an advantage of embodiments of the arrangement described herein is the ability of the arrangement to be used in undertaking an adjustment operation of a support/tracking frame assembly (for example, to help correct a conveyor belt misalignment due to a worn pulley or roller component) when needed, and, when the arrangement is not required for adjustment purposes, sit idle in its 'neutral' position/condition without offering any interference (for example, by way of the actuator interface assembly) with the usual operation of the support/tracking frame assembly (ie. providing sufficient freedom for it to operate in its usual manner).

In one embodiment, the actuator interface assembly comprises first and second arm portions extending therefrom and arranged in spaced relation with respect to each other.

In one form, said at least two projecting portions are exemplified by the first and second arm portions.

In one embodiment, the actuator interface assembly comprises a body capable of rotation about the axis about which the output shaft rotates. In one embodiment, the body of the actuator interface assembly comprises the first and second arm portions arranged in a spaced relation.

In one embodiment, the first, second arm portions of the actuator interface assembly are spaced about or relative to the axis about which the body rotates. In one form, the first, second arm portions are spaced from the axis about which the body rotates in a substantially symmetrical manner.

In one embodiment, each of the at least two projecting portions (or, for example, the first, second arm portions) of the actuator interface assembly extend toward a respective corresponding portion or region of the moveable support or tracking frame assembly or the reaction assembly. In one form, the actuator interface assembly is configured so that each of the first, second arm portions can operate to interact or engage with the reaction assembly for facilitating or causing an adjustment to be made to the position, alignment, or orientation of the support or tracking frame assembly as required.

In one embodiment, each of the first, second arm portions of the actuator interface assembly extend respective lengths outward of the body, and or toward a respective corresponding portion or region of the support or tracking frame assembly.

In one embodiment, the actuator interface assembly is configured so that each of the first, second arm portions can operate to interact (for example, make direct or indirect contact with) or engage with a corresponding portion or region of the support or tracking frame assembly for facilitating or causing an adjustment to be made to the position, alignment, or orientation of the support or tracking frame assembly as required.

In one embodiment, each of the at least two projecting portions (or, for example, the first, second arm portions) of the actuator interface assembly comprise a respective contact portion that interacts or engages with a respective corresponding portion of the reaction assembly for the making of an adjustment of a portion or region of the moveable support or tracking frame assembly, each contact portion configured operable with its respective projecting/arm portion so that when being caused to interact or engage with its respective corresponding portion of the reaction assembly, contact therebetween comprises or involves rolling contact.

In one embodiment, the first arm portion comprises a first contact portion and the second arm portion comprises a second contact portion, the first, second contact portions each being configured so as to interact or engage with or contact respective corresponding portions of the support or tracking frame assembly or reaction assembly during the making of an adjustment thereof.

In one embodiment, the first, second contact portions of the first, second arm portions respectively are provided distal of the body of the actuator interface assembly.

In one embodiment, the arrangement may comprise a locking means or device configured operable with the actuator interface assembly or the support or tracking frame assembly so as to restrain either or both in a desired or target position, alignment, or orientation. In one form, the locking means or device is operable so as to restrain the support or tracking frame assembly in a current or post adjustment position, alignment, or orientation so as to maintain such position, alignment, or orientation until a further or subsequent adjustment is needed/required.

In one embodiment, said locking means or device may be configured so as to be operated remotely. Such configurations could include appropriate control/communication arrangements allowing the locking means or device to be operable as required by way of an overarching control/network or like system.

In one embodiment, the first, second contact portions of the first, second arm portions are configured so as to be capable of rotating about respective axes of rotation.

In one embodiment, when being caused to interact with respective corresponding portions of the support or tracking frame assembly (or the reaction assembly) during a positional adjustment thereof, contact between the first, second contact portions and respective corresponding portions of the support or tracking frame assembly is rolling contact.

In one embodiment, the relevant support or tracking frame assembly may be provided with one or more elements configured so as to be interacted with (for example contacted by) or engaged by one or more portions of one, both, or respective first, second arm portions or the first, second contact portions, for the purposes of facilitating or causing an adjustment to be made to the position, alignment, or orientation of the support or tracking frame assembly.

In one embodiment, the relevant support or tracking frame assembly may be provided with first, second contact portions/elements or regions (which could be provided in the form of respective elements or the like) positioned so as to be registrable with, and responsive to, one or more portions of respective first, second arm portions (or portions thereof, such as for example, the first, second contact portions), as required, for the purposes of facilitating or causing an adjustment to be made to the position, alignment, or orientation of the support or tracking frame assembly.

In one embodiment, the first, second contact portions/elements provided to the support or tracking frame assembly could be provided as separate components/elements that are assembled to or against a portion or region of the support or tracking frame assembly, or could be formed so as to be integral with structure defining the support or tracking frame assembly.

In one embodiment, the reaction assembly comprises the first, second contact portions/elements which are assembled with or against a portion or region of the support or tracking frame assembly.

In one embodiment, the first, second contact portions/elements are assembled so as to be provided in angled relation with one another. In one form, such angled configuration provides an apex aligned substantially with the axis about which the actuator interface assembly rotates when operating to bring about a positional adjustment.

In one embodiment, the first, second contact portions/elements are assembled about a portion or region of the support or tracking frame assembly so as to be in spaced relation relative each other, and or each aligned so as to be substantially parallel with the support tracking frame and or each other.

In one embodiment, the arrangement comprises a means or device for modifying, conditioning, limiting, or adjusting movement, load, force, or torque transferred to the output shaft by way of the actuator interface assembly. In this manner, any movement, load, force, or torque imparted by the support or tracking frame assembly to the actuator interface assembly (for example, while the actuator interface assembly is interacting/engaging with the support or tracking frame assembly) that are of a magnitude that could cause damage to componentry of the arrangement (such as for example, the transmission assembly and related componentry) can be mitigated against.

In one embodiment, the means or device for modifying, conditioning, limiting or adjusting the movement, load, force, or torque transferred to the output shaft is provided so as to be operable between or intermediate the actuator interface assembly and the output shaft. In one form, said means or device is provided in the form of a clutch module configured so that movement, load, force, or torque transferred to the output shaft by way of the actuator interface assembly can be varied, adjusted, or limited as may be required so as to protect against adverse loads, forces, torques being transferred to the output shaft.

In one embodiment, the clutch module and the actuator interface assembly are provided at or near an end of the output shaft.

Furthermore, the clutch module is also configured so as to avoid adjustment (generally, for example, by way of manipulation by a user/operator (manual or otherwise)) so as to be placed into an overtightened state. In this manner, such limit in adjustability serves to assist in preventing the arrangement being placed in a state or condition that could result in damage to any of the components of the arrangement.

In one embodiment, the clutch module is provided in the form of a torque limiter unit manufactured by CominTec. In one embodiment, the torque limiter unit is a Comintec 1.70 DF T3.

The skilled reader will appreciate the various types of clutching arrangements and torque limiting devices/modules/mechanisms that could be used to protect the output shaft from high loads/forces/torque experienced by the actuator interface assembly.

In one embodiment, the arrangement comprises a means or device for sensing directly or indirectly a movement or adjustment event of the actuator interface assembly. In one embodiment, the means or device for sensing a movement of the actuator interface assembly includes sensing for the purposes of determining a state or condition of the arrangement. Such sensing means or device can be configured for determining a state or condition the actuator interface assembly is (currently) in, a state or condition the actuator interface assembly moves away from or out of, a state or condition the actuator interface assembly moves toward.

In one embodiment, said means or device is configured to sense whether an adjustment to the support or tracking frame assembly has been made is about to be made.

In one embodiment, said means or device for sensing a positional adjustment comprises a sensor module configured so as to sense the proximity of a body, either directly or indirectly.

In one form, the sensor module is a proximity switch configured to register an interaction with a body or portion thereof.

In one embodiment, the proximity switch is positioned so as to register an interaction with a portion of the actuator interface assembly. In one embodiment, said portion of the actuator interface assembly is a portion which protrudes or extends (hereinafter, extended portion) from the body of the actuator interface assembly.

In one embodiment, the proximity switch is provided stationery relative to the extended portion of the actuator interface assembly.

In one embodiment, the proximity switch and the actuator interface assembly are configured relative each other so that the proximity switch registers with the extended portion when the arrangement is in a first state or condition. In one embodiment, the first state or condition of the arrangement corresponds to a 'neutral' state or condition in which the actuator interface assembly is not interacting with the support or tracking frame assembly (ie. no interaction occurring for the purpose of facilitating or causing an adjustment to its position, orientation, or alignment).

In one embodiment, the proximity switch and the actuator interface assembly are configured relative each other so that non-registration of the proximity switch with the extended portion represents the arrangement being in a second state or condition, or not the first state or condition. In one embodiment, the second state or condition is substantially presentative of the actuator interface assembly not being in its neutral position/condition or first state and:

(i) operating so as to cause the actuator interface assembly to operate so as to interact or engage with the support or tracking frame assembly for the purpose of facilitating or causing an adjustment to its position, orientation, or alignment;

(ii) operating toward the first state or condition;

As the skilled reader would appreciate, various means or devices for sensing the operative state or condition of the actuating assembly (and the arrangement) are possible.

In one embodiment, the means or device for sensing (such as for example, a sensing module) a movement, adjustment event, or state/condition of the actuator interface assembly can be provided or configured in operable association with an overarching control system (for example, the Citect mine control system). In this manner, for example, using the Citect mine control system, it is possible to configure/use the means or device for sensing a movement, adjustment event, or state/condition of the actuator interface assembly to undertake a number of activities which may include (non-exhaustively), for example, logging of a date/time, create a warning, start a timer, send an email, or undertake any form of logging (or monitoring/notification setting) that can serve as a reminder so as to reduce or avoid a risk that any adjustment made to the relevant support or tracking frame assembly is not (inadvertently) forgotten.

In one embodiment, any sensing means or device (proximity or otherwise) employed with any embodiment of the arrangement described herein can be configured so as to be in communication (hardwired or wireless) with one or more control systems (such as for example, the Citect mine control system, or systems having/offering functionality similar thereto) operable with the conveyor belt assembly for monitoring purposes (and indeed, remote control purposes) for event logging and the like.

In one embodiment, the arrangement comprises or is configured so as to be operable with various support or mounting structure that serves to support various of the componentry of the arrangement relative the relevant support or tracking frame assembly.

Embodiments of arrangements configured in accordance with the principles described herein may find significant advantage in being retrofittable with any structure (operating in a supportive capacity or otherwise) associated with a conveyor belt assembly/system so that such embodiments are operable with any existing support or tracking frame assembly. Such retrofittability has significant advantage in, for example, the mining industry, in seeking to reduce capital costs of the equipment (as compared costly existing systems that are focused on providing automated solutions) and on-going operational costs (such costly existing systems tend to be highly reliant on significant power resources in order to function). Such automated systems can be time consuming to install/maintain/repair and therefore require the conveyor belt systems to be off-line for what can be considerable time. Installation/maintenance/repair of such systems can also require specialist personnel to be deployed (for example, undertaking activities, which can incur significant amounts of time, such as planning, electrical and mechanical approval processes involving multiple trade disciplines and labour intensive hours to implement, costing the operator significantly. Accordingly, embodiments of the principles outlined herein serve to provide an effective, reliably performing solution(s)/arrangement(s) which can be readily deployed/retrofitted for use with existing conveyor belt assemblies/systems, and that are largely free from one or more of the deficiencies (eg. time/cost) of existing systems.

In one embodiment, the transmission assembly is mounted to a portion or region of structure supporting the relevant support or tracking frame assembly. Such mounting can be by way of a bracket assembly fastened or made secure against said structure (or the support or tracking frame assembly) using a suitable fastening assembly (for example, a nut-bolt fastening assembly). In one form, the transmission assembly is connected or mounted (in a permanent or temporary manner) to structure of the conveyor belt assembly that is adjacent or proximal an end of the moveable support or tracking frame assembly with which the arrangement is to be operable.

Similarly, in order to provide a safe distance between the support or tracking frame assembly and the user of the arrangement, the input shaft may be of a length requiring a portion thereof to be appropriately supported (for example, in a cantilever like manner) using one or more bearing assemblies, each being supported as required. In one form, a distal end of the input shaft carries an actuable portion (such as for example, a handwheel type actuator or assembly), the distal end extending away from the transmission assembly in a cantilevered like manner. Thus, depending on the degree of cantilever and the weight carried at the distal end of the input shaft, appropriate supporting structure may be required.

In one embodiment, the transmission assembly comprises a hydraulic actuation assembly comprising one or more fluid circuits each arranged operable for enabling supply of a respective output force.

In one embodiment, the hydraulic actuation assembly comprises a hydraulic cylinder assembly comprising a hydraulic cylinder ram and piston arrangement operable as part of a hydraulic cylinder unit. In one form, the piston is operably connected with the hydraulic cylinder ram.

In one embodiment, the means or arrangement for receiving the input force is provided in the form of a hydraulic axial piston pump unit configured in operable association with a handle portion (of, for example, a manually operable handwheel arrangement or assembly) such that the hydraulic axial piston pump unit is responsive to an input force received by way of the handle portion.

In one embodiment, the hydraulic axial piston pump unit is configured in operable association with the hydraulic cylinder assembly by way of first and second fluid circuits, operation of the first fluid circuit configured operable for enabling supply of a first output force, and operation of the second fluid circuit configured operable for enabling supply of a second output force.

In one embodiment, the hydraulic axial piston pump unit is configured so as to receive an input force from the handle portion (on operation, for example, a human operator/user) for enabling operation of the hydraulic cylinder assembly in the supply of an output force by way of causing a quantity of hydraulic fluid to pass through, under pressure, one of the first, second fluid circuits into a chamber internal of the hydraulic cylinder unit so as to act upon a piston operable within the chamber for enabling movement of the hydraulic cylinder ram. In one form, the piston serves to, in part, assist in defining the chamber. In this manner, hydraulic pressure applied to the piston by the hydraulic fluid causes movement of the piston which, in turn, causes movement of the hydraulic cylinder ram.

In one embodiment, movement of the hydraulic cylinder ram is along an axis of movement that is substantially parallel with but spaced from a central axis of the conveyor belt.

In one embodiment, movement of the hydraulic cylinder ram is along an axis of the hydraulic cylinder unit.

In one embodiment, the central axis of the conveyor belt is aligned substantially with an axis along which the conveyor belt runs.

In one embodiment, the axis of movement is substantially between the central axis of the conveyor belt and an end of the moveable support or tracking frame assembly to which the arrangement is operably associated with.

In one embodiment, the flow of hydraulic fluid through one of the first, second fluid circuits facilitates movement of the hydraulic cylinder ram in a first direction, and the flow of hydraulic fluid through the other of the first, second fluid circuits facilitates movement of the hydraulic cylinder ram in a second direction.

In one embodiment, the flow of hydraulic fluid through the first fluid circuit facilitates movement of the hydraulic cylinder ram in the first direction due to supply of the first output force, and the flow of hydraulic fluid through the second fluid circuit facilitates movement of the hydraulic cylinder ram in the second direction due to supply of the second output force.

In one embodiment, the first and second directions of movement are opposing directions of movement substantially along said axis of movement.

In one embodiment, supply of an output force for facilitating or causing an adjustment of the position, alignment, or orientation of a portion or region of the moveable support or tracking frame assembly is by way of the actuator interface assembly arranged operable with the hydraulic cylinder assembly so that movement of the hydraulic cylinder ram causes or enables movement of the actuator interface assembly.

In one embodiment, movement of the actuator interface assembly caused or enabled by way of the movement of the hydraulic cylinder ram is substantially the same as the scope, range, or nature of the movement of the hydraulic cylinder ram.

In one embodiment, the actuator interface assembly is configured so that movement thereof by way of the hydraulic cylinder ram causes a portion of the actuator interface assembly (for example, said at least two projecting portions, or the first, second arm portions) to be brought into contact (so as to, for example, interact, engage, or urge thereagainst) with a portion of the moveable support or tracking frame assembly, or structure mounted therewith, thereby facilitating or causing the moveable support or tracking frame assembly to move, rotate or pivot about an axis about which the moveable support or tracking frame is configured to pivot/rotate. Movement of the support or tracking frame assembly in this manner causes one or more rollers supported by the support or tracking frame assembly to engage the conveyor belt in a manner which applies increased pressure (for example, increased frictional engagement) to the belt, as would be well understood by the skilled person. In this manner, when the conveyor belt deviates from its desired 'running' alignment, the arrangement can be used to 'steer' the conveyor belt to or toward said desired running alignment.

In one embodiment, the actuator interface assembly (or one or more portion(s) thereof) is provided in rolling contact with a bracket assembly mounted with structure providing rotatable support to the moveable support or tracking frame assembly. In one embodiment, rolling contact between said bracket assembly and the actuator interface assembly (or one or more portion(s) thereof) is provided by way of a plurality of roller wheel units positioned so as to, at least in part, define a path or channel substantially along or through which the actuator interface assembly is caused to move or operate. In this manner, rolling contact between the roller wheels and respective portions of the actuator interface assembly serves to, at least in part, guide movement of the actuator interface assembly during operation.

In one embodiment, each of the plurality of roller wheels are positioned so as to, at least in part, define a generally linear shaped path or channel therebetween substantially along which the actuator interface assembly may be caused to move or operate by way of movement of the hydraulic cylinder ram.

In one embodiment, the handle portion, the hydraulic actuation assembly, and the actuator interface assembly (and components thereof, either individually or in combination) is/are configured so as to be retrofittable with the conveyor belt assembly or system for operable use with an existing support or tracking frame assembly thereof.

In one embodiment, the handle portion is spaced from an end of the moveable support or tracking frame assembly to which the arrangement is operably associated with. Advantages of such an arrangement may be realised in situations where a safety concern exists which encourages manual operation of the handle portion at a desired or determined (safe) distance from the relevant support or tracking frame assembly.

In one embodiment, the hydraulic axial piston pump unit comprises a built-in lock valve operable for mitigating a risk of a load applied to the actuator interface assembly by way of the moveable support or tracking frame assembly being directed or fed back to the handle portion.

Embodiments of the arrangement may be configured so as to be operable with either or both of the 'carry' or 'return' sections of the conveyor belt.

According to a fifth principal aspect, there is provided an arrangement for use with a conveyor belt assembly or system having one or more movable support or tracking frame assemblies operable for providing rolling support to a conveyor belt, the arrangement comprising:

a transmission assembly arranged in operable association with a movable support or tracking frame assembly, and configured having respective means or arrangement(s) for receiving an input force and to supply an output force, an actuator interface assembly configured in operable association with the output force supply means or arrangement so as to be responsive thereto, the actuator interface assembly configured having at least two spaced apart projecting portions extending therefrom so as to be operable in respect of the moveable support or tracking frame assembly, the transmission assembly configured operable for transferring a received input force for supplying an output force via the actuator interface assembly for facilitating selective interaction or engagement between either of said at least two projecting portions and a portion or region of, or provided with, the moveable support or tracking frame assembly for facilitating or causing an adjustment of the position, alignment, or orientation of a portion or region of the moveable support or tracking frame assembly.

According to a sixth principal aspect, there is provided an arrangement for use with a conveyor belt assembly or system having one or more movable support or tracking frame assemblies operable for providing rolling support to a conveyor belt, the arrangement comprising:

an actuator interface assembly arranged in operable association with a movable support or tracking frame assembly, and configured having at least two spaced apart projecting portions extending therefrom so as to be operable in respect of the moveable support or tracking frame assembly, a transmission assembly configured having a means or arrangement for receiving an input force (manually provided or otherwise) and a means or arrangement for supplying an output force, the output force supply means or arrangement operably associated with the actuator interface assembly so that the actuator interface assembly is responsive to the output force supply means or arrangement, the means or arrangement for receiving an input force and the means or arrangement for supplying an output force configured operable for transferring a received input force for supplying an output force to the actuator interface assembly for facilitating or causing an adjustment of the position, alignment, or orientation of the moveable support or tracking frame assembly by way of selective interaction or engagement by either of said at least two projecting portions with one or more portions of, or provided with, said moveable support or tracking frame assembly.

According to a seventh principal aspect, there is provided an arrangement for use with a conveyor belt assembly having one or more movable support or tracking frame assemblies operable for providing rolling support to a conveyor belt, the arrangement comprising:

a transmission assembly arranged in operable association with a movable support or tracking frame assembly, and configured having respective means or arrangement to receive a manually provided input force and to supply an output force, the transmission assembly configured operable for transferring the received input force for supplying an output force for use in facilitating an adjustment of the position, alignment, or orientation of the support or tracking frame assembly by way of selective interaction, engagement or urging against one or more portions of, or provided with, same.

According to an eighth principal aspect, there is provided an arrangement for use with a conveyor belt assembly having one or more movable support or tracking frame assemblies for providing rolling support to a conveyor belt, the arrangement comprising:

an actuator interface assembly arranged in operable association with a movable support or tracking frame assembly so that a portion of the actuator interface assembly can interact or engage with a portion or region of the support or tracking frame assembly, a transmission assembly configured having a means or arrangement for receiving an input force and a means or arrangement for supplying an output force, the output force supply means or arrangement operably associated with the actuator interface assembly, the means or arrangement for receiving an input force and the means or arrangement for supplying an output force configured in operable engagement with each other for transferring a received input force for supply to the actuator interface assembly for facilitating or causing an adjustment of the position, alignment, or orientation of the support or tracking frame assembly.

According to a ninth principal aspect, there is provided an arrangement for use with a conveyor belt assembly having one or more movable support or tracking frame assemblies operable for providing rolling support to a conveyor belt, the arrangement comprising:

an actuator interface assembly arranged in operable association with a movable support or tracking frame assembly so that a portion of the actuator interface assembly can interact or engage with a portion or region of the support or tracking frame assembly, a transmission assembly configured having a means or arrangement for receiving an input force and a means or arrangement for supplying an output force, the output force supply means or arrangement operably associated with the actuator interface assembly, the means or arrangement for receiving an input force and the means or arrangement for supplying an output force configured in operable engagement with each other for transferring a modified form of a received input force for supply to the actuator interface assembly for facilitating or causing an adjustment of the position, alignment, or orientation of the support or tracking frame assembly.

According to a tenth principal aspect, there is provided an arrangement for use with a conveyor belt assembly having one or more movable support or tracking frame assemblies operable for providing rolling support to a conveyor belt, the arrangement comprising:

an actuator interface assembly arranged in operable association with a movable support or tracking frame assembly so that a portion of the actuator interface assembly can interact or engage with a portion or region of the support or tracking frame assembly, a transmission assembly configured having a means or arrangement for receiving an input force and a means or arrangement for supplying an output force, the output force supply means or arrangement operably associated with the actuator interface assembly, the means or arrangement for receiving an input force and the means or arrangement for supplying an output force configured in operable engagement with each other for transferring in a uni-directional manner a received input force for supply to the actuator interface assembly for facilitating or causing an adjustment of the position, alignment, or orientation of the support or tracking frame assembly.

According to an eleventh principal aspect, there is provided an arrangement for use with a conveyor belt assembly having one or more movable support or tracking frame assemblies operable for providing rolling support to a conveyor belt, the arrangement comprising:

an actuator interface assembly arranged in operable association with a movable support or tracking frame assembly so that a portion of the actuator interface assembly can interact or engage with a portion or region of the support or tracking frame assembly, a transmission assembly configured having a means or arrangement for receiving an input force and a means or arrangement for supplying an output force, the output force means or arrangement operably associated with the actuator interface assembly, the means or arrangement for receiving an input force and a means or arrangement for supplying an output force configured in operable engagement with each other for transferring in a uni-directional manner a modified form of a received input force for supply to the actuator interface assembly for facilitating or causing an adjustment of the position, alignment, or orientation of the support or tracking frame assembly.

It will be appreciated that embodiments of the arrangement of the principal aspects described herein may be exemplified in the form of an adjustment system, tool, device, or apparatus.

According to a twelfth principal aspect, there is provided an arrangement for use with a conveyor belt assembly or system having one or more movable support or tracking frame assemblies operable for providing rolling support to a conveyor belt, the arrangement comprising:

a transmission assembly arranged in operable association with a movable support or tracking frame assembly, and configured having respective means or arrangement(s) for receiving an input force and to supply an output force, an actuator interface assembly configured in operable association with the output force supply means or arrangement so as to be responsive thereto, the transmission assembly configured operable for transferring a received input force for supplying an output force via the actuator interface assembly for facilitating selective interaction or engagement with a portion or region of, or provided with, the moveable support or tracking frame assembly for facilitating or causing an adjustment of the position, alignment, or orientation of a portion or region of the moveable support or tracking frame assembly, the actuator interface assembly configured so as to define, at least in part, a spatial region between which one or more portions/regions of the moveable support or tracking frame assembly is provided sufficient freedom to move as required for its normal operation without interference from the actuator interface assembly when positioned in a condition or state in which no adjustment of the moveable support or tracking frame is undertaken by the arrangement or required.

According to a thirteenth principal aspect, there is provided an arrangement for use with a conveyor belt assembly or system having one or more movable support or tracking frame assemblies operable for providing rolling support to a conveyor belt, the arrangement comprising:

an actuator interface assembly arranged in operable association with a movable support or tracking frame assembly, a transmission assembly configured having a means or arrangement for receiving an input force and a means or arrangement for supplying an output force, the output force supply means or arrangement operably associated with the actuator interface assembly so that the actuator interface assembly is responsive to the output force supply means or arrangement, the means or arrangement for receiving an input force and the means or arrangement for supplying an output force configured operable for transferring a received input force for supplying an output force to the actuator interface assembly for facilitating or causing an adjustment of the position, alignment, or orientation of the moveable support or tracking frame assembly by way of selective interaction or engagement by the actuator interface assembly with one or more portions of, or provided with, said moveable support or tracking frame assembly, the actuator interface assembly configured so as to define, at least in part, a spatial region between which one or more portions/regions of the moveable support or tracking frame assembly is provided sufficient freedom to move as required for its normal operation without interference from the actuator interface assembly when positioned in a condition or state in which no adjustment of the moveable support or tracking frame is undertaken by the arrangement or required.

In one embodiment, the arrangements of the twelfth or thirteenth principal aspects are exemplified by way of any embodiment operably configured in accordance with any of the arrangements of the principal aspects described herein, or as otherwise described herein.

According to a further principal aspect, there is provided a method for installing or associating any embodiment of an arrangement described herein for operable use with a portion or region (such as for example, a support or tracking frame assembly) of a conveyor belt assembly or system.

According to a further principal aspect, there is provided a method for installing or associating any embodiment of an arrangement described herein for operable use with a support or tracking frame assembly of a conveyor belt assembly or system, the method comprising:

providing an embodiment of an arrangement operably configured in accordance with any embodiment of an arrangement of the principal aspects described herein, or as otherwise described herein, associating said embodiment with a moveable support or tracking frame assembly of a conveyor belt assembly or system such that the embodiment is operable for facilitating or causing an adjustment to be made to the position, alignment, or orientation of a portion or region of the moveable support or tracking frame assembly.

According to a further principal aspect, there is provided a method of using of an embodiment of an arrangement operably configured in accordance with any embodiment of an arrangement of the principal aspects described herein, or as otherwise described herein, for the purpose of facilitating or causing an adjustment to be made to the position, alignment, or orientation of a portion of region of a moveable support or tracking frame assembly.

According to a further principal aspect, there is provided a method for facilitating or causing an adjustment to be made to the position, alignment, or orientation of a moveable support or tracking frame assembly or assembly of a conveyor belt assembly, the method comprising:

operating, or causing to be operated, an embodiment of an arrangement operably configured in accordance with any embodiment of an arrangement of the principal aspects described herein, or as otherwise described herein, and arranged operable with said moveable support or tracking frame assembly for facilitating or causing an adjustment to be made to the position, alignment, or orientation of a portion or region of the moveable support or tracking frame assembly.

In one embodiment, the method may comprise registering, recording, or logging one or more characteristics (such as for example, the time, date, or location) of said operating event or the causing of such an operating event.

In one embodiment, such registering, recording, or logging may be carried out by any appropriate means or arrangement (such as for example, digitally, physically etc).

According to a further principal aspect, there is provided a moveable support or tracking frame assembly of a conveyor belt assembly or system operable for providing rolling support to a conveyor belt, the moveable support or tracking frame assembly being arranged so as to be in operable association with an embodiment of an arrangement operably configured in accordance with any embodiment of an arrangement of the principal aspects described herein, or as otherwise described herein, for facilitating or causing an adjustment to be made to the position, alignment, or orientation of the support or tracking frame assembly According to a further principal aspect, there is provided a conveyor belt assembly or system comprising one or more (or a plurality of) moveable support or tracking frame assemblies operable for providing rolling support to a conveyor belt, one or more of said moveable support or tracking frame assemblies being arranged so as to be in operable association with an embodiment of an arrangement operably configured in accordance with any embodiment of an arrangement of the principal aspects described herein, or as otherwise described herein, for facilitating or causing an adjustment to be made to the position, alignment, or orientation of a portion or region of the moveable support or tracking frame assembly.

According to another principal aspect, there is provided a manually operable actuator for use in facilitating or causing an adjustment of the position, alignment, or orientation of a moveable support or tracking frame assembly of a conveyor belt assembly or system, said actuator comprising any embodiment of an arrangement described herein.

According to a further principal aspect, there is provided an arrangement for use with a conveyor belt assembly or system having one or more movable support or tracking frame assemblies for providing rolling support to a conveyor belt, the arrangement comprising:

an actuator interface assembly arranged in operable association with a movable support or tracking frame assembly so that a portion of the actuator interface assembly can interact or engage with a portion or region of the support or tracking frame assembly, a transmission assembly configured having a means or arrangement for receiving a manually provided input force and a means or arrangement for supplying an output force, the output force supply means or arrangement operably associated with the actuator interface assembly, the means or arrangement for receiving an input force and the means or arrangement for supplying an output force configured operable for transferring a received input force for supplying an output force to the actuator interface assembly for facilitating or causing an adjustment of the position, alignment, or orientation of the support or tracking frame assembly by way of selective interaction, engagement or urging against one or more portions of, or provided with, said support or tracking frame assembly.

According to a further principal aspect, there is provided a kit of parts comprising any combination of the features described herein. For example, commercial forms of the embodiments of the arrangement described herein may include kits that comprise the relevant components allowing forms of the arrangement described herein to be installed on existing support or tracking frames assemblies. The skilled reader would appreciate that such kits could take many different forms, providing different combinations of components/features, depending on operator/user needs. In this regard, some forms of such kits may not comprise certain components if such components can be sourced (by the purchaser), for example, from alternate sources.

Accordingly, the scope of how such kits could be comprised could differ depending on an operator/user's needs.

According to another principal aspect, there is provided a conveyor belt assembly or system operable for operating a conveyor belt, the conveyor belt assembly or system comprising at least one embodiment of an arrangement operably configured in accordance with an arrangement of the principal aspects as described herein, or as otherwise described herein.

According to another principal aspect, there is provided a conveyor belt assembly or system operable for operating a conveyor belt, the conveyor belt assembly or system comprising at least one embodiment of an arrangement as described herein operably configured for use with either or both of a 'carry' or 'return' section(s) of the conveyor belt/assembly/system.

According to another principal aspect, there is provided a system configured operable for conveying material, said system comprising one or more conveyor belt assemblies or systems, at least one of the or each conveyor belt assemblies/systems comprising at least one embodiment of an arrangement operably configured in accordance with an arrangement of the principal aspects as described herein, or as otherwise described herein.

According to another principal aspect, there is provided a system configured operable for conveying material, said system comprising one or more conveyor belt assemblies or systems, at least one of the or each conveyor belt assemblies or systems comprising at least one embodiment of an arrangement operably configured in accordance with an arrangement of the principal aspects as described herein, or as otherwise described herein, said arrangement being operably configured for use with either or both of a 'carry' or 'return' section(s) of the relevant conveyor belt assembly/system.

Various principal aspects described herein can be practiced alone or combination with one or more of the other principal aspects, as will be readily appreciated by those skilled in the relevant art. The various principal aspects can optionally be provided in combination with one or more of the optional features described in relation to the other principal aspects. Furthermore, optional features described in relation to one example (or embodiment) can optionally be combined alone or together with other features in different examples or embodiments.

For the purposes of summarising the principal aspects, certain aspects, advantages and novel features have been described herein above. It is to be understood, however, that not necessarily all such advantages may be achieved in accordance with any particular embodiment or carried out in a manner that achieves or optimises one advantage or group of advantages as taught herein without necessarily achieving other advantages as may be taught or suggested herein.

BRIEF DESCRIPTION OF THE DRAWINGS

Further features of the inventive principles are more fully described in the following description of several non-limiting embodiments thereof. This description is included solely for the purposes of exemplifying the inventive principles. It should not be understood as a restriction on the broad summary, disclosure or description as set out above. The description will be made with reference to the accompanying drawings in which.

Figure 1A:
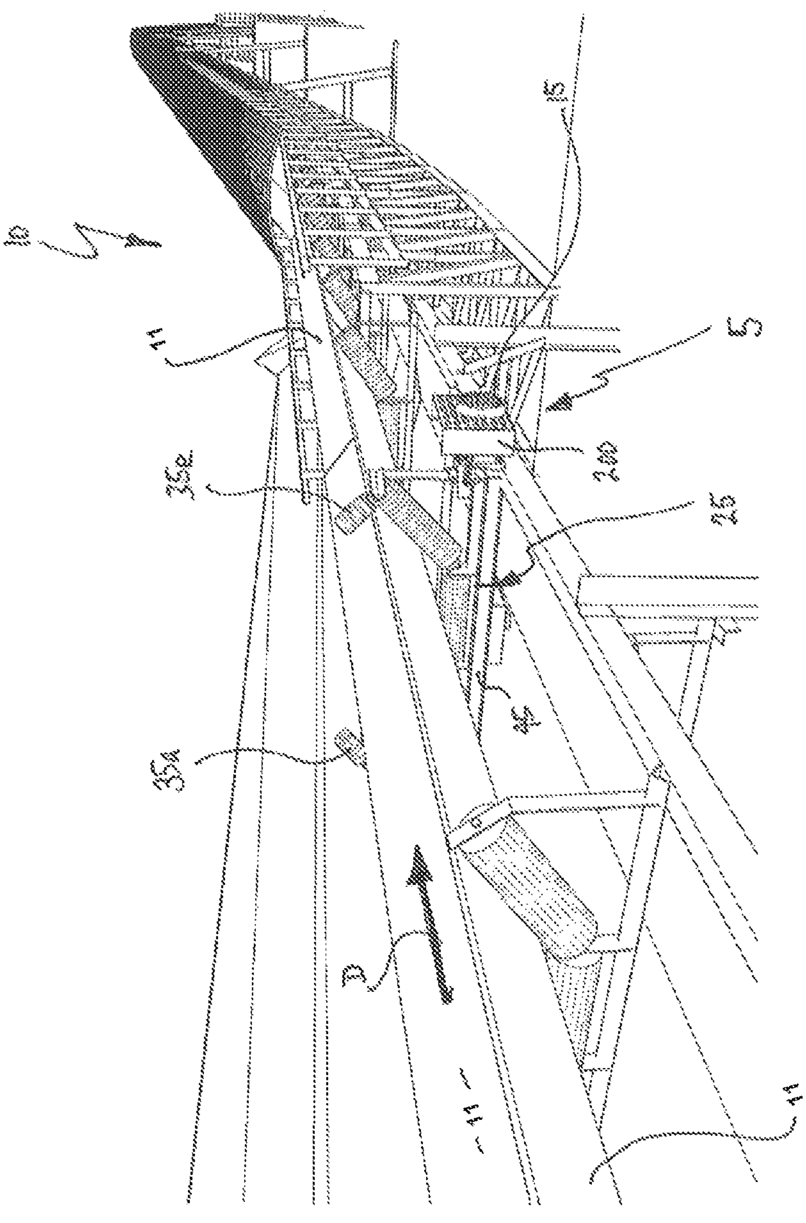
FIG. 1A shows a perspective view of a conveyor belt assembly having one embodiment of an arrangement configured in accordance with the principles described herein.

In the figures, like elements are referred to by like numerals throughout the views provided. The skilled reader will appreciate that elements in the figures are illustrated for simplicity and clarity and have not necessarily been drawn to scale. For example, the dimensions and/or relative positioning of some of the elements in the figures may be exaggerated relative to other elements to facilitate an understanding of the various embodiments exemplifying the principles described herein. Also, common but well understood elements that are useful or necessary in a commercially feasible embodiment are often not depicted in order to provide a less obstructed view of these various embodiments. It will also be understood that the terms and expressions used herein adopt the ordinary meaning as is accorded to such terms and expressions with respect to their corresponding respective areas of inquiry and study except where specific meanings have otherwise been set forth herein.

It should be noted that the figures are schematic only and the location and disposition of the components can vary according to the particular arrangements of the embodiment(s) as well as of the particular applications of such embodiment(s).

Specifically, reference to positional descriptions, such as 'lower' and 'upper', and associated forms such as 'uppermost' and 'lowermost', are to be taken in context of the embodiments shown in the figures, and are not to be taken as limiting the scope of the principles described herein to the literal interpretation of the term, but rather as would be understood by the skilled reader.

Embodiments described herein may include one or more range of values (eg. size, displacement and field strength etc). A range of values will be understood to include all values within the range, including the values defining the range, and values adjacent to the range which lead to the same or substantially the same outcome as the values immediately adjacent to that value which defines the boundary to the range.

Other definitions for selected terms used herein may be found within the detailed description and apply throughout. Unless otherwise defined, all other scientific and technical terms used herein have the same meaning as commonly understood to one of ordinary skill in the art to which the embodiment(s) relate.

DETAILED DESCRIPTION

The words used in the specification are words of description rather than limitation, and it is to be understood that various changes may be made without departing from the spirit and scope of any aspect of the invention. Those skilled in the art will readily appreciate that a wide variety of modifications, alterations, and combinations can be made with respect to the above described embodiments without departing from the spirit and scope of any aspect of the invention, and that such modifications, alterations, and combinations are to be viewed as falling within the ambit of the inventive concept.

Throughout the specification and the claims that follow, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

With reference to the Figures, a number of embodiments (5, 5', 500) of arrangements for use with conveyor belt assemblies or systems 10 are disclosed.

Figure 21:
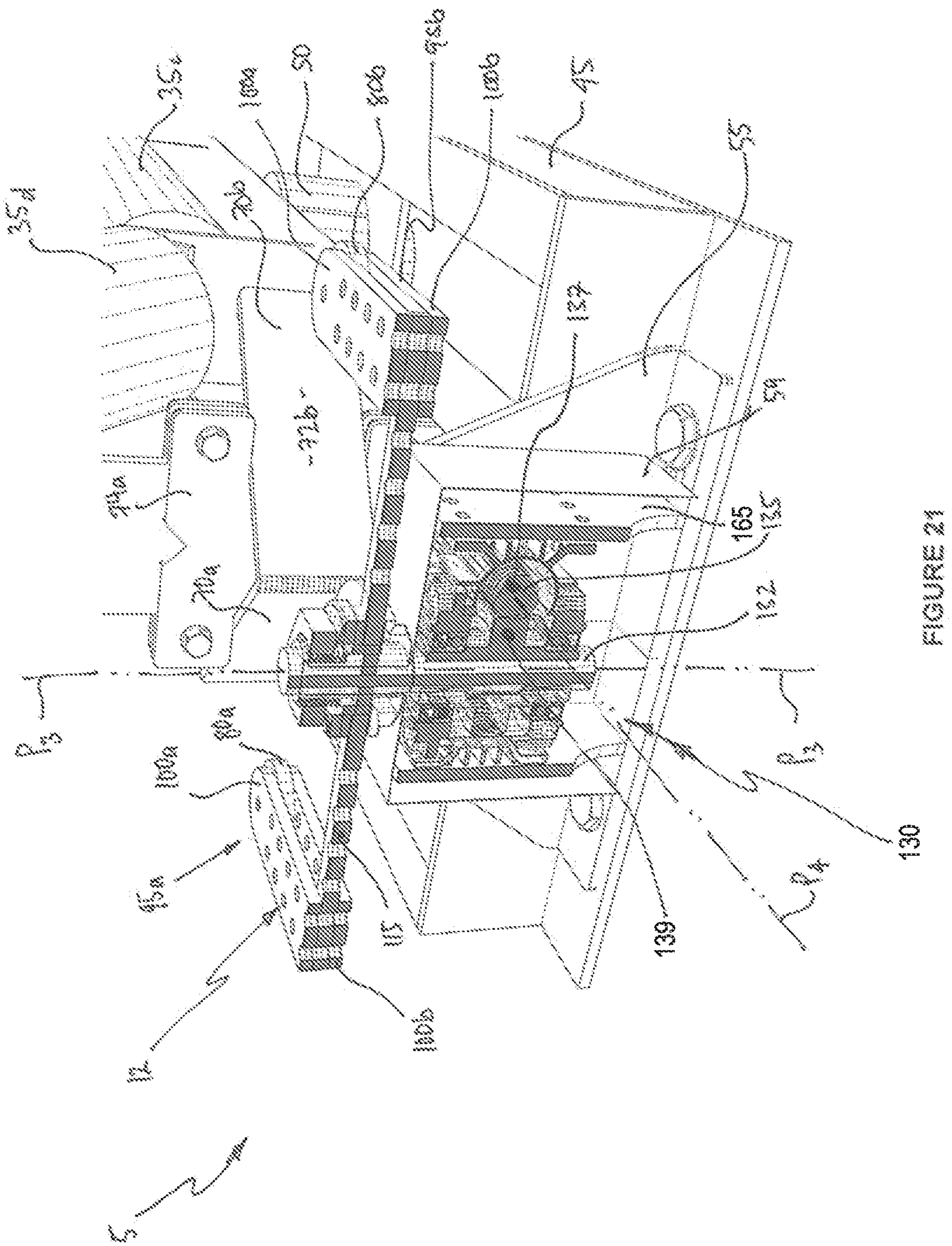
FIG. 21 shows a perspective view of a further embodiment of a mount/bracket assembly used in accordance with an embodiment of the arrangement described in FIG. 1B, when sectioned through a plane passing through the axis $P_3$ of the output shaft (132)
Figure 22A:
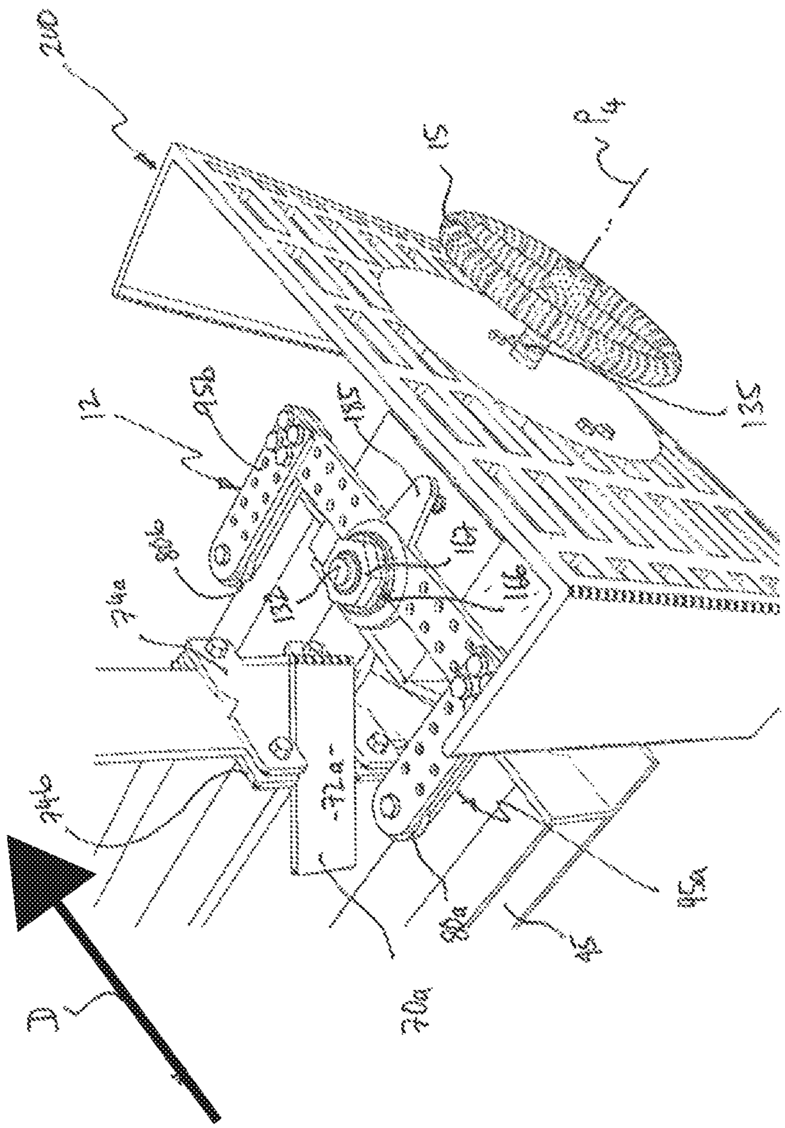
FIG. 22A shows another perspective view of the embodiment of the arrangement shown in FIG. 1B, showing the arrangement in a first condition (eg. a generally 'neutral' condition)
Figure 22B:
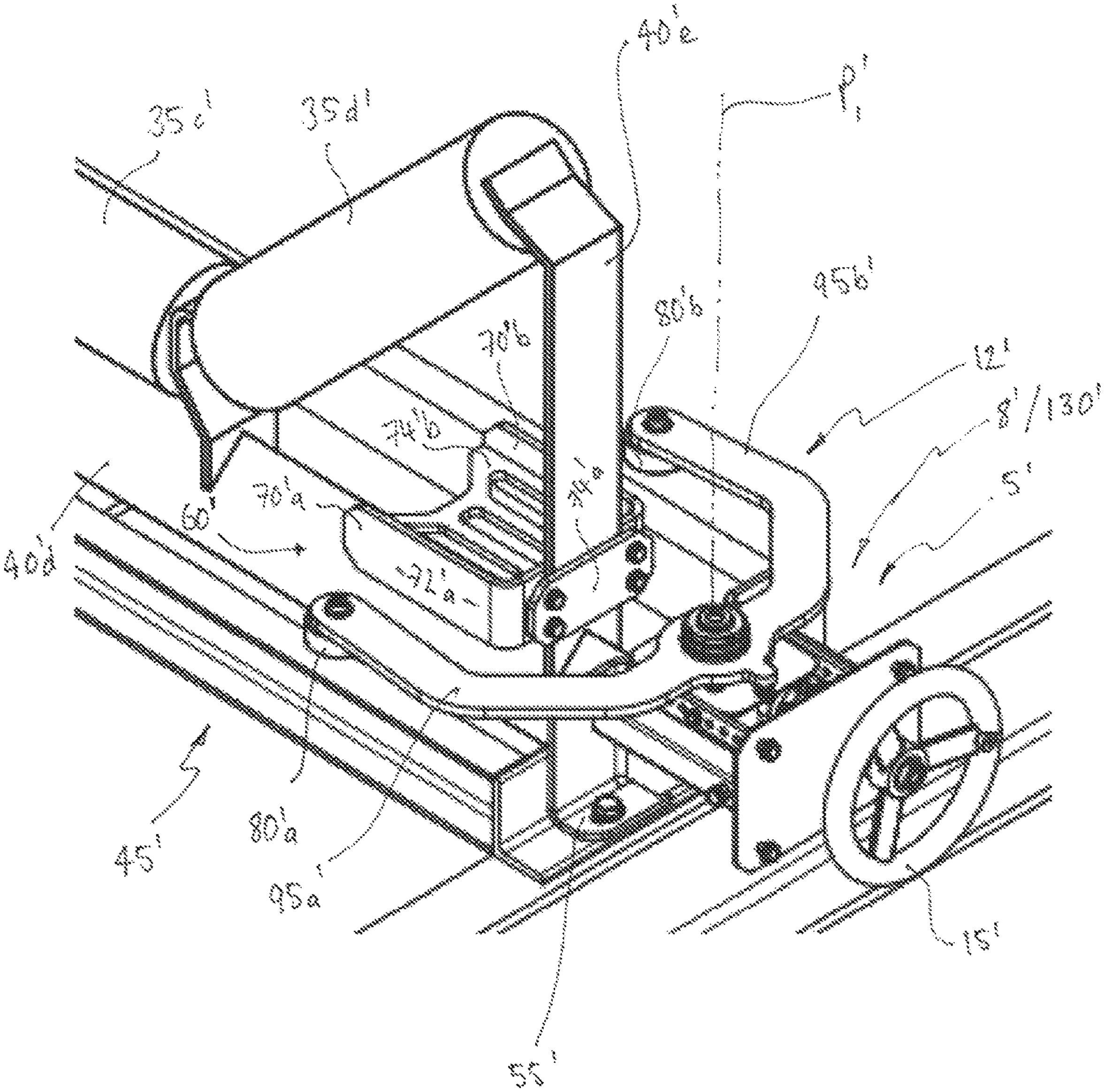
FIG. 22B shows a perspective view of another embodiment of an arrangement configured in accordance with the principles described herein.

With reference to FIGS. 1 to 24, a first embodiment of an arrangement 5 (a second embodiment (5') is shown in FIG. 22B) is shown comprising a transmission assembly 8 arranged in operable association with a tracking frame assembly 25, and configured having respective means or arrangement for receiving an input (for example, an input force facilitated by use of a handle portion of a handle arrangement (for example, a handwheel 15 of a handwheel arrangement or assembly) by a user/operator of the arrangement 5) and supplying an output (for example, an output force for use by an actuator interface assembly 12). The transmission assembly 8 is configured operable for transferring a received input for supplying an output for facilitating or causing, via the actuator interface assembly 12, an adjustment of the position, alignment, or orientation of the support or tracking frame assembly 25 (hereinafter, tracking frame 25). In this manner, the arrangement 5 is responsive to actuation/manipulation of the handwheel 15 for causing an adjustment of the position or orientation of a portion of the tracking frame 25. In one form, the arrangement 5 is advantageous in allowing a user to make adjustments to the position, orientation, or alignment of the tracking frame 25 from a safe distance while the conveyor belt assembly is operating while isolating the user (and, indeed, the arrangement 5 itself) from becoming subject to any significant forces (for example, in the form of torque levels) or loads that might be experienced by the tracking frame. Embodiments of the principles described herein may serve to provide arrangements for operable use in adjusting the position/alignment/orientation of a tracking frame 25 for assisting in realignment of the conveyor belt in situations where, for example, the belt becomes misaligned due to worn pulleys/rollers or other componentry. Use of such arrangements (5, 5', 500) described herein can be useful in operating and or retaining the tracking frame 25 to/in an appropriate position/alignment/orientation until the cause of the misalignment can be resolved, usually at the next scheduled maintenance shutdown.

Tracking Frame Structure

Figure 1B:
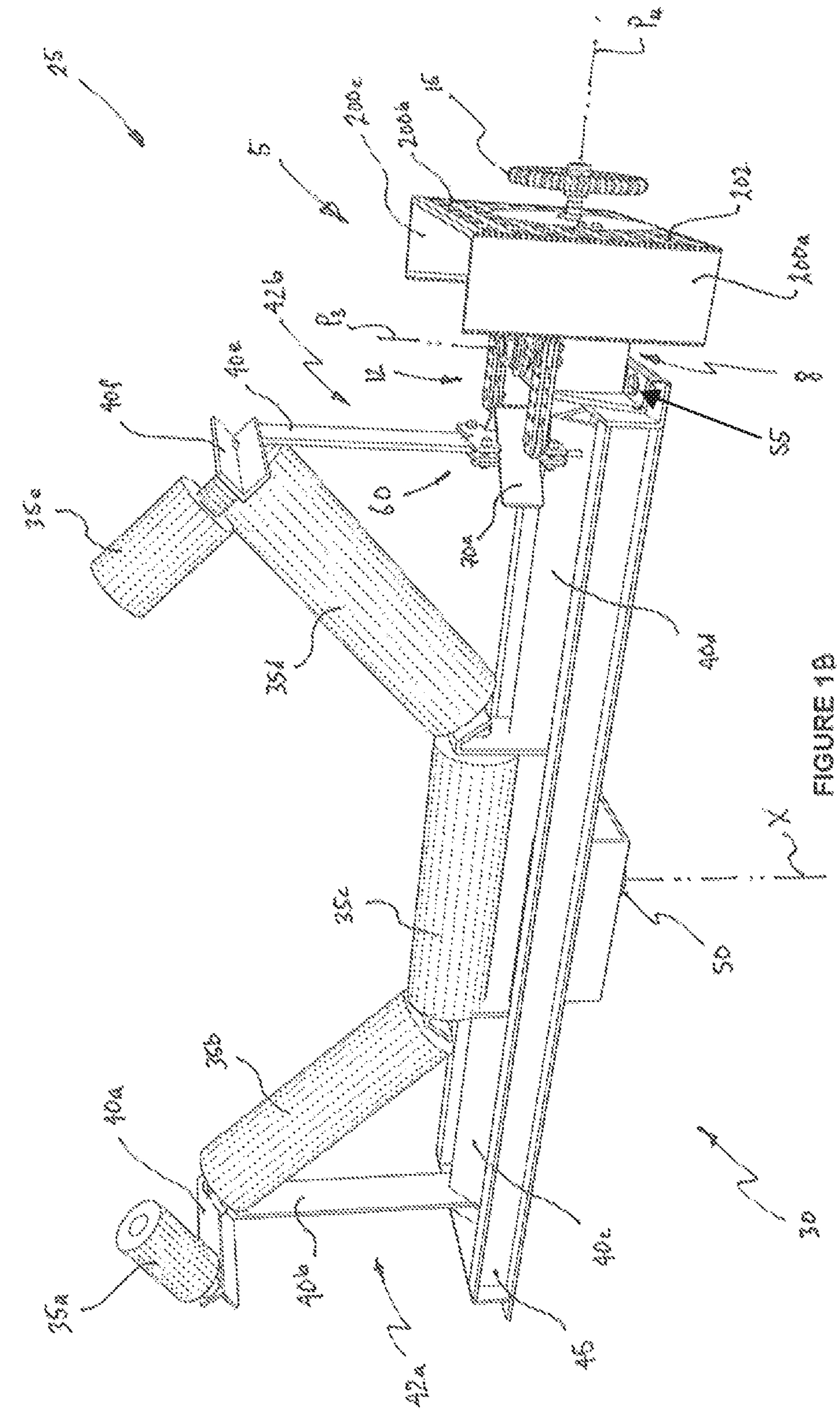
FIG. 1B shows a perspective view of one embodiment of an arrangement for use with a conveyor belt assembly described herein.

Shown in FIG. 1A is one form of a tracking frame 25 operable with a conveyor belt 11 of a conveyor belt assembly or system 10. With reference to FIG. 1B, and as the skilled reader will readily appreciate, the tracking frame 25 comprises a support assembly 30 which serves to provide support to a number of rollers 35*a*-35*e* for providing supporting rolling contact to a moving/running conveyor belt 11. Briefly, rollers 35*a*, 35*e* are positioned so as to sense lateral tracking of the belt 11 but can offer, when necessary, rolling guiding contact to a portion of an edge of the moving conveyor belt 11, and rollers 35*b*, 35*c*, and 35*d* are positioned or aligned as appropriate (for the instance shown, rollers 35*b* and 35*d* being inclined, and roller 35*c* being of horizontal alignment) so as to offer rolling guiding contact to, generally speaking, portions of the conveyor belt 11 that are generally intermediate of the edges of the moving conveyor belt. As the skilled person would appreciate, rollers 35*a*, 35*e* are positioned so as to reside on, and generally project towards (in an inclined manner as shown), the inward facing side of the tracking frame 25; thus, for the case shown throughout the Figures, the movement of the conveyor belt 11 is in the general direction from the lower left hand corner of the page to the upper right hand corner of the page—shown generally by arrow D shown in FIGS. 23 and 24. The rollers 35 are supported in position by an arrangement of support elements 40 (which can be standard elongate angle sections) configured/assembled to offer the appropriate structural support in view of the nature of the function to be served by the rollers: support elements 40*a*-40*c* are arranged to form a first sub-assembly 42*a* so as to support at least rollers 35*a/b*, and support elements 40*d*-40*f* are arranged to form a second sub-assembly 42*b* so as to support at least rollers 35*d/e*. Portions of each first/second sub-assembly 42*a/b* serve to support roller 35*c*. Of course, different variations to the support structure shown in FIG. 1B (and throughout the Figures) are possible.

The first, second sub-assemblies 42*a/b* are supported by a base structure 45, which is configured so as to be capable of pivoting about axis X. The base structure 45 may be formed as appropriate allowing it to provide support to the first, second sub-assemblies 42*a/b*. In the form shown, the base structure 45 is formed so as to provide a rectangularly shaped frame having a centrally disposed bearing assembly 50 that allows the base structure to be provided in pivotal connection/relation (so as to allow rotation, pivoting about axis X) with a support frame (not shown) of the conveyor belt assembly 10. The skilled reader will be familiar with the general structural construction of conveyor belt assembly tracking frames, the materials appropriate (types/grades of steels, etc), and further description of this aspect is not warranted further.

With reference again to FIG. 1B the arrangement 5 is provided (in a retrofitted manner or otherwise) generally at one end of the tracking frame 25 so as to be positioned proximal or adjacent the end of the tracking frame 25 with which the arrangement 5 is arranged operable. In the form shown, an assembly (provided in the form of a reaction assembly 60) is mounted with an end of the tracking frame 25 at/near a lower end of support element 40*e*. The transmission assembly 8 is mounted to an end of base structure 45 by way of a mounting assembly 55. In this form, when the arrangement 5 is operable, the actuator interface assembly 12 interacts with the reaction assembly 60 so as to cause movement of the tracking frame 25 by way of its pivotal connection (via bearing assembly 50) with the support frame of the conveyor belt assembly 20.

In substance, for the arrangement 5 the general configuration and operation of the transmission assembly 8 is mechanical in nature. As foreshadowed above, the transmission assembly 8 is configured having respective means or arrangement to receive a manually provided (using the handwheel 15) input force (for example, via input shaft 135) and to supply an output force (for example, via output shaft 135) for facilitating/causing movement/adjustment of the tracking frame 25 via the actuator interface assembly 12. For the presently described embodiment, the transmission assembly 8 is provided in the form of a worm gearbox (hereinafter, gearbox assembly 130) as described further below.

Figure 6:
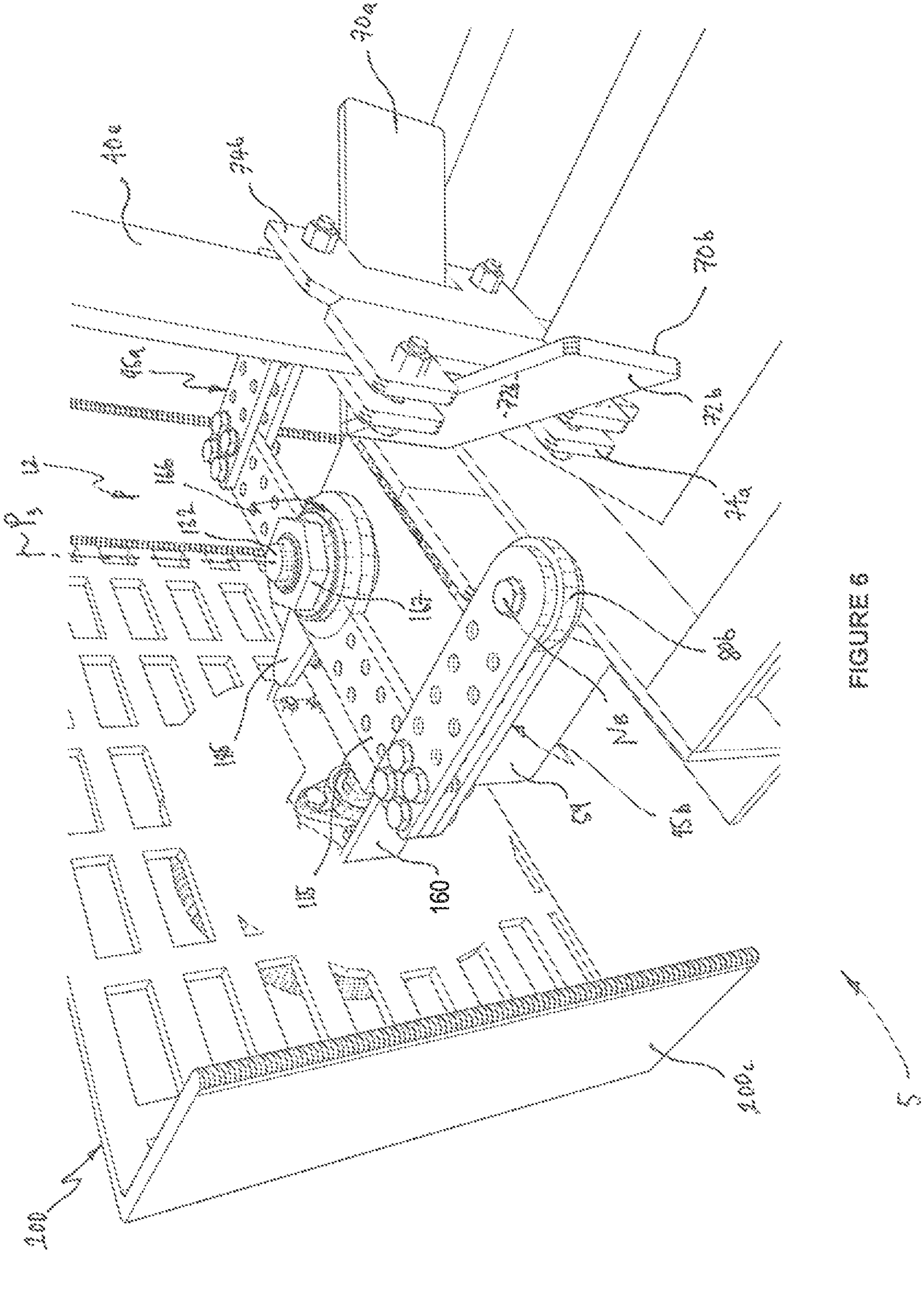
FIG. 6 shows another perspective view of the embodiment shown in FIG. 1B.
Figure 7:
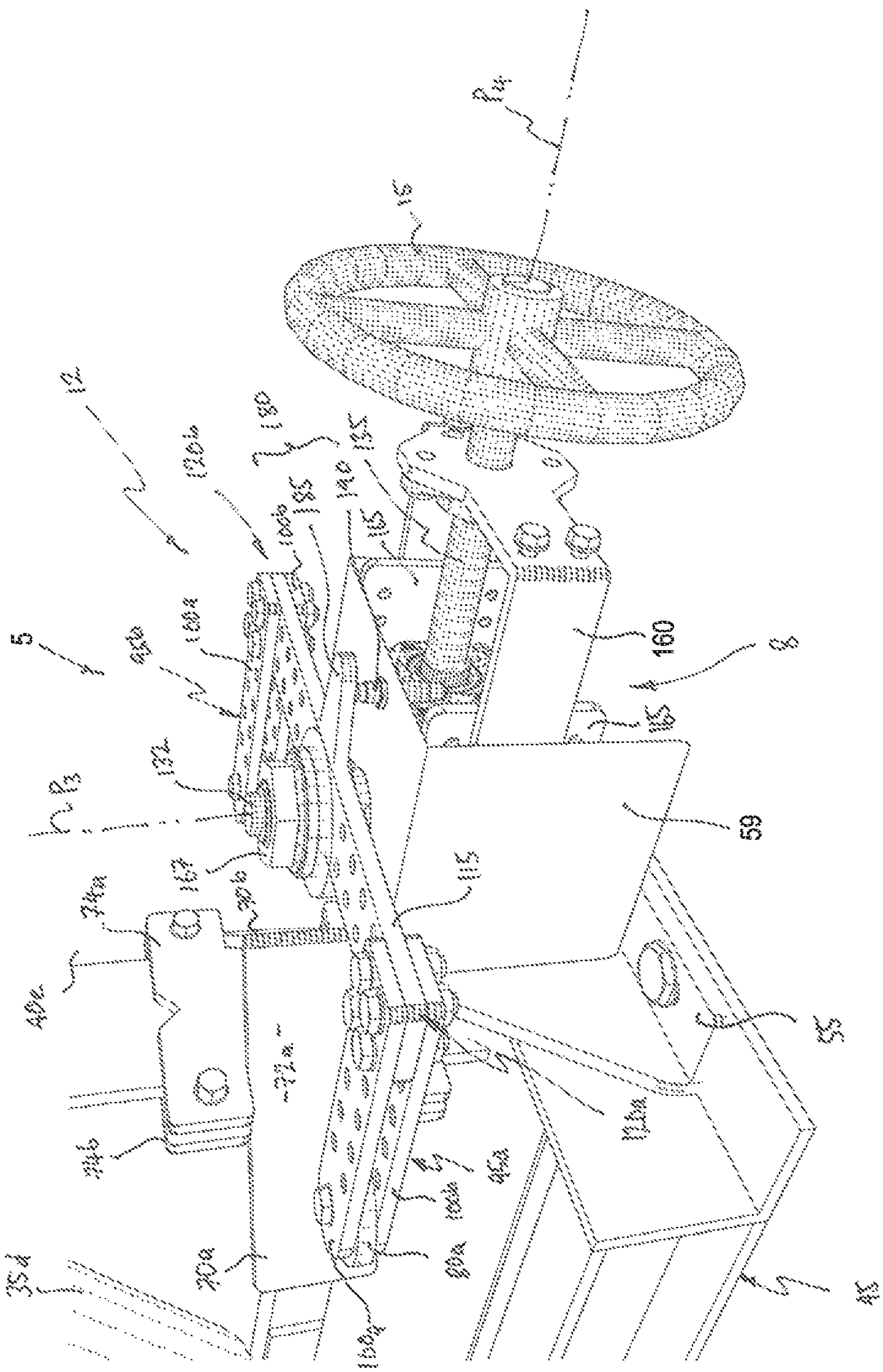
FIG. 7 shows another perspective view of the embodiment shown in FIG. 1B (with guard removed)
Figure 8:
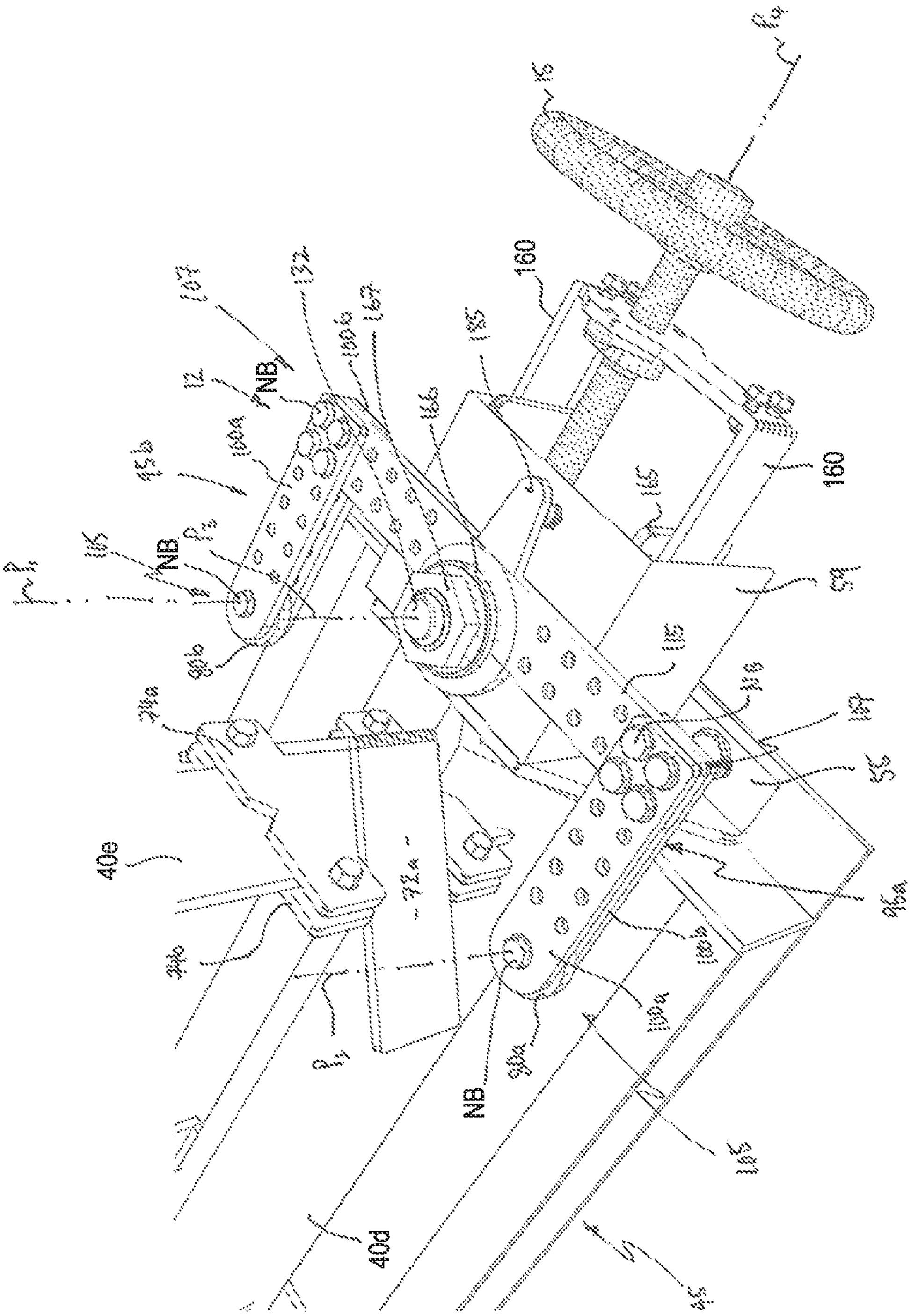
FIG. 8 shows another perspective view of the embodiment shown in FIG. 1B (with guard removed)
Figure 9:
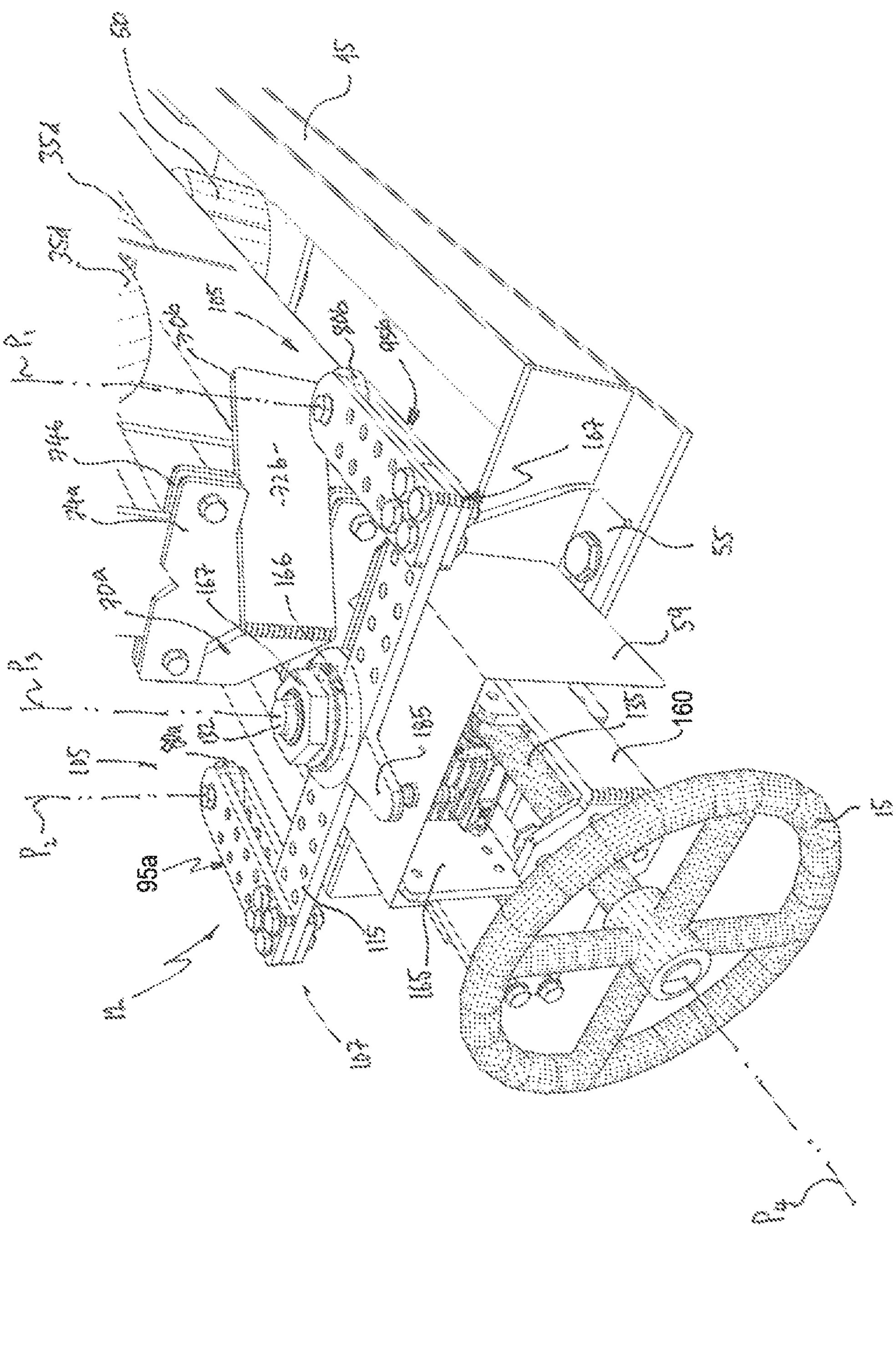
FIG. 9 shows another perspective view of the embodiment shown in FIG. 1B (with guard removed)
Figure 10:
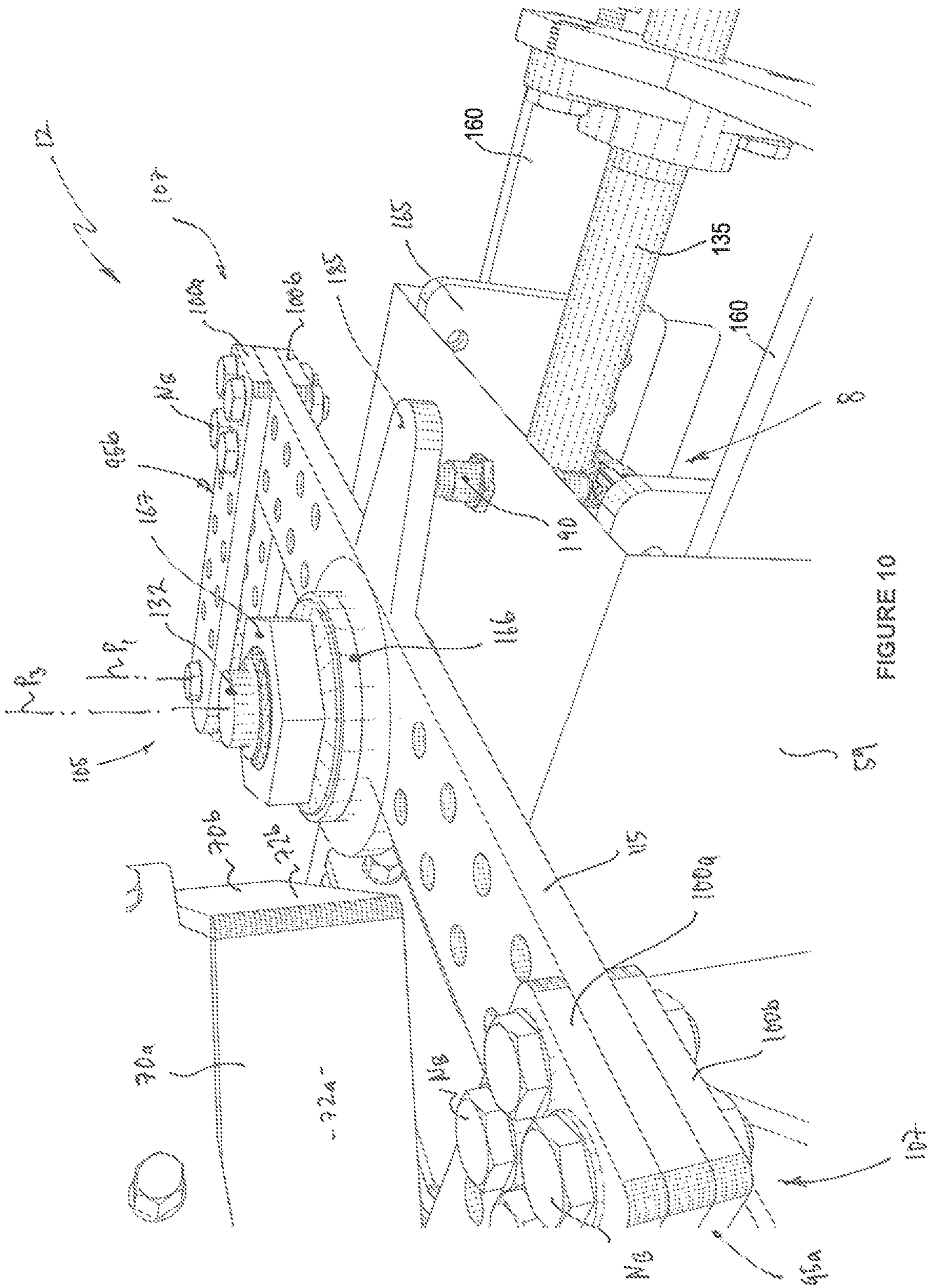
FIG. 10 shows another perspective view of the embodiment shown in FIG. 1B (with guard removed)
Figure 11:
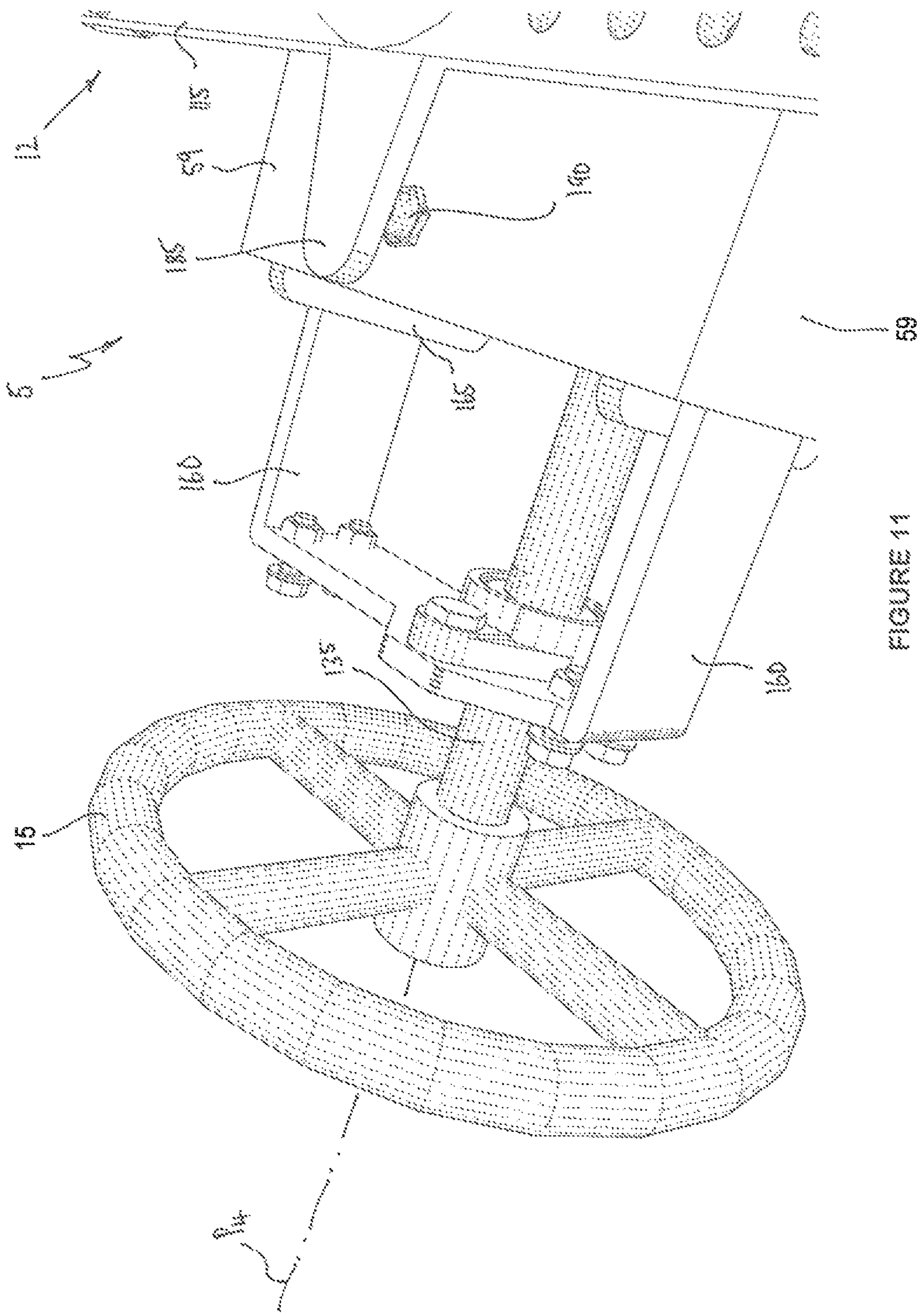
FIG. 11 shows another perspective view of the embodiment shown in FIG. 1B (with guard removed)
Figure 12:
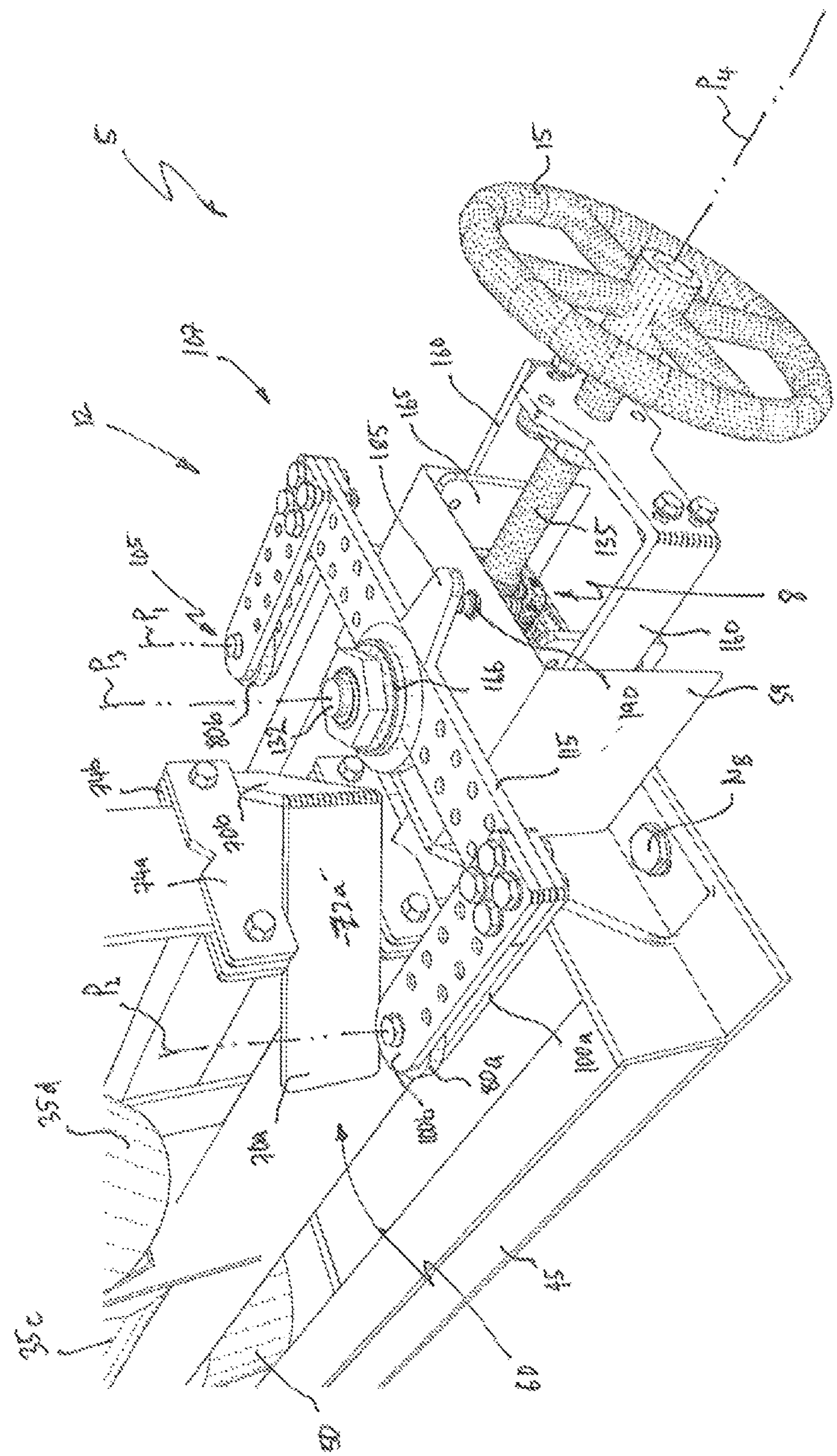
FIG. 12 shows another perspective view of the embodiment shown in FIG. 1B (with guard removed)
Figure 13:
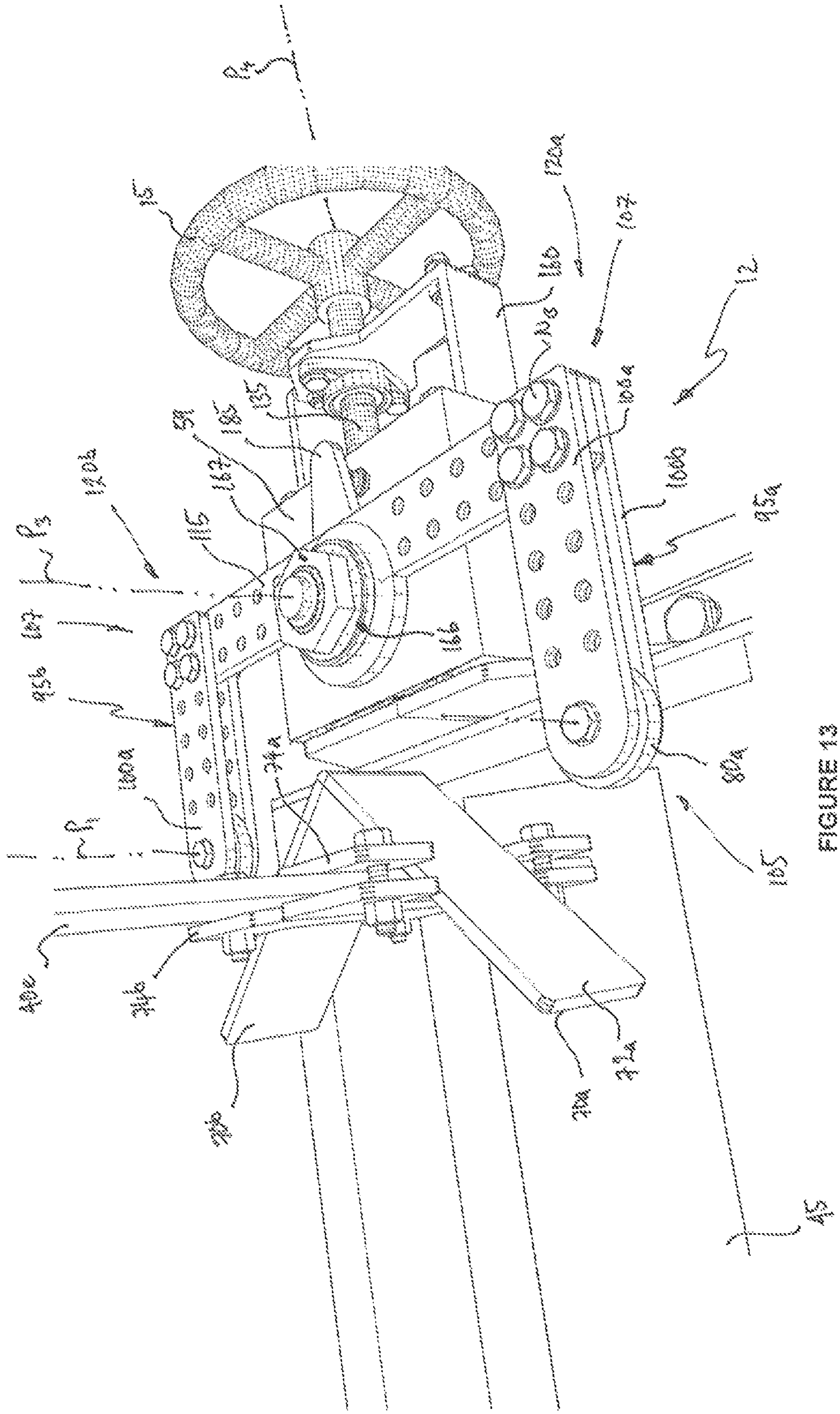
FIG. 13 shows another perspective view of the embodiment shown in FIG. 1B (with guard removed)
Figure 14:
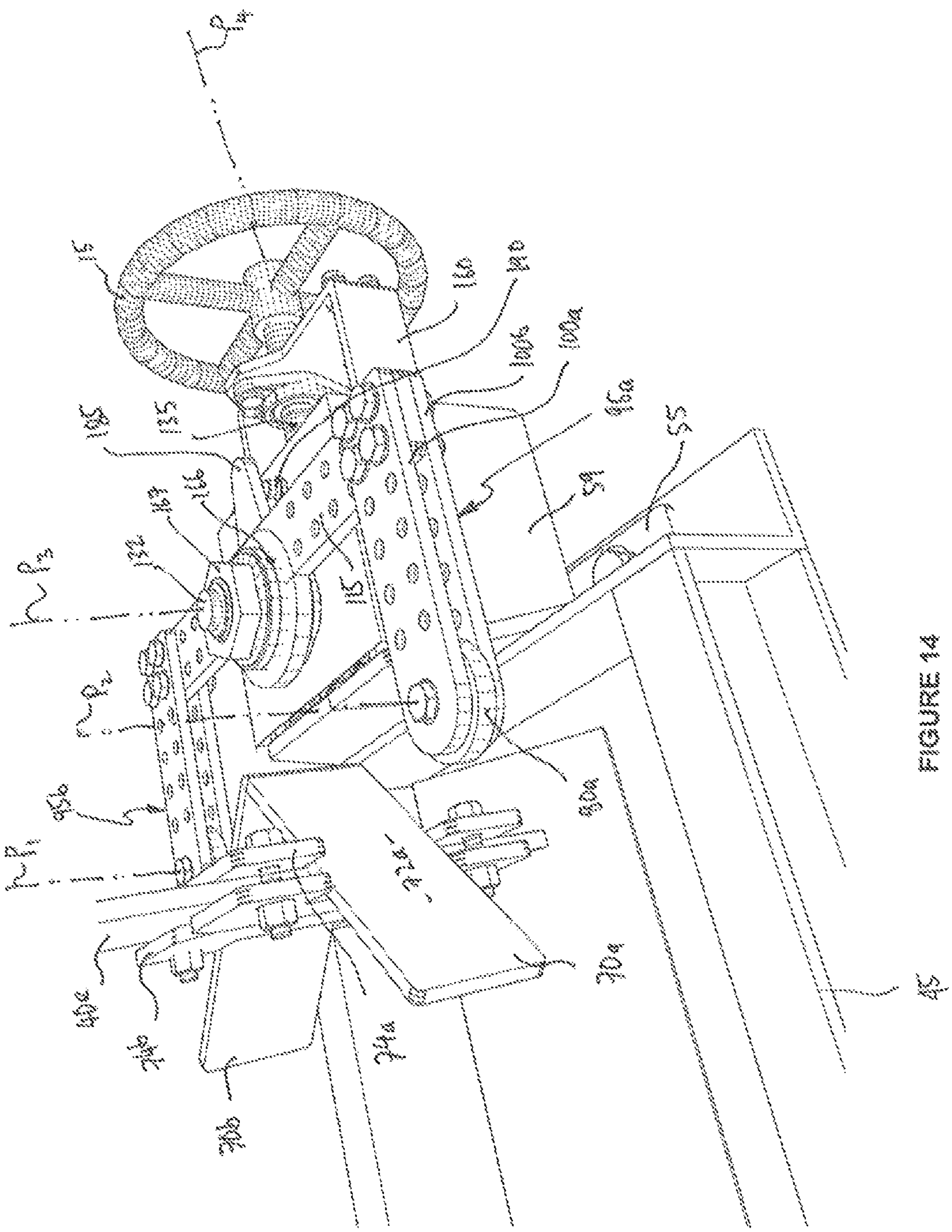
FIG. 14 shows another perspective view of the embodiment shown in FIG. 1B (with guard removed)
Figure 15:
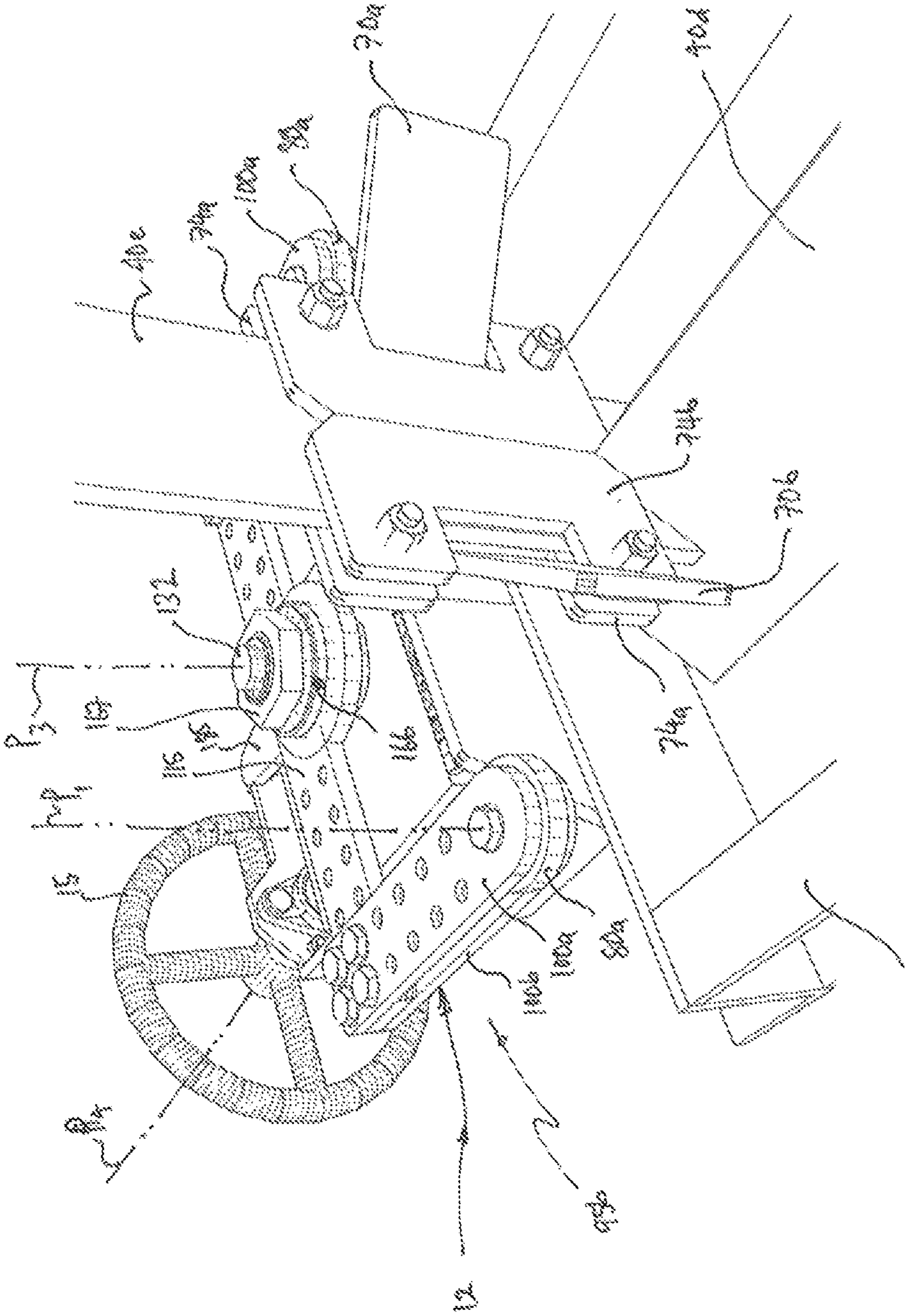
FIG. 15 shows another perspective view of the embodiment shown in FIG. 1B (with guard removed)
Figure 16:
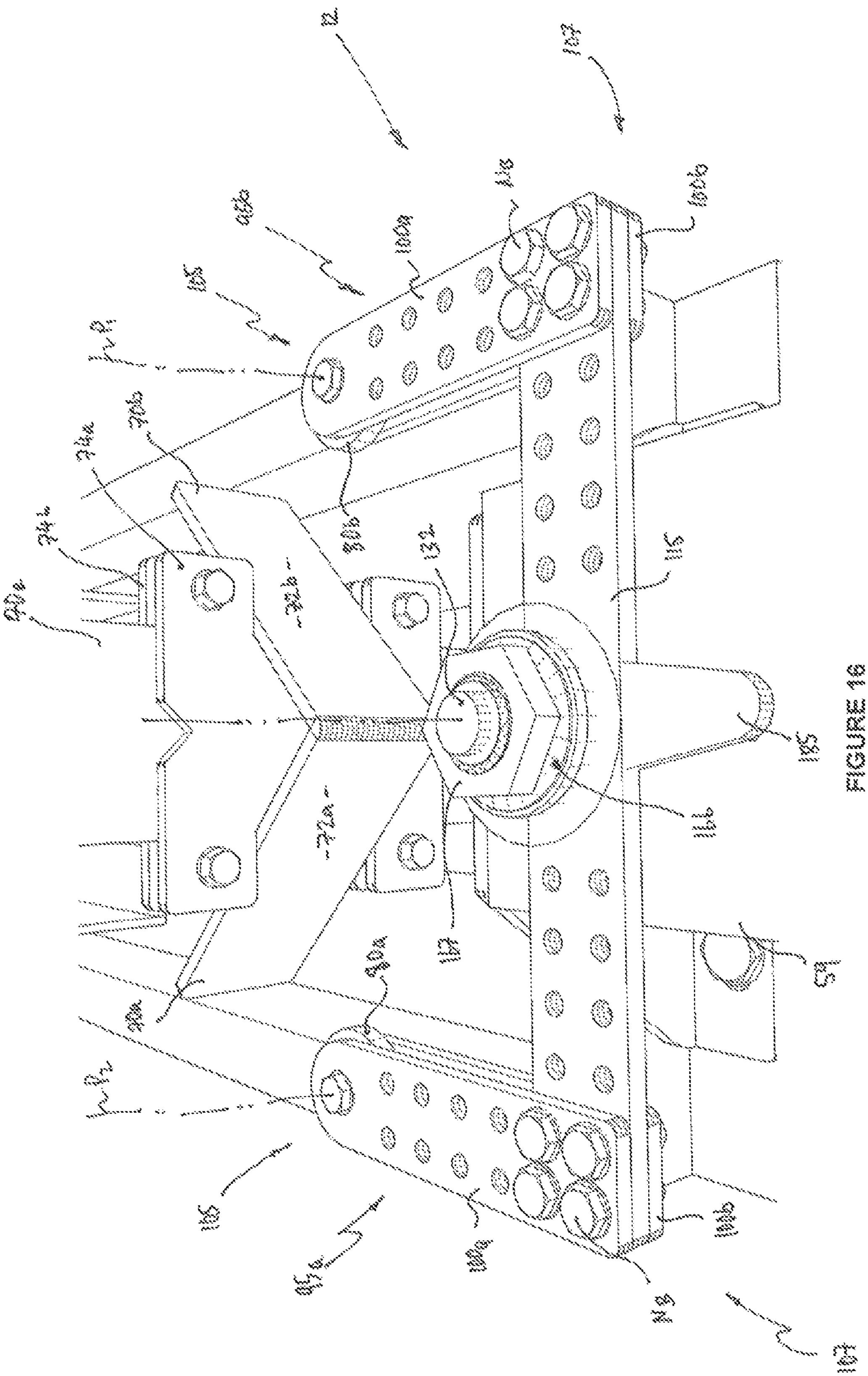
FIG. 16 shows another perspective view of the embodiment of the arrangement shown in FIG. 1B (with guard removed)
Figure 17:
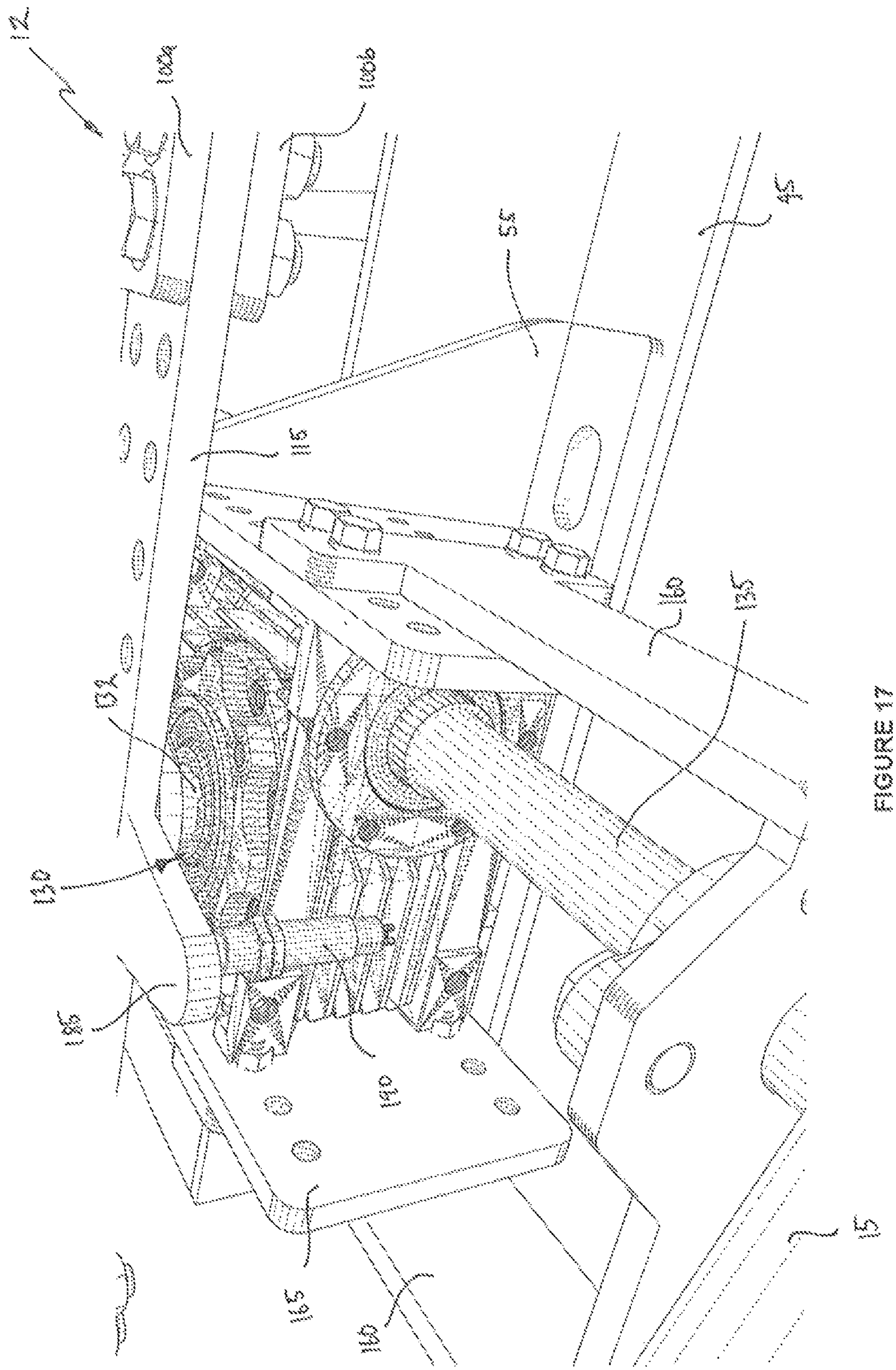
FIG. 17 shows another perspective view of the embodiment of the arrangement shown in FIG. 1B (with guard removed)
Figure 18:
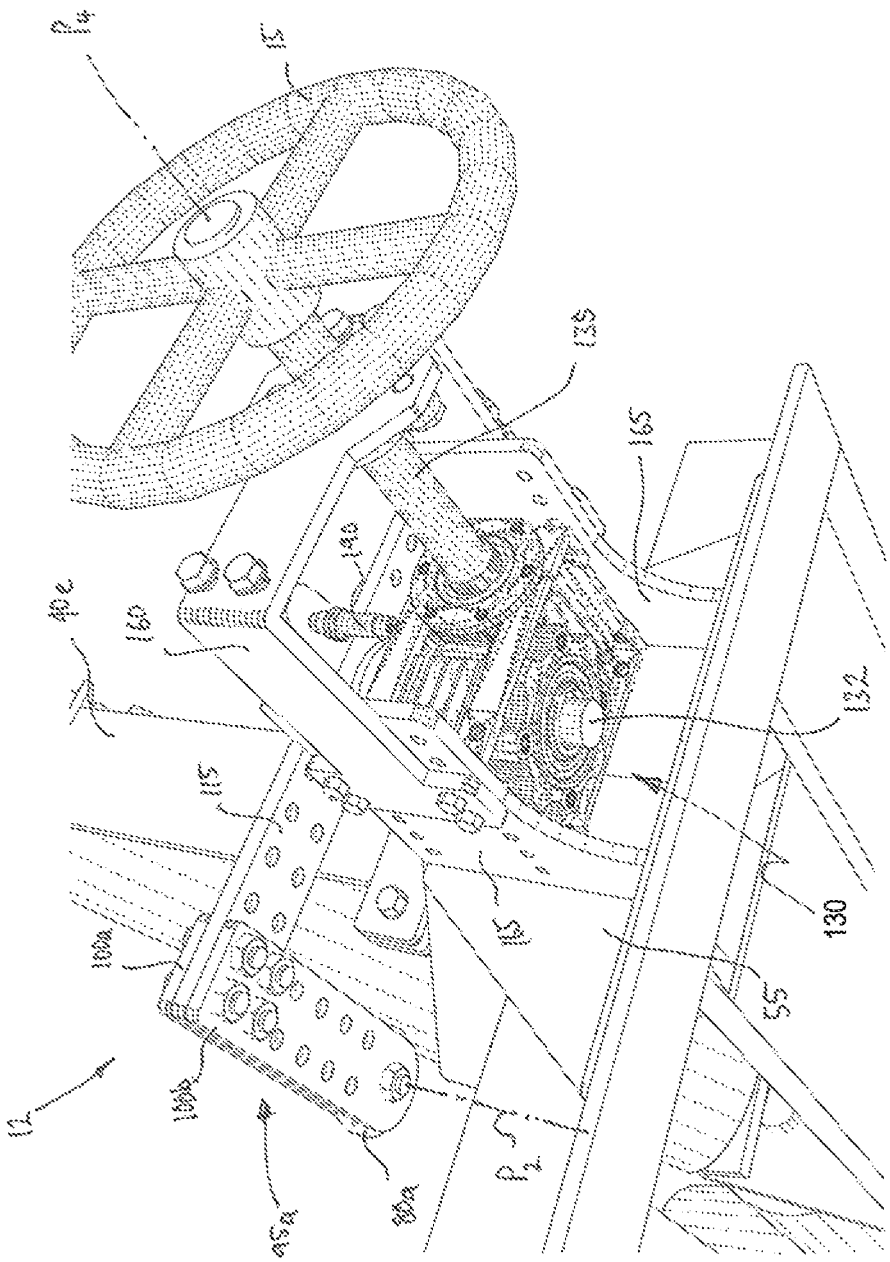
FIG. 18 shows another perspective view of the embodiment of the arrangement shown in FIG. 1B (with guard removed)
Figure 19:
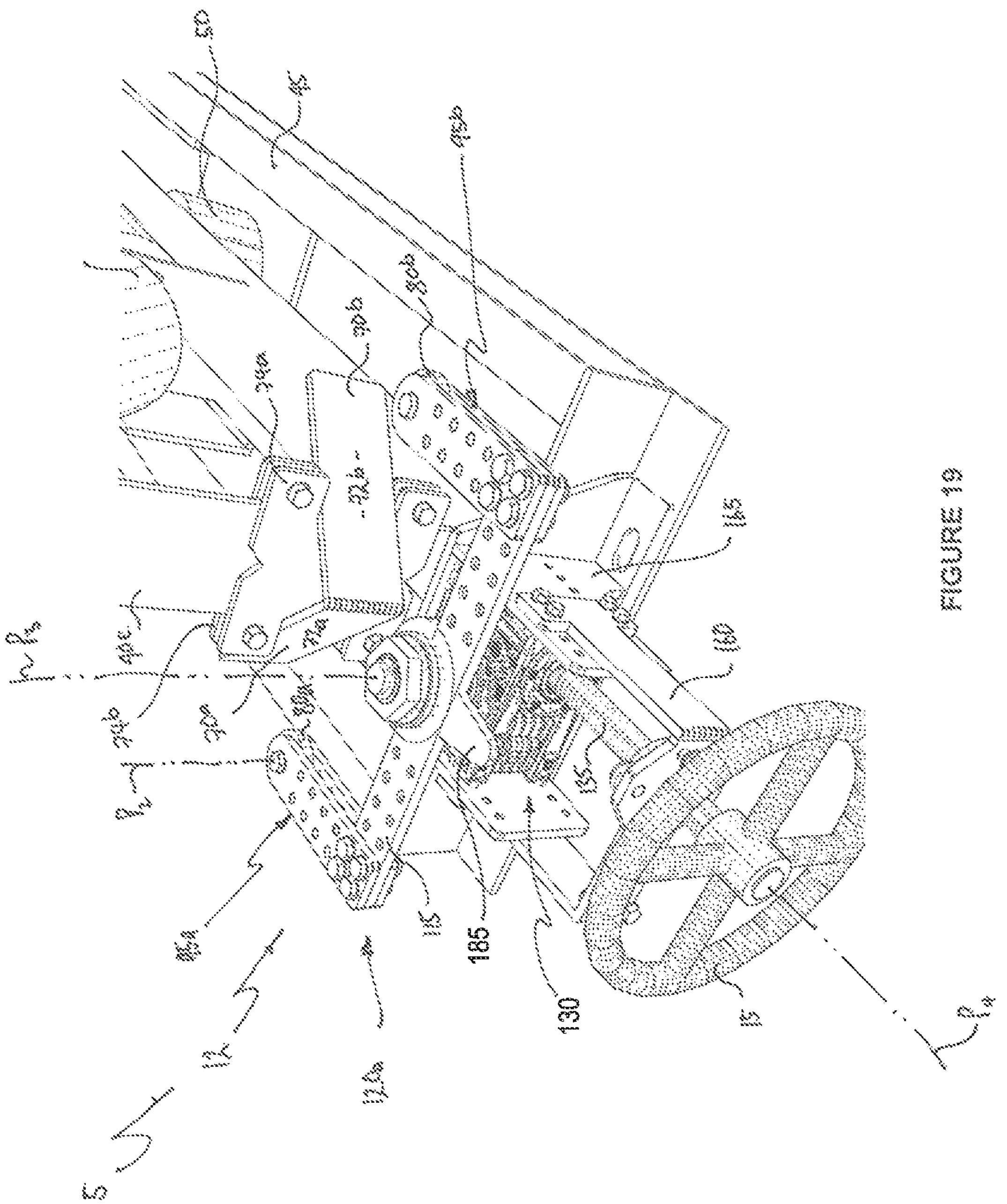
FIG. 19 shows a perspective view of embodiment of the arrangement shown in FIG. 1 (with guard removed)

With reference to FIG. 6, the reaction assembly 60 is comprised of reaction elements or reaction plates 70*a*, 70*b* (of generally planar form of uniform cross-section) arranged so as to provide respective faces capable of being interacted with or contacted by interacting disks 80*a*, 80*b* held in spaced relation by the actuator interface assembly 12. The relative position or alignment of the reaction plates 70*a*, 70*b* is such that respective planar surfaces 72*a*, 72*b* of each can be contacted by corresponding/respective adjacent interacting disks 80*a*, 80*b* when brought into engagement therewith (in a manner to be discussed below). Thus, reaction plates 70*a* and 70*b* are each positioned so as to correspond generally with the position of a respective interacting disk 80*a*, 80*b* for engagement purposes. Both of interacting disks 80*a*, 80*b* are provided in the form of a generally disc shaped element or body. In the form shown in FIGS. 14 and 16, the reaction plates 70*a*, 70*b* are assembled so as to be provided in angled relation relative one another, such angled configuration providing an apex that runs generally vertically and central of the tracking frame 25 (for example, the edge formed by the apex running substantially intermediate of the upstream and downstream sides of the tracking frame 25 and pointing away from the tracking frame 25). In an alternative embodiment 5' shown in FIG. 22B, the reaction plates 70*a*', 70*b*' (of reaction assembly 60') are assembled so as to be in spaced relation relative each other, with each aligned so as to be substantially parallel with each other in extending substantially parallel with the upstream/downstream sides of the tracking frame 25 as shown.

It will be appreciated that the function served by the reaction plates 70*a*, 70*b* of the reaction assembly 60 may also be provided by existing portion(s) or region(s) of the tracking frame 25, and therefore part of the tracking frame. However, use of the reaction assembly 60 serves to enable any existing tracking frame 25 to avail of the advantage of the arrangement 5 in that the reaction assembly can be readily retrofitted/mounted with the tracking frame 25.

The reaction plates 70*a*, 70*b* are both provided within cut-out regions 73 of clamp plates 74*a*, 74*b* which are attached (for example, clamped using nut/blot fastening assemblies) at or near an end of element 40*e*. The skilled reader would appreciate other ways of mounting reaction plates 70*a*, 70*b* to element 40*e* (or alternate structure of a tracking frame allowing for similar functionality, eg. as shown in FIG. 22B).

Interaction/contact of the interacting disks 80*a*, 80*b* with corresponding surfaces 72*a*, 72*b* of the reaction plates 70*a*, 70*b* occurs, broadly, by way of the rotation of the actuator interface assembly 12. As clearly shown in at least FIGS. 6 to FIG. 8, the actuator interface assembly 12 is configured so as to support the interacting disks 80*a*, 80*b* in a spaced apart relationship from one another, and from the reaction plates 70*a*, 70*b* (of the reaction assembly 60). The actuator interface assembly 12 comprises first 95*a* and second 95*b* projecting or arm portions (or adjustment arms) which respectively support the interacting disks 80*a*, 80*b* in spaced relation via a body of the actuator interface assembly 12 that is provided in the form of a spreader element or cross bar 115. The first, second arm portions 95*a*, 95*b* are each respectively comprised of a pair of spaced apart elongate elements 100*a* (upper positioned element), 100*b* (lower positioned element) that, at a first end thereof 105, embrace or capture a respective interacting portion (80*a*, 80*b*) in a manner allowing the relevant interacting disk 80*a*, 80*b* freedom to rotate about respective axes $P_1$, $P_2$ (by way of respective nut-bolt assemblies $N_B$, although other types of arrangements could be used), and, at a second end 107, connects the respective elongate elements to the spreader element or cross bar 115 (being provided in the form of an elongate element of uniform cross-section) at opposite ends 120*a*, 120*b* thereof (in a rigid manner using nut-bolt fastening assemblies $N_B$). Rotation of the interacting disks 80*a*, 80*b* about respective axes $P_1$, $P_2$ facilitates rolling contact with their corresponding reaction plates 70*a*, 70*b* as the actuator interface assembly 12 moves relative to the tracking frame 25 during an adjustment thereof (as will be described below).

The spacing of the projecting arm portions 95*a*, 95*b* of the actuator interface assembly 12 is configured so as to allow the tracking frame 25 sufficient freedom to pivot/move within the spatial region between the projecting arm portions 95*a*, 95*b* as required for its normal operation without interference (from the projecting arm portions 95*a*, 95*b*) when the arrangement 5 is positioned in a generally ‘central’ or ‘neutral’ position/condition (as shown in FIGS. 2, 3, 4, 6, and 7) in which no adjustment of the tracking frame 25 by the arrangement is undertaken (or required on the basis that the tracking frame is functioning normally). In this neutral position/condition, and as the skilled reader would readily understand, the tracking frame 25 is able to function, to the extent possible, to self-correct any belt misalignment as needed due to its ability to pivot/rotate about the axis X. Accordingly, an advantage of embodiments of the arrangement 5 is its ability to be used in undertaking an adjustment operation of the tracking frame 25 (for example, to help correct a conveyor belt misalignment due to a worn pulley or roller component) when needed, and, when the arrangement is not required, sit idle in its ‘neutral’ position/condition without offering any interference (for example, by way of the actuator interface assembly) with the usual operation of the tracking frame 25 (ie. providing sufficient freedom for it to operate in its usual manner).

Provided generally central of the length of the cross bar 115 is componentry configured so as to allow the actuator interface assembly 12 to pivot about axis $P_3$. Rotation/pivoting of the actuator interface assembly 12 so as to interact with the reaction assembly 60 is by way of the actuator interface assembly 12 being provided in operable association with a clutch module 166 (discussed below) which is in operable association with an output shaft 132 (which is rotatable about axis $P_3$), which is operable with the gearbox assembly 130 (shown in FIG. 18). The gearbox assembly 130 is arranged in operable association with the handwheel 15 via an input shaft 135 which is rotatable about axis $P_4$. Broadly, the gearbox assembly 130 is operably associated with the actuator interface assembly 12 (via the clutch module 166 as described below) so as to transfer drive from the input shaft 135 (following operation of the handwheel 15 by a user) to the actuator interface assembly 12 for causing adjustment of the tracking frame 25 by way of interaction of the actuator interface assembly 12 with the reaction assembly 60.

Figure 20:
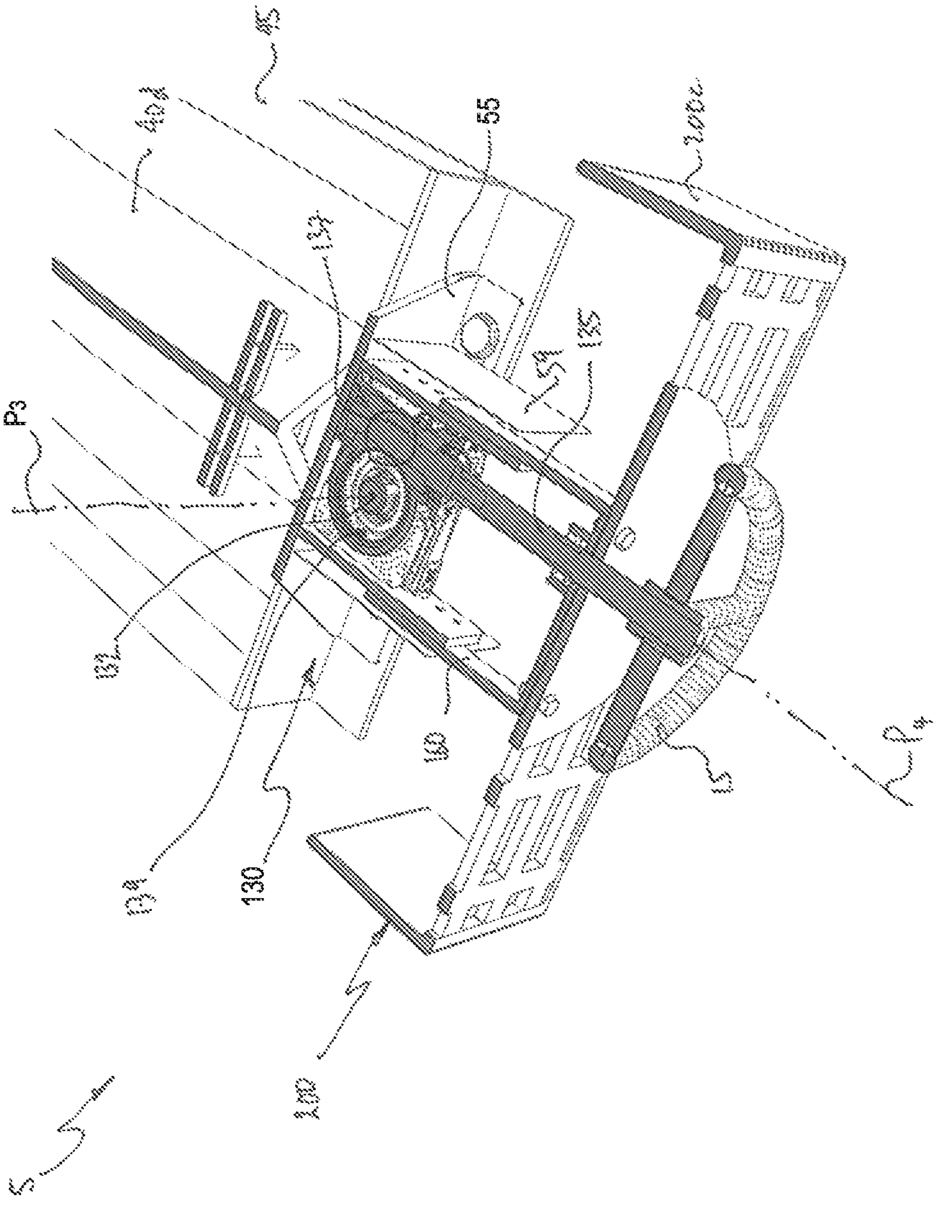
FIG. 20 shows a perspective sectioned view of the embodiment of the arrangement shown in FIG. 1B, when sectioned through a plane passing through the axis $P_4$ of the input shaft (135)

The gearbox assembly 130 is configured so as to provide portions of the output 132 and input 135 shafts in meshed engagement by way of a worm drive portion 137 provided with the input shaft 135 (for example, a helical like feature extending along a portion of the input shaft 135, as shown in FIG. 20) and a worm gear portion 139 provided with or carried by the output shaft 132 (as shown in FIG. 21) so that the output shaft 132 moves/rotates in response to movement or rotation of the input shaft 135 (which is, as noted, actuated manually by a user/operator in the present embodiment). Thus, in the form shown in the Figures, the gearbox assembly 130 is provided in the form of a worm drive/gear arrangement whereby the input 132 and output 135 shafts are provided in orthogonal relation to one another and each shaft having appropriate meshable formations which, when in meshed engagement, operate to transfer movement/torque from the input shaft 135 to the output shaft 132. As the skilled reader will appreciate, provided that the coefficient of friction between the worm gear portion 139 and the worm drive portion 137 is larger than a tangent of the worm drive’s lead angle, the worm gear portion 139 will operate to substantially self-lock thereby preventing transmission or torque from the output shaft 132 to the input shaft 135—effectively providing a uni-directional transmission arrangement. Thus, the transmission assembly 8 seeks to prevent torque loading that might be experienced by the output shaft 132 being transferred or communicated through to the input shaft 135. The uni-directional nature of the transmission of movement/torque from the input shaft 132 for supply to the output shaft 135 is by way of the meshed engagement between the worm gear 139 and worm drive 137 portions.

The gearbox assembly 130 is suitably configured so as to provide a 40 to 1 reduction in torque between the output 132, input 135 shafts, ie. in this manner, actuation of the input shaft 135 via the gearbox assembly 130 serves to provide a 40 fold increase in torque to the actuator interface assembly 12—such increase in torque assisting in allowing a user of the arrangement 5 in manually addressing what could be significant loadings placed on the tracking frame 25 when seeking to pivot the tracking frame 25 during operation (of the conveyor belt assembly).

While a 40 to 1 reduction arrangement is exemplified in the embodiment described herein, the skilled reader will appreciate that other ratios could be used depending on the circumstances to hand. The skilled reader would readily appreciate the internal components of a suitable gearbox assembly and no further detail/description is required herein. For example, the configuration of the worm gear portion 139 (provided with the output shaft 132) and worm drive portion 137 of the input shaft 135 can be configured as appropriate to provide the required gearing ratio.

Figure 4:
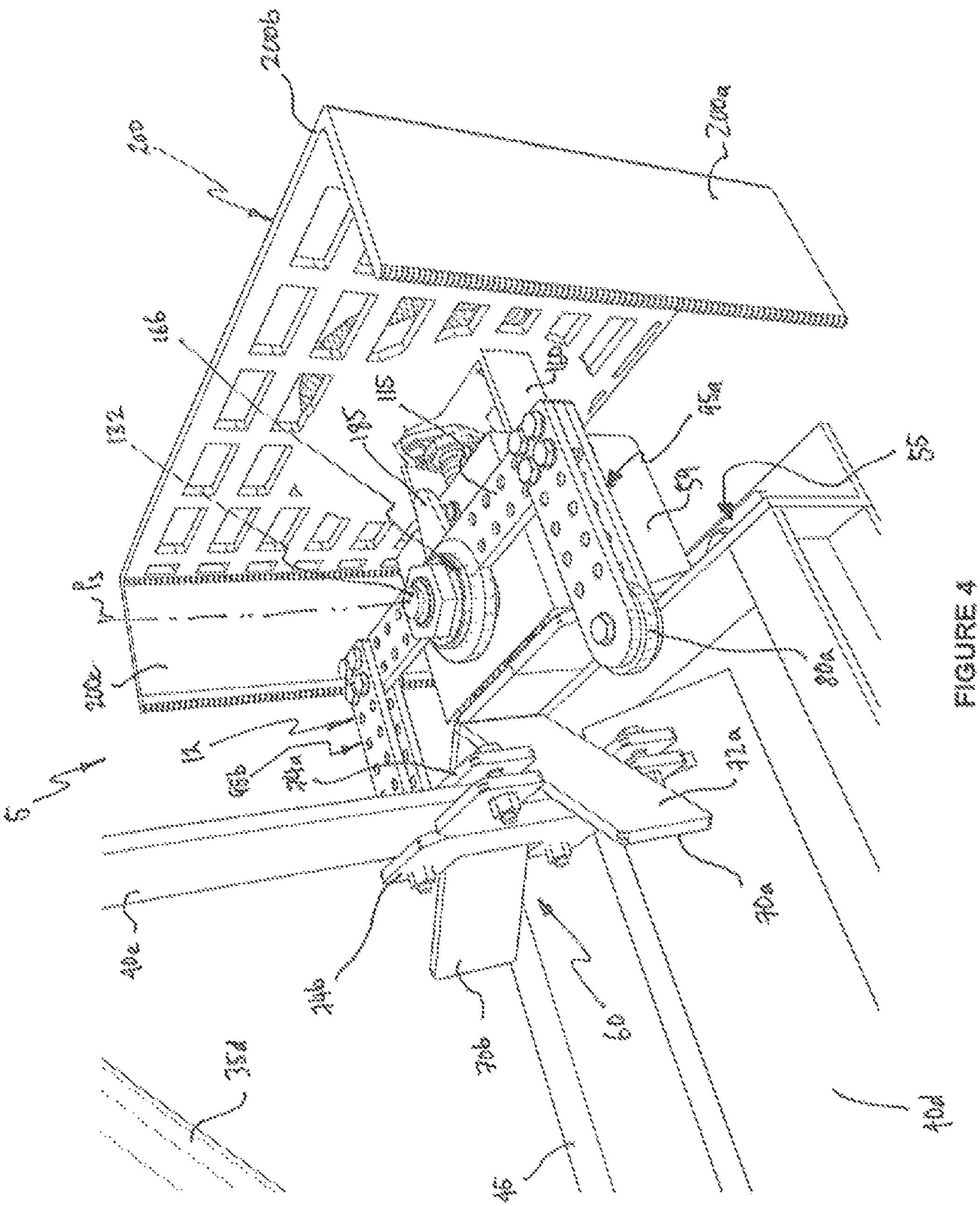
FIG. 4 shows another perspective view of the embodiment shown in FIG. 1B.
Figure 5:
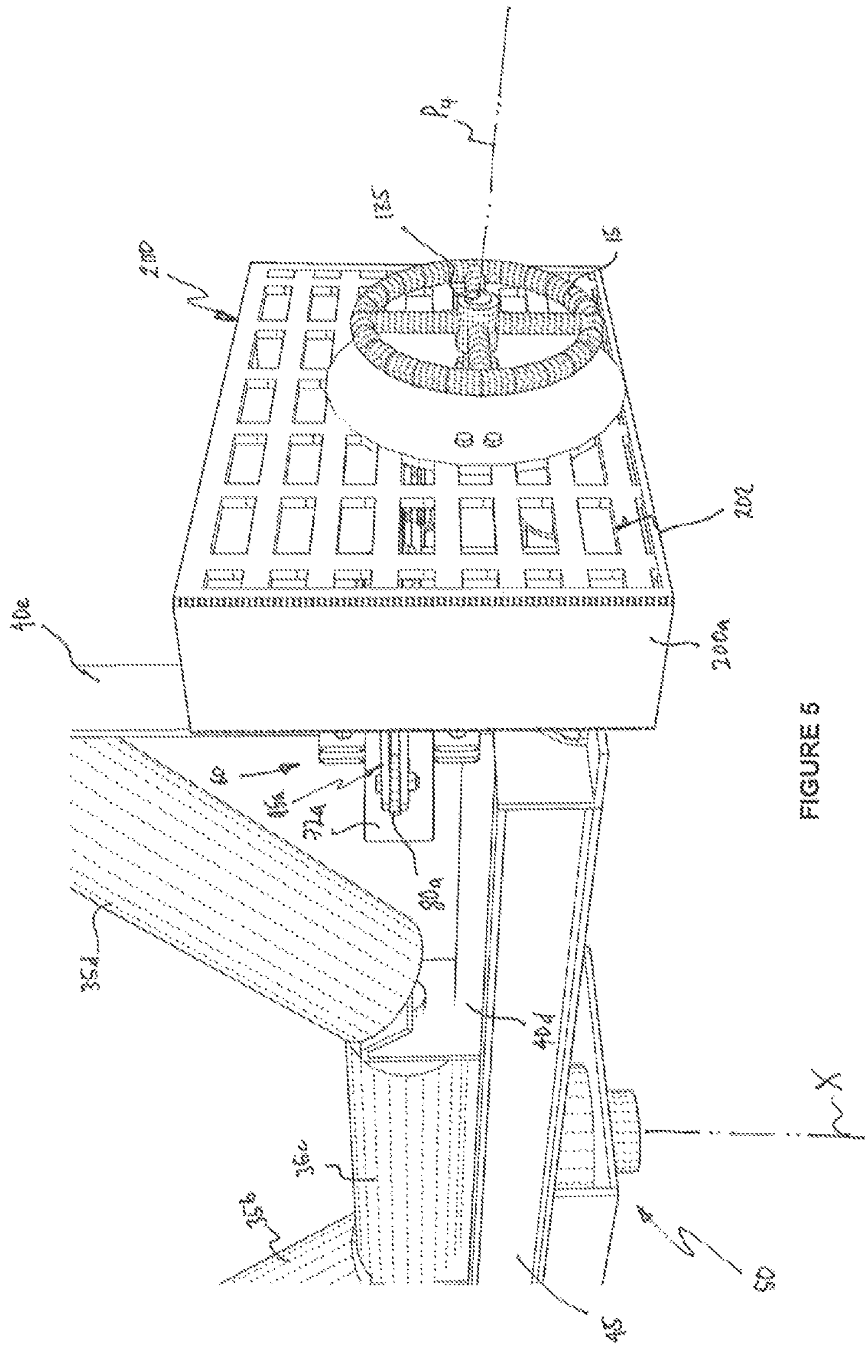
FIG. 5 shows another perspective view of the embodiment shown in FIG. 1B.

As shown in FIG. 4, a housing 59 is provided for providing a cover to the gearbox assembly 130.

As noted, actuation of the input shaft 135 is achieved by way of a user or operator manually moving the handwheel 15 (which is rigidly connected to a terminal end of the input shaft 135 as clearly shown in the Figures) in a direction of rotation as required; clockwise or counterclockwise, depending on which side of the frame structure 45 the tracking frame 25 is to be moved to or toward (which influences which side of the conveyor belt assembly the conveyor belt 11 is to move toward, as noted below). In the form shown throughout the Figures, the handwheel 15 is (safely) spaced from the gearbox assembly 130 by way of a bracket assembly 160 formed of a generally 'U' shape, itself connected to a mount body 165 of the mount assembly 55 (this being connected to an end portion or region of the base structure 45).

Consistent with the advantage of the arrangement 5 allowing a user/operator to safely adjust the position, orientation, or alignment of the tracking frame 25 at a safe distance, the handwheel 15 is spaced at an acceptable safe distance from the main functional components of the arrangement 5, namely, the gearbox 130 and the actuator interface assembly 12 (which moves into and out of engagement with the tracking frame 25). Thus, as will be clear from the relevant Figures, the length of the input shaft 135 can be varied (extended or shortened from that shown) as might be required to ensure that the handwheel 15 is spaced safely from the main functional components of the arrangement 5. The skilled reader will appreciate that structure for rotatably supporting the input shaft 135 may be configured as appropriate to account for the ultimate length of the input shaft 135 (for example, use/incorporation of additional bearing supports to accommodate extended shaft lengths which might be required to meet relevant regulatory requirements and the like).

It will be appreciated that embodiments could be configured so that the handwheel 15 is arranged and or configured so as to be actuated by way of a further mechanical or automated means, by way of, for example, electric (or otherwise) motors, stepper motors, servos and the like. As noted above, embodiments involving electric motors, stepper motors, servos and the like may be configured so as to allow for remote actuation by a user/operator when at a location remote from the relevant conveyor belt assembly. In this regard, such electric motors, stepper motors, servos and the like may be configured so as to be controlled by way of a suitable overarching control system or network allowing for the appropriate communications for facilitating remote control of the electric motors, stepper motors, servos and the like.

The arrangement 5 is provided with a sensing assembly 180 (shown in FIG. 7) for allowing a determination to be made as to whether the actuator interface assembly 12 is in a 'center' or 'neutral' position, or otherwise. As part of the sensing assembly 180, the actuator interface assembly 12 comprises a tab portion 185 which extends or projects from a generally central region of the cross bar 115. The sensing assembly 180 further comprises a proximity sensor, provided in the form of a proximity switch 190, which is mounted to a portion of the mounting assembly 55 in a manner that allows a portion of the proximity switch 190 to detect the tab portion 185 when the tab portion 185 is within a proximity of the proximity switch 190. Movement of the actuator interface assembly 12 inherently causes a movement of the tab portion 185 thereby causing it to move away or toward the proximity switch 190. The proximity switch 190 is configured so as to detect the presence of the tab portion 185 when in a known range or proximity of the switch. Thus, in this manner, in the configuration shown, the proximity switch 190 is positioned relative to the tab portion 185 so as register the proximity of the tab portion 185 when the actuator interface assembly 12 is in a central or 'neutral' position—which corresponds to the tracking frame 25 being in a 'neutral' position (which is aligned substantially orthogonal to the direction of movement of the conveyor belt 11) in which it has no influence (or offers no affirmative adjustment function, or no interference) of the position of the tracking frame 25 and allows the tracking frame freedom to operate in its usual manner.

The arrangement 5 is further configured so that the sensing assembly 180 registers an event where the tab portion 185 moves out of proximity of the proximity switch 190. In such cases, the time such an event occurs is logged in an appropriate manner so as to record when an adjustment of the tracking frame was made. Logging/recording of such an event could be carried out in a number of ways which may include, for example, by way of a note pad, electronic portable device etc.

The proximity switch 190 can be wired up to, for example, an overarching control system (for example, the Citect mine control system) or control network. In this manner, for example, using the Citect mine control system, it is possible to configure/use the proximity switch 190 to undertake a number of activities which may include (non-exhaustively), for example, logging of a date/time, create a warning, start a timer, send an email, or undertake any form of logging (or monitoring/notification setting) that can serve as a reminder so as to reduce or avoid a risk that any adjustment made to the tracking frame 25 is not forgotten.

Other variations in sensing the position or movement of the actuator interface assembly 12 may be possible and are to be included within the scope of the principles described herein. For example, in one possible arrangement, the sensor modules comprise one or more proximity switches, image capture devices (such as for example, cameras) arranged so as to capture/record images of the belt 11. In one form, static or moving images may be captured. In one arrangement, one or more of the static or video images may be processed (by way of, for example, image processing techniques) so as to determine a position and/or movement of the belt. The skilled reader would appreciate that information/data from such image capture devices could be readily communicated to an overarching controller for use in assisting in the monitoring/management of the relevant tracking frame and associated conveyor belt. Of course, such information/data could serve as an input for software or programming instructions directed to conferring autonomous control/operation of the tracking frames (and indeed, the or each relevant conveyor belt assembly). In this manner, one or more conveyor belt assemblies could be monitored/controlled and/or operated (manually or otherwise) from a centralized location, whether this location be local to one of the conveyor belt assemblies, or remote from all of the conveyor belt assemblies. As noted above, any sensing means or sensing module (proximity or otherwise) employed can be configured so as to be in communication (hardwired or wireless) with one or more control systems (such as for example, the Citect mine control system) operable with the conveyor belt assembly for monitoring purposes (and indeed, remote control purposes) for event logging and the like.

As noted above, the arrangement 5 comprises a clutch device, provided in the present embodiment, in the form of a torque limiter module 166 (for example, one such module may exemplify a 1.70 DF T3 torque limiter module provided by CominTec), arranged between the output shaft 132 and the actuator interface assembly 12 so as to seek to mitigate against high loads, forces, or torques experienced by the tracking frame 25 being transferred to the gearbox assembly 130 (via contact between the reaction plates 70*a*, 70*b* of the reaction assembly 60 and the interacting disks 80*a*, 80*b* of the actuator interface assembly 12), and which may have the potential to cause significant damage to the componentry (and, indeed, a human operator of the arrangement 5).

The torque limiter module 166 is operable by way of a torque adjustment nut 167 so as to allow the torque that can be applied to the drive shaft 132 to be adjusted as required, thereby allowing a threshold torque level to be set as appropriate. For example, should the actuator interface assembly 12 become subject to or experience a torque level above a desired (and set) torque threshold, the torque limiter module 166 will operate to disrupt the transmission of such torque to the output shaft 132, thereby allowing the actuator interface assembly 12 to, in effect, slip about the output shaft 132. Furthermore, the torque limiter module 166 is also configured so as to avoid the torque adjustment nut 167 being manipulated by a user/operator so as to be overtightened. In this manner, such limit in adjustability serves to assist in preventing the arrangement being placed in a state or condition that could cause damage to any of the components in the arrangement.

In the form of the arrangement 5 shown, a guard 200 is spaced from the handwheel 15 so as to offer some form of protection to the user (for example, the user's hands, arms, torso as obvious examples) when operating the handwheel. In the embodiment shown, the guard 200 is supported by the mount body 165 using a number of fastening assemblies (nut/bolt arrangements as shown in the Figures) so as to be capable of being removed (for example, for general maintenance purposes). The guard 200 is formed of three general panel portions 200*a*, 200*b*, 200*c*, panel portion 200*b* being provided intermediate and in orthogonal relation to spaced apart side panel portions 200*a*, 200*c*. The dimensioning of each of the panel portions may be varied as circumstances may require. Any of the panel portions may be provided with cut-out or aperture 202 like features (refers FIG. 4 to FIG. 6) so as to, in at least one respect, facilitate ease of visibility of the various working componentry (for example, shafts 132, 135, gearbox assembly 130) of the arrangement 5 when operating the handwheel 15 in a safe manner.

Operation

For operational/use purposes, embodiments of the arrangement 5 are intended for installation (for example, as a retrofit install/assembly) on any number of existing tracking frames of a conveyor belt assembly or system.

Figure 23:
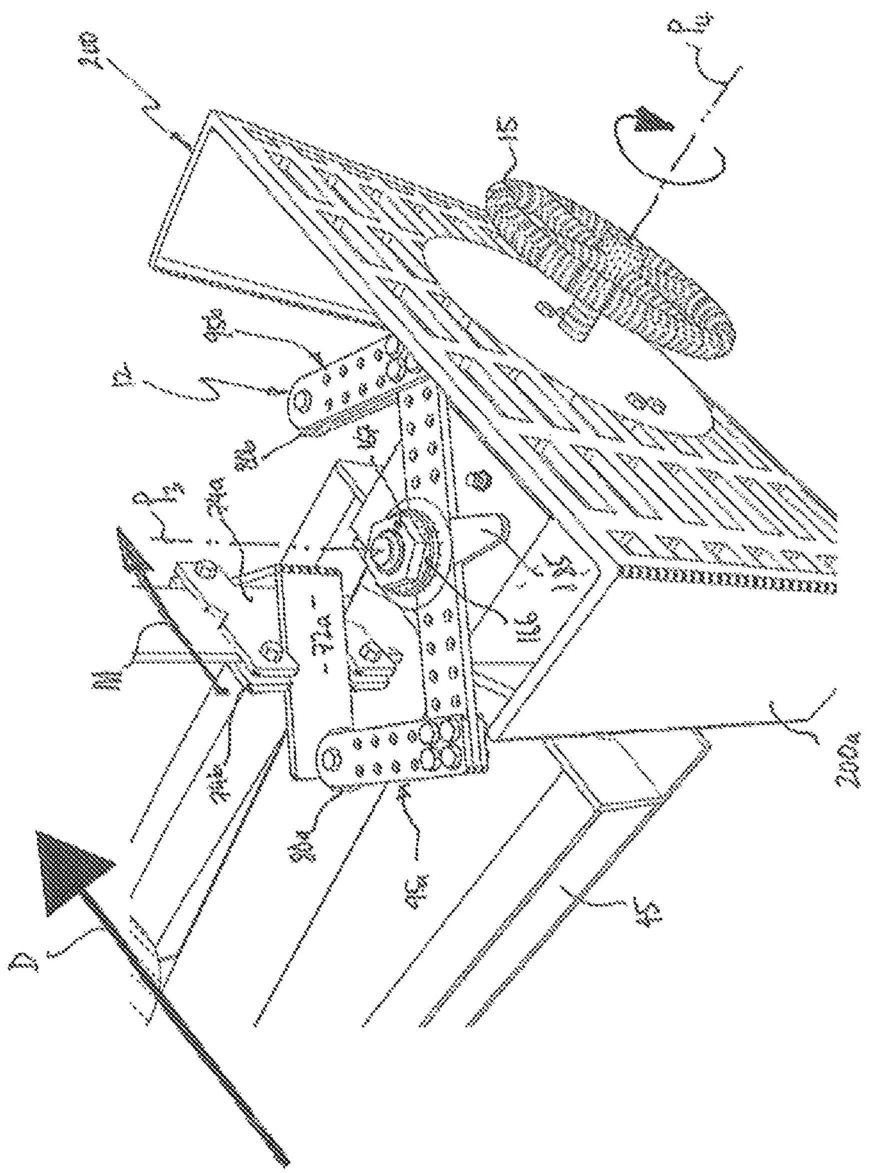
FIG. 23 shows another perspective view of the embodiment of the arrangement shown in FIG. 1B, showing the arrangement in a second condition (for example, a generally counter-clockwise biased alignment, relative to the axis about which the shown tracking frame assembly pivots)
Figure 24:
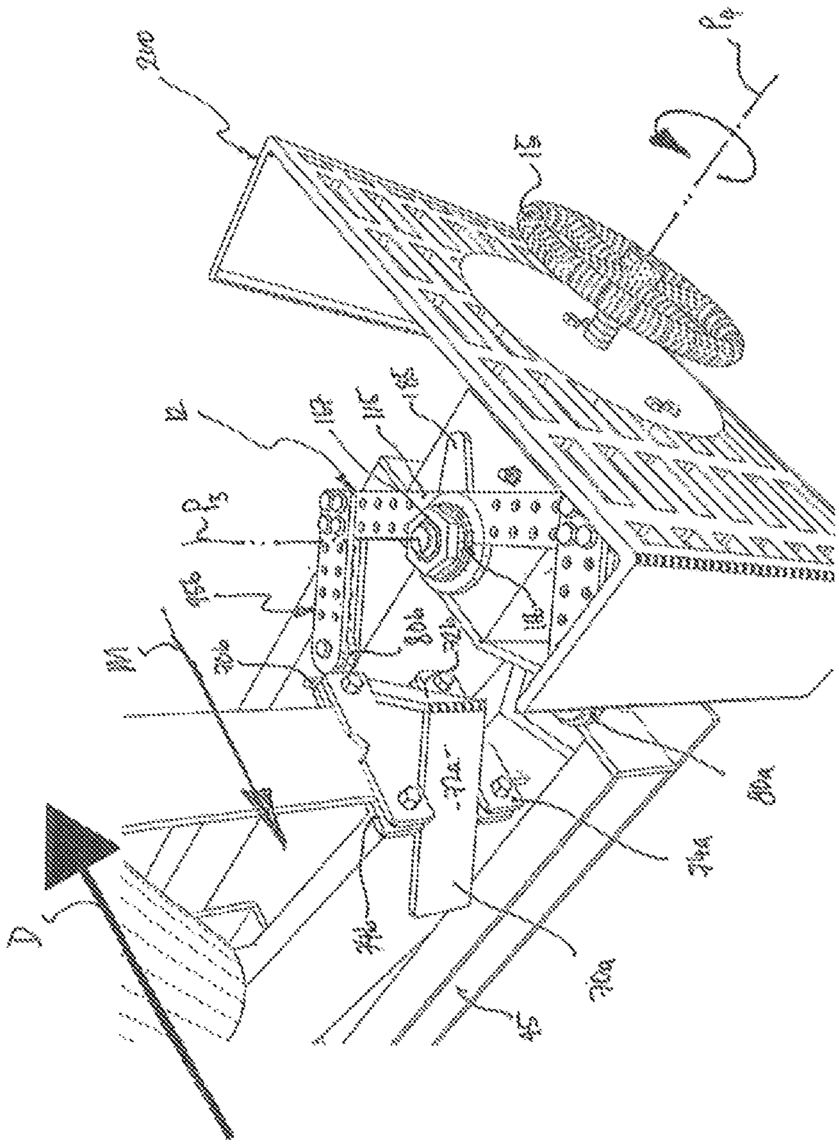
FIG. 24 shows another perspective view of the embodiment of the arrangement shown in FIG. 1B, showing the arrangement in a third condition (for example, a generally clockwise biased alignment, relative to the axis about which the shown tracking frame assembly pivots)

Reference is now made to FIG. 22A (showing the arrangement 5 in a first condition (eg. a generally 'neutral' condition)), FIG. 23 (showing the arrangement 5 in a second condition (for example, a generally counter-clockwise biased alignment, relative to the axis X about which the shown tracking frame 25 pivots), and FIG. 24 (showing the arrangement 5 in a third condition (for example, a generally clockwise biased alignment, relative to the axis X about which the shown tracking frame 25 pivots).

During operation, if it is observed that the conveyor belt 11 has departed from its preferred alignment, consideration is initially given to the adjustment necessary for facilitating realignment of the belt. An outcome of such consideration, broadly, is the identification of an appropriate tracking frame 25 having an arrangement 5 associated therewith allowing adjustment for the purpose of provoking a realignment of the conveyor belt. Consideration will also be given to determining the nature of the adjustment needed—whether this is to rotate or pivot the relevant end (that being proximal or adjacent of the actuator interface assembly 12) of the relevant tracking frame 25 toward either the upstream or downstream direction (relative to the moving conveyor belt 11).

An authorised user/operator then attends to the appropriate arrangement 5 and operates the handwheel 15 so as to rotate it (about axis $P_4$) in either the clockwise or counter-clockwise direction depending on the positional adjustment needed for the subject tracking frame 25.

For example, when the tracking frame 25 is not prejudiced in any direction about axis X, the condition or state of the tracking frame 25 and the arrangement 5 is generally that as shown in FIG. 22A, ie. the actuator interface assembly offering no interference with the tracking frame 25.

When the handwheel 15 is rotated in the clockwise direction, the condition or state of the tracking frame 25 and the arrangement 5 is generally that shown in FIG. 23. As shown in FIG. 23, movement of the tracking frame 25 is caused by contact (or interaction) occurring between the interacting disk 80*a* and its corresponding reaction plate 70*a* (specifically, its surface 72*a*), the result of which pivots the tracking frame 25 downstream as denoted by arrow M (assuming the conveyor belt 11 is moving in the general direction from the lower left hand corner of the page to the upper right hand corner of the page—shown generally by arrow D). In this manner, the tracking frame 25 is adjusted so as to apply (by way of any of the supporting rollers, 35*a* to 35*d*) appropriate pressure(s) to various portion(s)/region(s) of the conveyor belt (which serves to modify the frictional contact/engagement therebetween) so as to encourage its general alignment toward the centre of the tracking frame 25 (or so as to encourage the conveyor belt to track toward the left relative to the running direction D of the conveyor belt).

When the handwheel 15 is rotated in the counterclockwise direction, the condition or state of the tracking frame 25 and the arrangement 5 is generally that shown in FIG. 24. As shown in FIG. 24, movement of the tracking frame 25 is caused by contact (or interaction) occurring between the interacting disk 80*b* and its corresponding reaction plate 70*b* (specifically, its surface 72*b*), the result of which pivots the tracking frame 25 upstream as denoted by arrow M (assuming the conveyor belt is moving in the general direction from the lower left hand corner of the page to the upper right hand corner of the page—shown generally by arrow D). In this manner, the tracking frame 25 is adjusted so as to apply, by way of any of the supporting rollers (35*a* to 35*d*) appropriate pressure to various portion(s)/region(s) of the conveyor belt (which serves to modify the frictional contact/engagement therebetween) so as to encourage its general realignment toward the centre of the tracking frame 25 (or so as to encourage the conveyor belt to track toward the right relative to the running direction D of the conveyor belt).

In both cases of adjustment, interaction between the interacting disks 80*a*, 80*b* and respective surfaces 72*a*, 72*b* of respective reaction plates 70*a*, 70*b* is by physical contact. Generally, such contact could be rolling contact of the interacting disks 80*a*, 80*b* along portions of the respective corresponding surfaces 72*a*, 72*b* as the actuator interface assembly 12 and the tracking frame 25 move relative to each during an adjustment. It is for at least this reason that each of the interacting disks 80*a*, 80*b* are configured so as to be capable of rotation about respective axes $P_1$, $P_2$. In this manner, any adverse (resistive, frictional, wearing) contact between the actuator interface assembly 12 and the reaction plates 70*a*, 70*b* can be reduced thereby seeking to avoid issues which may require inadvertent maintenance (which could require ceasing of the operation of the conveyor belt assembly).

Once the required adjustment is made, the arrangement 5 can be left in its last adjusted state so as to allow time for the conveyor belt 11 to track as required. If present, a locking means or appropriate device/arrangement may be activated so as to prevent movement of the handwheel 15 and/or input shaft 135—thereby preventing any inadvertent movement/ adjustment of the tracking frame 25 operating to inadvertently modify or adjust the actuator interface assembly 12 form its intended adjusted position. Any adjustment is generally held in place by the arrangement 5 until the cause of the misalignment can be resolved (usually at the next scheduled maintenance shutdown event).

In view of the generally constrained direction of transmission allowed for by the gearbox assembly 130 (ie. input via the handwheel 15 and output to the actuator interface assembly 12 via the output shaft 132), transmission is unable to transfer in the reverse manner, ie. forces imparted to the actuator interface assembly 12 by the tracking frame 25 are unable to transfer back through to the handwheel 15. As noted, this configuration provides for safe use of the arrangement 5 by a user (at a safe distance from the tracking frame 25 and the operating conveyor assembly).

As noted above, while the arrangement 5 is configured to allow the transmission of drive in only one direction, incorporation of the torque limiter module 166 prevents torques above a predetermined threshold limit being experienced by the gearbox assembly 130, thereby seeking to avoid damage thereto. Thus, when any adjustment is made to the tracking frame 25 and the arrangement 5 left unattended subsequently, incorporation of the torque limiter module 166 seeks to ensure that the arrangement 5 will not be damaged in the event the tracking frame 25 is subject to inadvertent loading during operation (which will then be transferred to the actuator interface assembly 12 due to contact between the interacting disks 80*a*, 80*b* and the corresponding reaction plates 70*a*, 70*b*).

In one commercial form, the principles of the arrangement described herein are exemplified in the form of an adjustment system involving a mechanical adjustment tool (5) for making manual adjustments to the position, orientation, alignment (eg. angle relative to the conveyor belt operation) of an existing tracking frame to which the mechanical adjustment tool is operably associated with. As will be well understood from the above, the purpose of operation of the mechanical adjustment tool includes at least the following: to help keep the conveyor belt track/run correctly, to test the functionality of the tracking frame, and to rotate the tracking frame (25) to free it up from debris and spilt product.

The unique design of the mechanical adjustment tool of the system allows the user to make these adjustments to the tracking frame (25) from a safe distance. In one form, the mechanical adjustment tool (5) features a guard (200) that is provided between the user and the mechanical workings of the tool (5) as well as the associated rotating equipment of the conveyor tracking frame (25).

As also discussed above, another key element in keeping the operator safe while using the mechanical adjustment tool (5) is the provision of the worm drive style gearbox (130). The unique design of the worm drive gearbox (130) means that any movement, load, force, or torque can only be applied in one direction through the system (or tool (5)). As such, any movement, load, force, or torque can be applied though the handwheel (15) and out through the rotating assembly (12) to apply an adjustment force or load to the relevant tracking frame (25). Movement, load, force, or torque, however, cannot be applied from the tracking frame (25) through the rotating/operable worm drive gearbox assembly (130) and back through to the handwheel (15). This functionality is, in one form, advantageous for keeping the (human) operator safe while making adjustments as there is no chance (or very little substantive risk) of uncontrolled movement of the handwheel (15).

In one form, the worm drive gearbox (130) features a 40/1 gear reduction (which gear reduction can be varied as appropriate) meaning that operation of the system is easy for any user, even with large conveyor belts and tracking frames (25). To save the system from mechanical over load, which can be potentially damaging to the relevant tracking frame (25) or the mechanical adjustment tool (5), an adjustable torque limiting device (166) is provided operable with the output shaft (132). In this manner, the configuration of the adjustable torque limiting device (160) allows a torque value to be set on the system (in one form, up to 210 nm) well below a load or force that could potentially damage the tracking frame (25) or mechanical adjustment tool (5).

In order to record when an adjustment has been made to a relevant tracking frame (25) an "in position proximity switch" (190) is provided that serves to pick up on a proximity tab (185) when the system is in a center position (shown in FIG. 22A) and having no effect on the tracking frame (25). When the handwheel (15) is operated the proximity tab (185) moves off the proximity switch (190) and a time (for example, a timestamp) is logged which corresponds to when an adjustment was made. This logging event/activity is to ensure the adjustment is not forgotten and inadvertently left on unwarranted. As noted above, the proximity switch (190) can be wired up to an overarching control system (for example, the Citect mine control system). In this manner, for example, using the Citect mine control system, it is possible to configure/use the proximity switch (190) to undertake a number of activities which may include (non-exhaustively), for example, logging of a date/ time, create a warning, start a timer, send an email, or undertake any form of logging (or monitoring/notification setting) that can serve as a reminder so as to reduce or avoid a risk that any adjustment made to the tracking frame (25) is not forgotten.

In operation, consistent with the above description, when an operator either observes poor belt tracking, is called to a conveyor belt assembly after an alarm is signaled, or wants to free up or test the functionality of a tracking frame (25), they operate the handwheel (15) in (i) a clock wise direction so as to track the conveyor belt left (as shown in FIG. 23), or (ii) an anti-clockwise direction to track the conveyor belt to the right (as shown in FIG. 24). In one form, adjustments can be incremental and undertaken while the conveyor is running to be able to determine (to the extent possible) the exact amount of tracking frame adjustment or articulation required to make the conveyor belt run substantially true, or begin to converge to an appropriate and/or acceptable alignment condition.

Once an adjustment is made the arrangement 5 remains in its adjusted position until a scheduled maintenance event occurs—at which time the cause of the underlying problem is resolved (for example, replacement of any worn componentry such as, for example, a worn pulley or roller component) while the conveyor assembly or system is shut down during a scheduled maintenance event. Once the required maintenance work is completed, the arrangement 5 is then returned to its 'neutral' position whereby the spacing (or spatial region) between the projecting arm portions 95*a*, 95*b* provides the (operable end of the) tracking frame 25 with sufficient freedom of movement to be able to operate according to its usual function without interference from the projecting arm portions 95*a*, 95*b*.

FIG. 22B shows a perspective view of an arrangement 5' configured in accordance with the arrangement 5, and consistent with the principles described herein. As such, the numbering of features shown and described above with respect to the arrangement 5 are retained for ease of comparison.

Like the arrangement 5, the arrangement 5' shown in FIG. 22B (shown in its neutral position) comprises a transmission assembly 8' (also provided in the form of a worm drive based reduction gearbox 130') arranged in operable association with tracking frame 25, and configured for receiving an input force via handle 15' and to supply an output force to an actuator interface assembly 12'. The actuator interface assembly 12' comprises spaced apart (and substantially parallel aligned) projecting arm portions 95*a*', 95*b*' which are each operable for selective interaction or engagement via respective contact portions 80*a*', 80*b*' with portions of a reaction assembly 60' fastened with the tracking frame 25. Of course, each of the contact portions 80*a*', 80*b*' could make direct contact (rolling or static) with respective sides of the tracking frame 25 absent provision of the reaction assembly 60'.

As clearly shown, each of the contact portions 80*a*', 80*b*' are capable of making direct contact (rolling or static) with respective or corresponding reactions plates 70*a*', 70*b*' (via respective planar surfaces 72*a*', 72*b*') of the reaction assembly 60' which is clamped to the support element 40*e*' of the tracking frame 25 using clamp plates 74*a*' and 74*b*' (which is provided in the form of a structural web-like plate member) using appropriate nut/bolt fasteners as shown. As with the arrangement 5, the spacing of the projecting arm portions 95*a*', 95*b*' is configured so as to allow the tracking frame 25 sufficient freedom to move within the spatial region between the projecting arm portions 95*a*', 95*b*' as required for its normal operation without interference (from the projecting arm portions 95*a*', 95*b*') when the arrangement 5' is positioned in its neutral position in which no adjustment of the tracking frame 25 by the arranged 5 is undertaken.

The skilled reader will appreciate that operation of the arrangement 5' is substantially the same as described above with regard to the arrangement 5.

Figure 33:
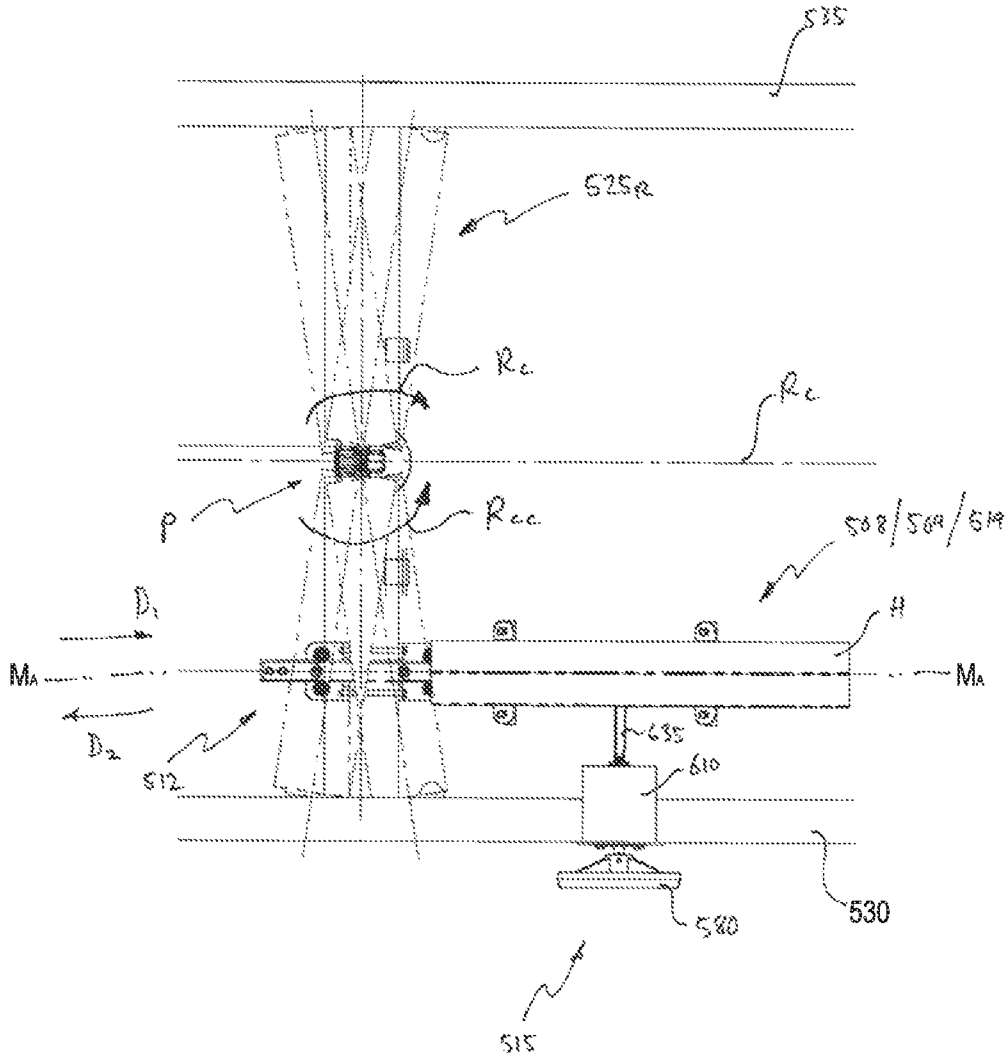
FIG. 33 shows a top down view of the embodiment shown in FIG. 25, showing the scope of movement or positional adjustment of the moveable support or tracking frame assembly enabled by way of the embodiment shown.

FIGS. 25 to 37 shows a further embodiment (500) of an arrangement involving the principles described herein, wherein a key difference as compared with the embodiment of the arrangements 5' described and shown in FIGS. 1 to 24 is the transmission assembly of the further embodiment (500) is configured so as to be of a hydraulic nature using a hydraulic actuation assembly 509 which operates in response to receiving an input force facilitated by way of an input receiving means or arrangement, provided in the form of a handle portion 580 of a handwheel assembly 515, and for supplying an appropriate output force for facilitating, by way of an actuator interface assembly 512, an adjustment of the position, alignment, or orientation of a portion or region of the tracking frame $\mathbf{525}_R$ (as generally shown in FIG. 33).

Accordingly, FIGS. 25 to 37 show an arrangement 500 for use with a conveyor belt assembly/assembly 510 having a tracking frame $\mathbf{525}_R$ operable for providing rolling support to a conveyor belt 511 (having 'carry' $\mathbf{511}_C$ and 'return' $\mathbf{511}_R$ sections). The conveyor belt assembly 510 comprises a plurality of support frame assemblies $\mathbf{525}_C$ (1×shown) associated with the carry section $\mathbf{511}_C$ of the conveyor belt 511, and a plurality of moveable tracking frame assemblies $\mathbf{525}_R$ (1×shown) associated with the return section $\mathbf{511}_R$ of the belt 511. In the embodiment shown in FIGS. 25 to 27, the arrangement 500 is associated with the moveable tracking frame $\mathbf{525}_R$ which pivots about axis P (see FIG. 26) and is operable for providing rolling support (via rollers $R_R$) to a return section $\mathbf{511}_R$ of the belt 511.

Figure 25:
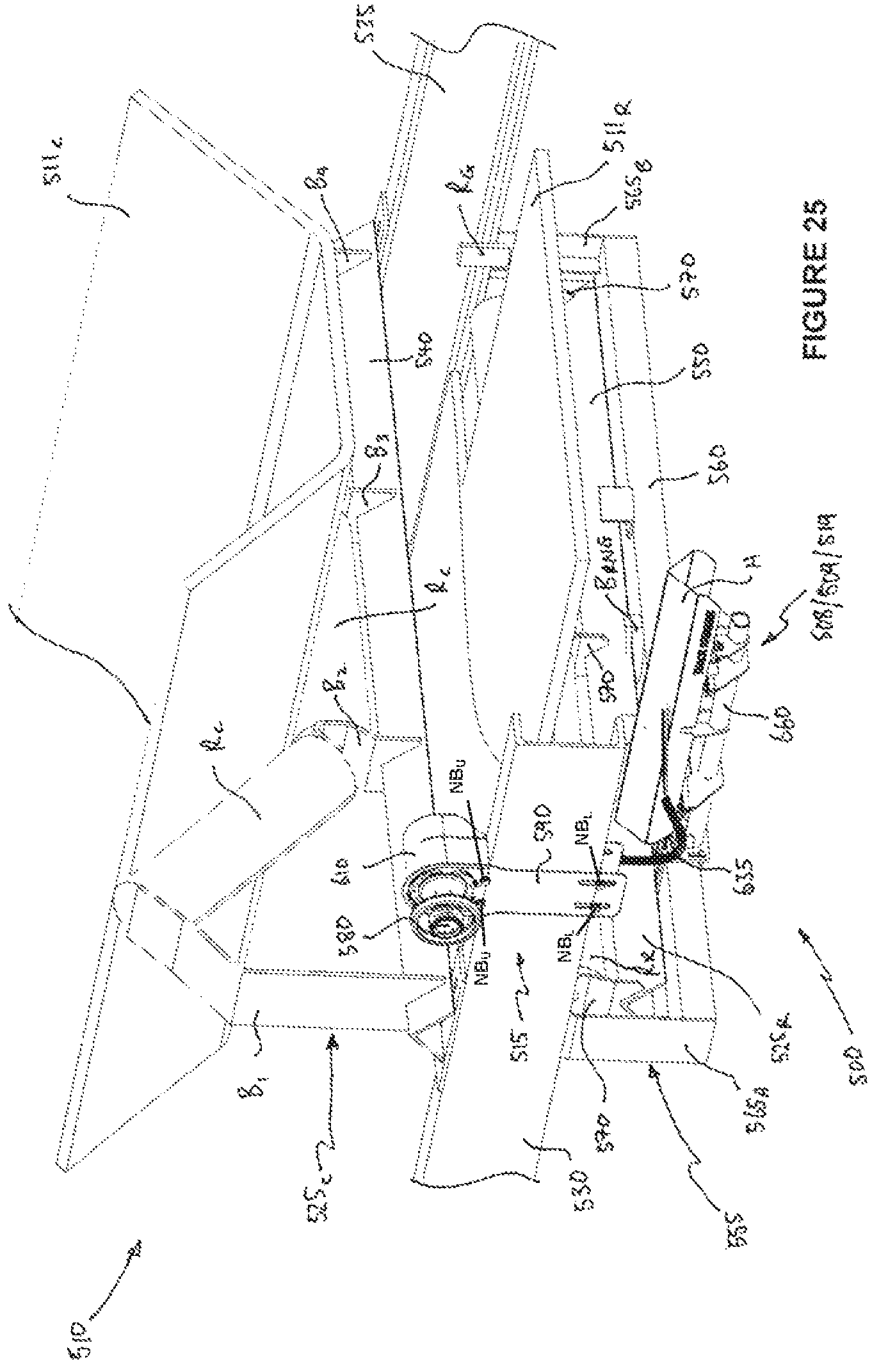
FIG. 25 shows a perspective view (from side-above aspect) of another embodiment of an arrangement for use with a moveable support or tracking frame assembly arranged in accordance with the principles described herein.

For the case shown in FIGS. 25 to 37, the support frame assembly $\mathbf{525}_C$ associated with the carry section $\mathbf{511}_C$ of the belt 511 is fixed in position relative to, and being supported by, parallel aligned and spaced apart supporting members 530, 535 (each provided in the form of steel channel sections having spaced apart flange portions connected via a web portion, whereby the web portion is aligned with the vertical plane). Briefly, the support frame assembly $\mathbf{525}_C$ is comprised of an elongate support member 540 of substantially "L" shaped cross-section (aligned having its apex pointing upwards) which spans between and supported (by way of being connected via any appropriate fastening system, such as for example, a nut/bolt fastening system) by the parallel aligned and spaced apart supporting members 530, 535. As shown in FIG. 25, the elongate support member 540 provides support for support stands $B_1$, $B_2$, $B_3$, $B_4$ which operate to support respective rollers (3 rollers shown, 2×outer rollers arranged in an inclined manner, and a central roller provided therebetween and aligned operable generally horizontally) which provide rolling support for the carry section $\mathbf{511}_C$ of the belt 511. As the skilled reader will appreciate, support frames of this nature can have one or more rollers, and some are provided with up to five rollers.

The arrangement 500 comprises a transmission assembly 508 comprising a hydraulic actuation assembly 509 and configured having respective means or arrangement to receive an input force and to supply an output force for facilitating adjustment/movement of the tracking frame $\mathbf{525}_R$. The hydraulic actuation assembly 509 comprises a hydraulic cylinder ram 518 and piston (not shown) arrangement operable as part of a hydraulic cylinder unit 519, wherein the piston is operably connected with the hydraulic cylinder ram 518. The means or arrangement for receiving the input force comprises a hydraulic axial piston pump unit 605 which is configured in operable association with the handwheel assembly 515 such that the hydraulic axial piston pump unit 605 is responsive for receiving an input force by way of the handwheel assembly 515 via the handle portion 580 which is selectively operable by a (human) user.

The means or arrangement for supplying the output force involves operability between the hydraulic cylinder ram 518 (of the hydraulic actuation assembly 509) that is arranged operable with the actuator interface assembly 512. In the arrangement 500 shown, the transmission assembly 508 is configured operable with the actuator interface assembly 512 for transferring the received input force (by way of the handwheel assembly 515) for supplying an output force via the actuator interface assembly 512 which interacts/engages the tracking frame 525$_R$ for facilitating an adjustment of its position, alignment, or orientation.

Figure 26:
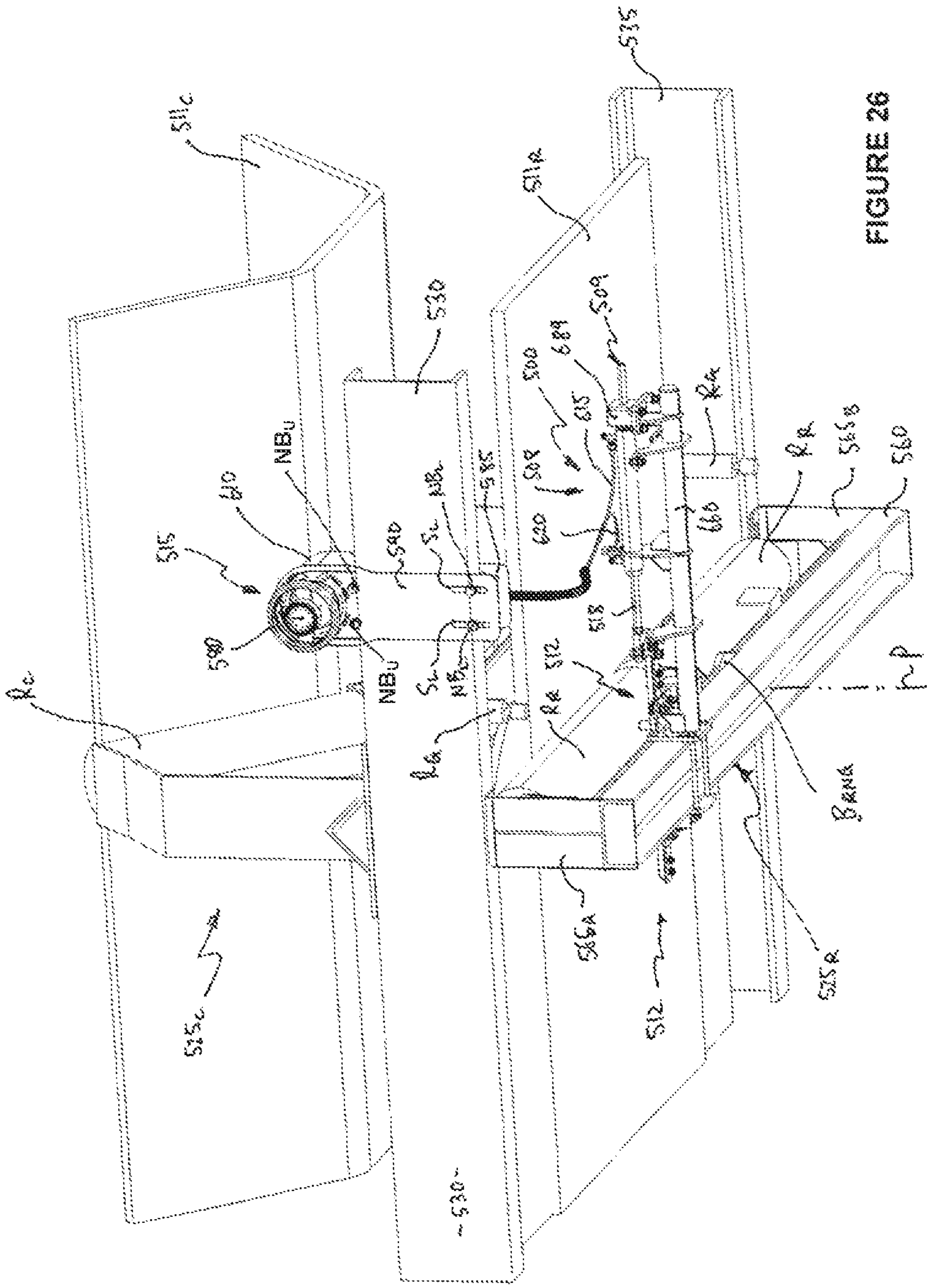
FIG. 26 shows a further perspective view (from side-below aspect) of the embodiment shown in FIG. 25.
Figure 27:
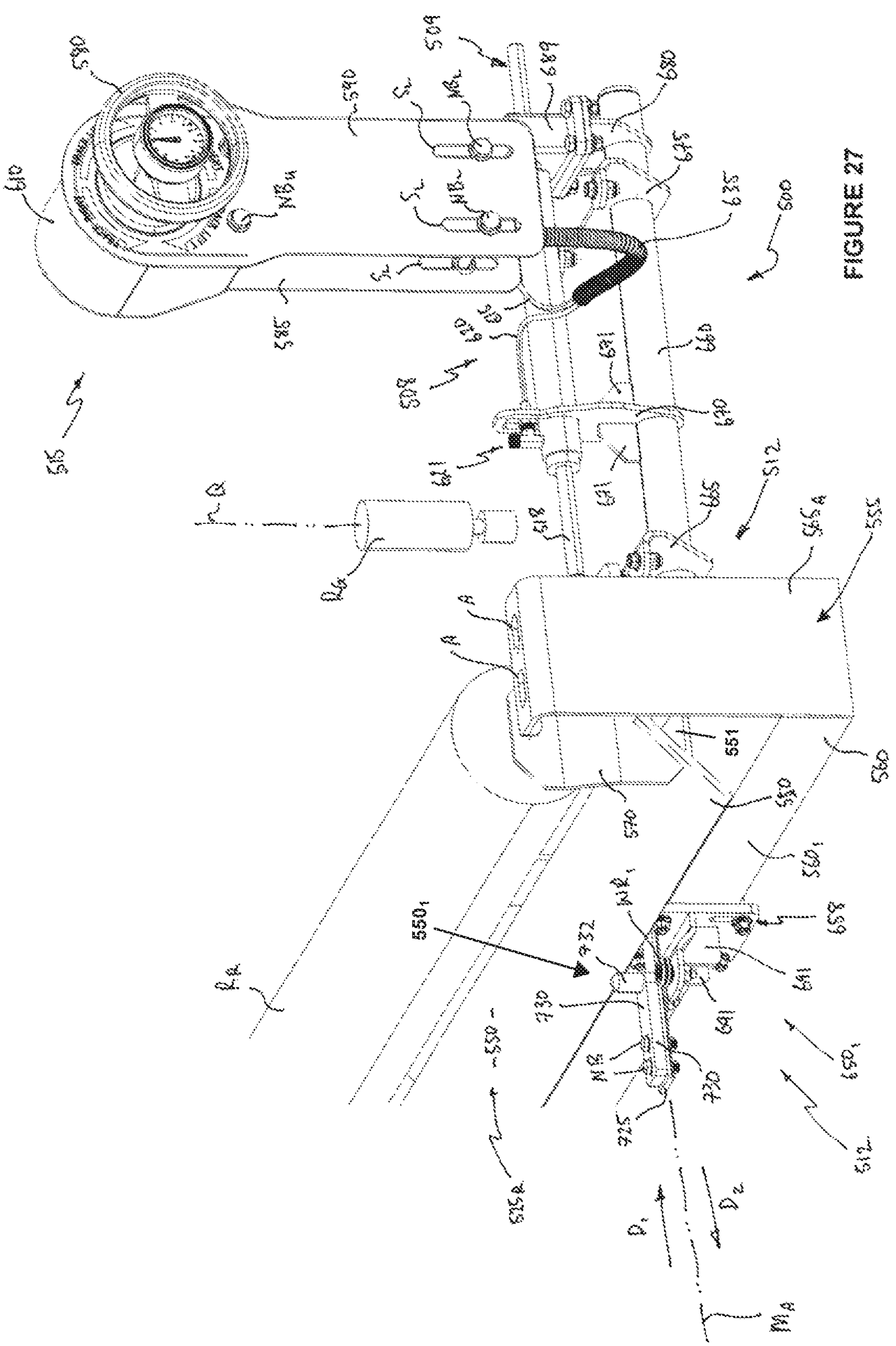
FIG. 27 shows another perspective view (from side-above aspect) of the embodiment shown in FIG. 25, with various support structure omitted.
Figure 28:
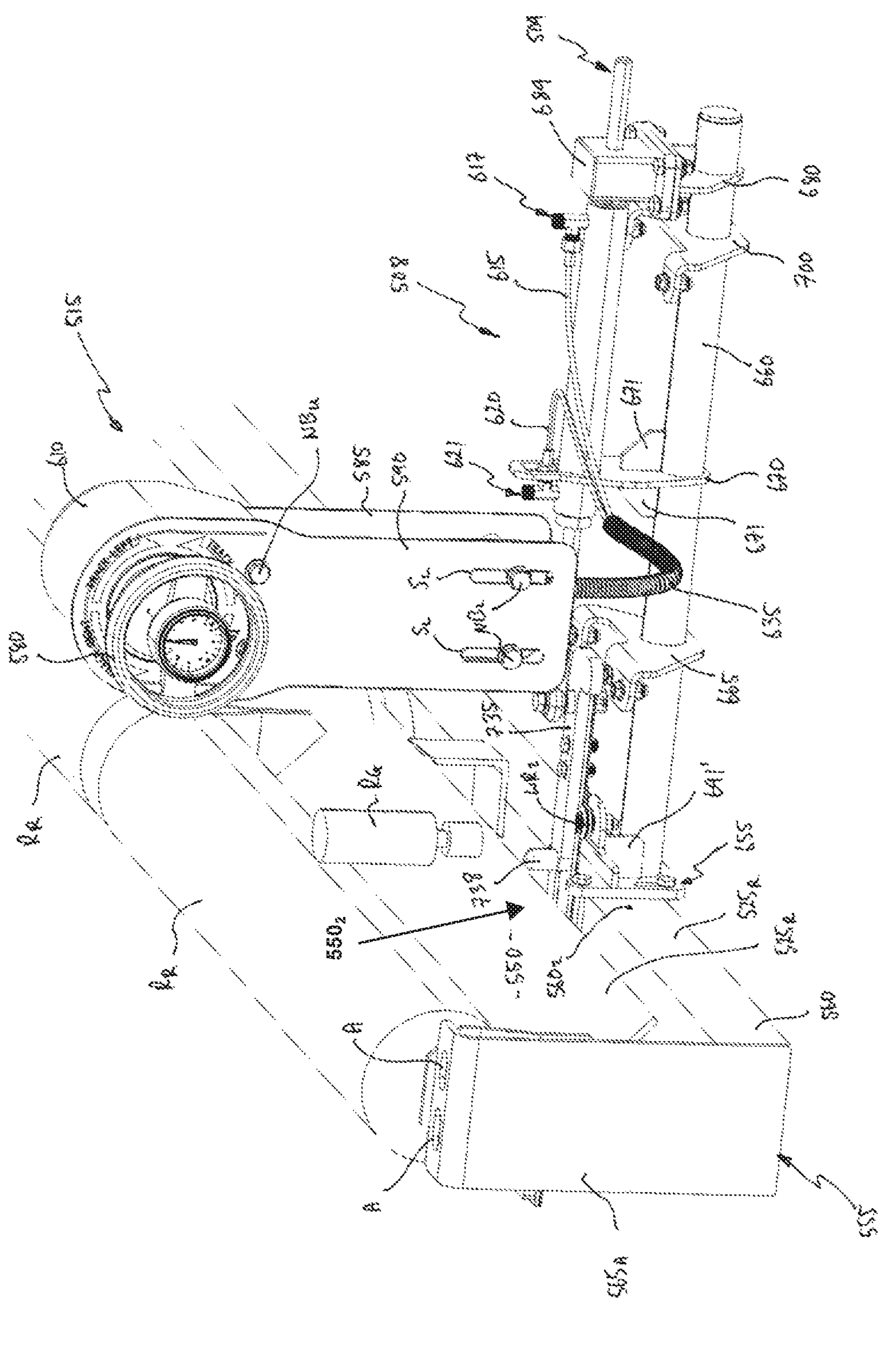
FIG. 28 shows a further perspective view of that shown in FIG. 27.

As clearly shown in FIGS. 25 to 28, the tracking frame 525$_R$ is comprised of an elongate support member 550 of substantially triangular cross-section (having an internally located stiffener element 551 as shown in FIG. 27) which spans between and rotatably supported (so that the elongate support member 550 is able to pivot about the axis P) by a support assembly 555 which is supported at regions of the underside of the parallel aligned spaced apart supporting members 530, 535 (substantially underneath the support frame assembly 525$_C$)—rotatable support provided to the elongate support member 550 by the support assembly 555 is provided by a way of bearing assembly $B_{RNG}$ (see FIG. 25).

The support assembly 555 comprises an elongate support member 560 of substantially rectangular cross-section which spans between and connects (using any appropriate fastening system, such as for example, a nut/bolt fastening system) to/with the underside of the parallel aligned spaced apart supporting members 530, 535 by way of end supports 565$_A$, 565$_B$ as shown in FIGS. 25, 26, 27, and 28. Each of the end supports 565$_A$, 565$_B$ terminate distal of the elongate support member 560 with a shaped end region providing spaced apart apertures A, the shaped end region being configured so as to align the apertures so that each are operable with a nut/bolt fastening system for connection of the end supports 565$_A$, 565$_B$ to the underside of the parallel aligned spaced apart supporting members 530, 535 in the manner shown.

The elongate support member 550 of the tracking frame assembly 525$_R$ provides support for support stands 570 which extend upward from the elongate support member 550 (visible in FIG. 25) for supporting respective rollers $R_R$ (2×shown spaced apart in an end on end relationship) which provide rolling support for the return section 511$_R$ of the belt 511. As the skilled reader would appreciate, and as noted above, increased engagement between the rollers $R_R$ and the belt 511$_R$, when rotated by way of the rotation or pivoting of the tracking frame 525$_R$ (via operation of the arrangement 500) operates to help adjust or 'steer' the position of the belt so as to encourage it to return (or converge toward) to its generally intended 'running' alignment condition when circumstances require.

As will be evident in FIGS. 25 to 27, the tracking frame 525$_R$ also comprises two edge guide rollers $R_G$, each aligned so as to be rotatable about a respective vertical axis Q. As shown, each of edge guide rollers $R_G$ are spaced from the outward most ends of respective adjacent rollers $R_R$ so that each edge guide roller $R_G$ is able to interact or engage (by way of rolling contact) a respective adjacently disposed edge portion of the return section 511$_R$ of the belt 511. For clarity purposes, structural support for the edge guide rollers $R_G$ is not shown in FIGS. 25 to 37. The skilled reader will understand various arrangements that are used, or can be devised, for supporting the edge guide rollers $R_G$ in their respective positions so that they operate in assisting the tracking frame 525$_R$ with its usual self-aligning task.

As will be seen in FIGS. 25 to 28, the arrangement 500 is positioned relative to the support assembly 555 so that the actuator interface assembly 512 is operable generally at or near an end of the tracking frame 525$_R$, or positioned so as to be operable between an end of the tracking frame 525$_R$ and the axis P. In substance, the actuator interface assembly 512 operates to interact or engage a portion of the elongate support member 550 of the tracking frame 525$_R$ for causing the tracking frame to pivot about the axis P in desired directions of rotation so as to allow the return belt section 511$_R$ to be selectively steered as needed for the correction of any 'running' misalignment. With reference to FIGS. 27, 31, 33 and 35, and as will be described below, the actuator interface assembly 512 is configured so as to be moveable substantially along an axis of movement $M_A$ in first $D_1$ and second $D_2$ directions—movement in direction $D_1$ for causing the actuator interface assembly 512 to engage or contact the tracking frame 525$_R$ (specifically, acting upon a portion of a first side 550$_1$ of the elongate support member 550—see FIG. 27) for pulling the tracking frame 525$_R$ in direction $D_1$ so as to cause a counter-clockwise pivot or rotation $R_{CC}$ (refer FIG. 33) about the axis P, and movement in direction $D_2$ for causing the actuator interface assembly 512 to engage or contact the tracking frame 525$_R$ (specifically, acting upon a portion of a second side 550$_2$ of the elongate support member 550—see FIG. 28) for pushing the assembly 525$_R$ in direction $D_2$ so as to cause a clockwise pivot or rotation $R_C$ about the axis P (refer FIG. 33).

In FIGS. 25, 26, 27, 28, and 32, the arrangement 500 is shown positioned in a generally 'central' or 'neutral' position/condition in which no adjustment of the tracking frame 525 is undertaken by the arrangement. In this position/condition, and as the skilled reader would readily understand, the tracking frame 525 is able to function in its usual manner, ie. to self-correct any misalignment as needed due to its available scope to rotate about the axis P.

With reference to FIG. 26, it can be seen that the handwheel assembly 515 of the arrangement 500 is supported at a region of the supporting member 530 that is spaced from an end of the tracking frame 525$_R$. Positioning of the handwheel assembly 515 in this manner has advantage in reducing the risk of a human operator, when manually operating the handle portion 580 of the handwheel assembly 515, coming into contact with any moving component(s) of the tracking frame 525$_R$ (or component(s) associated therewith—including any portion of the return belt section 511$_R$). The handwheel assembly 515 can be selectively positioned so as to be sufficiently (safely) spaced from the tracking frame 525$_R$ to which it is operably associated.

Figure 2:
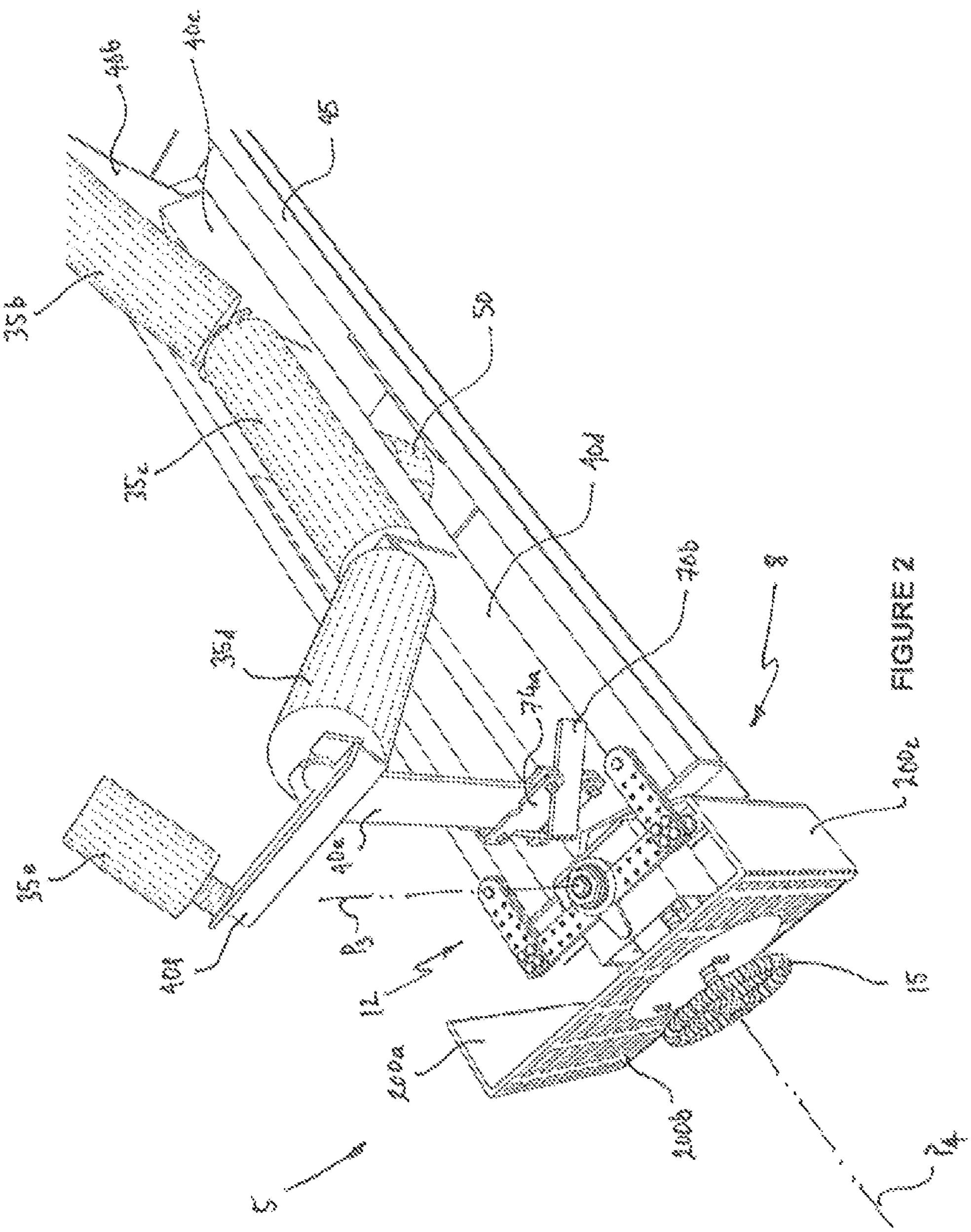
FIG. 2 shows another perspective view of the embodiment shown in FIG. 1B.
Figure 3:
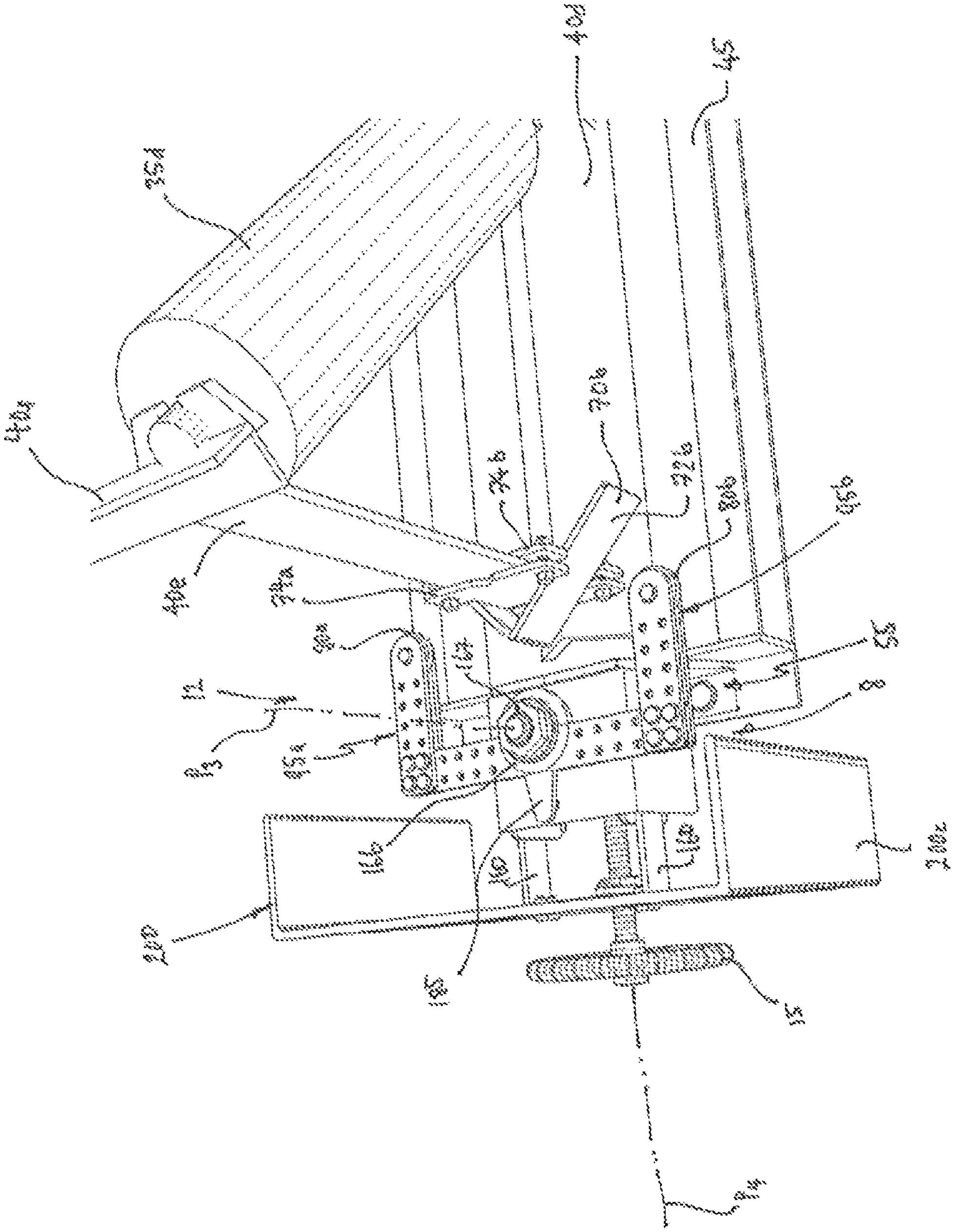
FIG. 3 shows another perspective view of the embodiment shown in FIG. 1B.
Figure 29:
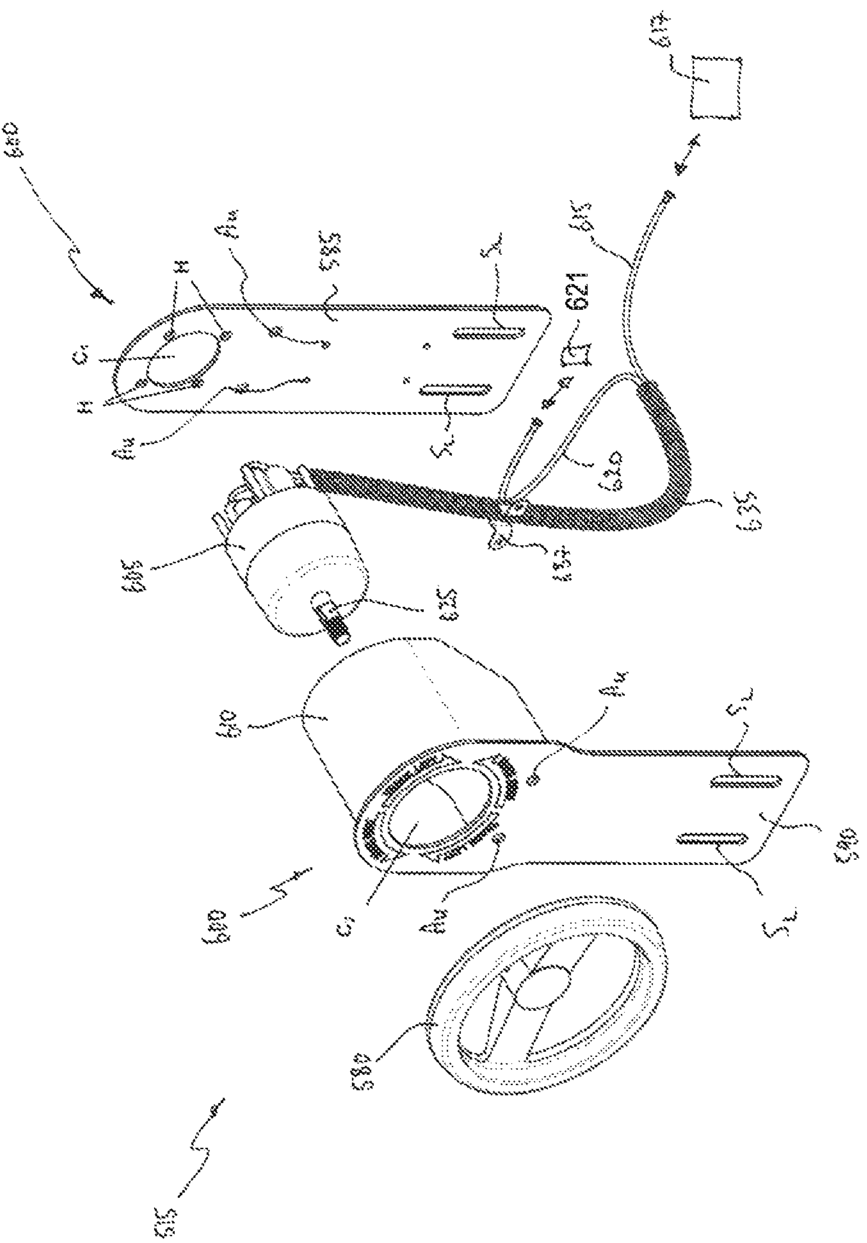
FIG. 29 shows an exploded perspective view of a handwheel assembly used in accordance with the embodiment shown in FIG. 25.
Figure 30:
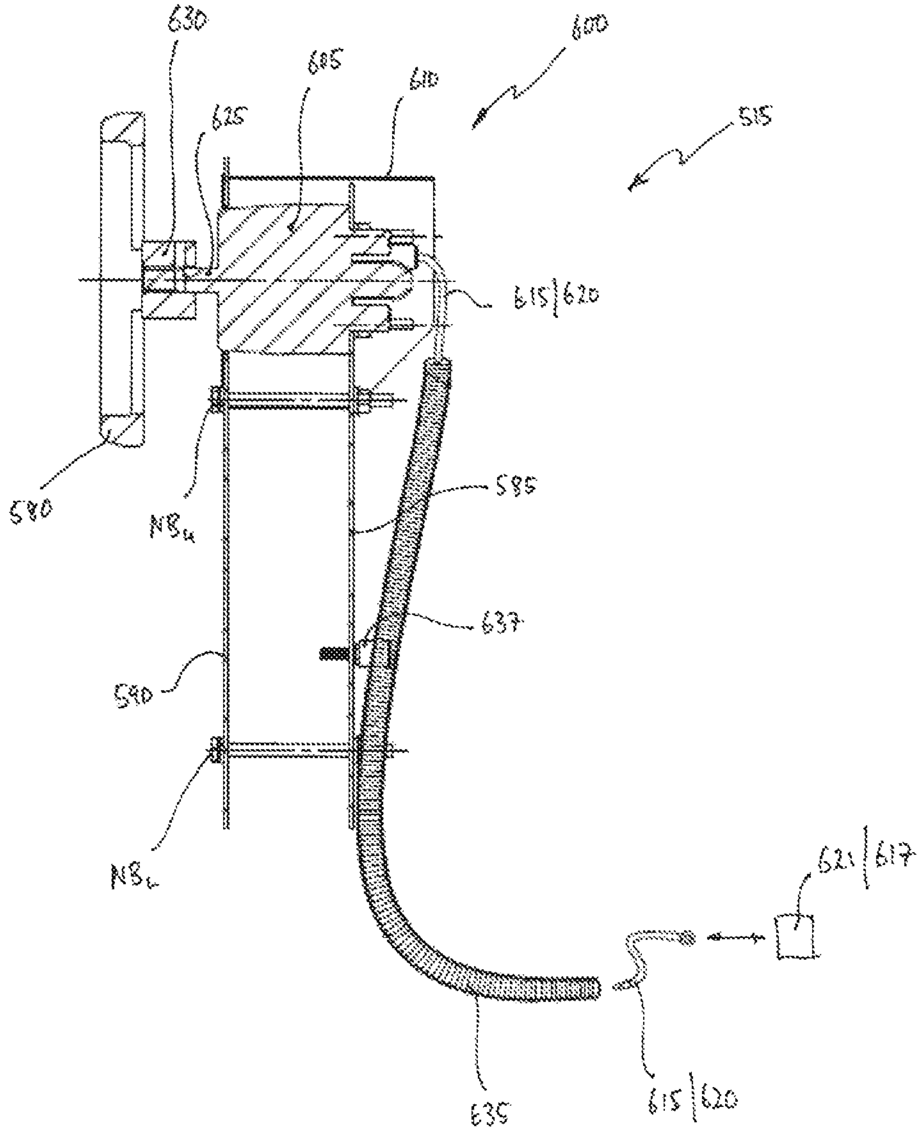
FIG. 30 shows a cross section side view of the handwheel assembly shown in FIG. 29.
Figure 31:
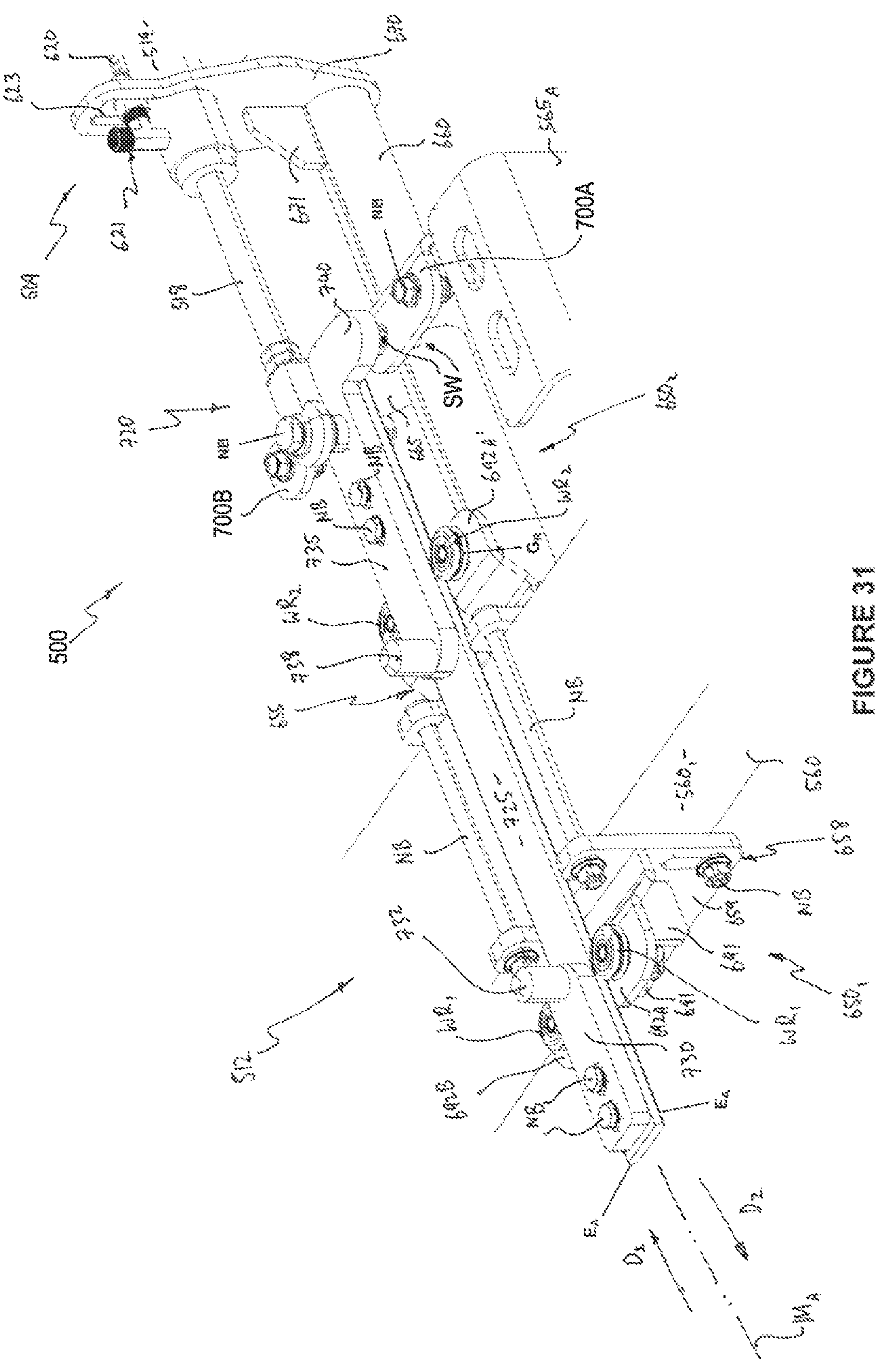
FIG. 31 shows a close-up perspective view of a region of the embodiment shown in FIG. 25 which enables interaction/engagement with the associated moveable support or tracking frame assembly.
Figure 32:
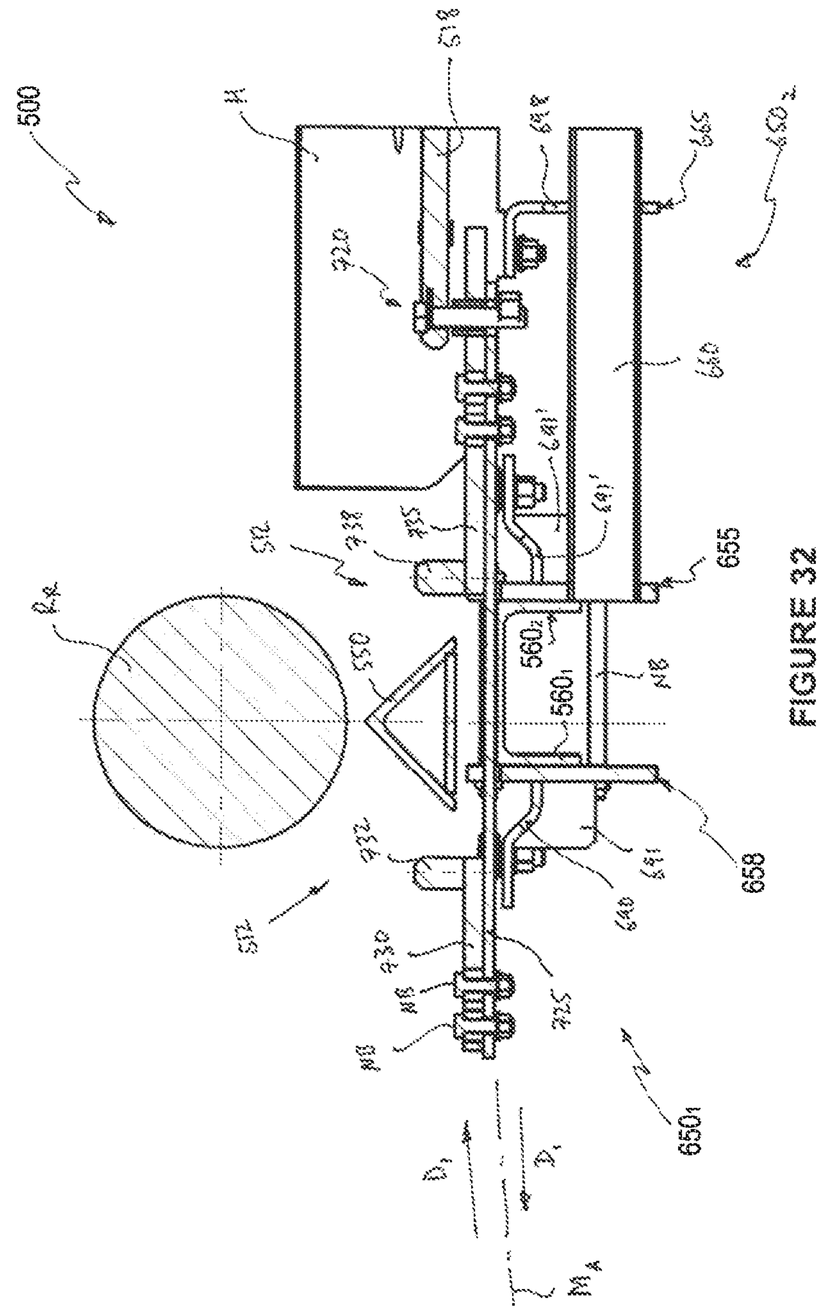
FIG. 32 shows a cross section side view of that shown in FIG. 31.

With reference to FIG. 29, the handwheel assembly 515 comprises first 585 and second 590 mounting plates that fasten together so as to clamp against opposite sides of the supporting member 530 using nut and bolt assemblies as shown in FIGS. 25 and 26—2×nut/bolts $NB_U$ being proximal the upper edge of the supporting member 530 via corresponding apertures $A_U$ provided in both mounting plates 585, 590, and 2×nut/bolts $NB_L$ being proximal the lower edge of the supporting member 530 via corresponding elongate slots $S_L$ provided in both mounting plates 585, 590 (the elongation of the slots allowing for the mounting plates 585, 590 to attach the handwheel assembly 515 to supporting members 530 having varying dimension in the vertical plane.

At an end 600 of both mounting plates 585, 590 there is provided a hydraulic axial piston pump unit 605 (provided in the form of a hydraulic steering helm unit manufactured and supplied by SEASTAR SOLUTIONS) that is positioned intermediate and supported by both mounting plates 585, 590 via corresponding circular apertures $C_1$ (formed in mounting plate 585), $C_2$ (formed in mounting plate 590) formed in both plates, and secured in place by way of nut/bolt fasteners (four×mounting holes H seen in mounting plate 585). Serving as a part shroud (for protecting the hydraulic axial piston pump unit 605 from dust/water to the extent possible) for the hydraulic axial piston pump unit 605 is a housing or cover 610 fitted as shown. Extending from the hydraulic axial piston pump unit 605 are fluid transfer conduits 615, 620 (both provided internal of a flexible corrugated PVC conduit 635 which is clamped to the mounting plate 585 using pipe clamp 637) which serve to operably connect the hydraulic axial piston pump unit 605 with the hydraulic cylinder unit 519 so as to enable the appropriate fluid circuitry for causing movement of the hydraulic cylinder ram 518. The hydraulic axial piston pump unit 605 provides a shaft 625 which keys or splines with the handle portion 580 via a coupling arrangement 630 (see FIG. 30) so that selective manual rotation of the handle portion 580 caused by a human operator transfers to the hydraulic axial piston pump unit 605.

The hydraulic axial piston pump unit 605 operates with the hydraulic cylinder unit 519 by way of first and second fluid circuits enabled, in part, by way of the fluid transfer conduits 615, 620—through which a hydraulic working fluid (such as for example, hydraulic fluid/oil) passes. The fluid transfer conduits 615, 620 fluidly connect with the hydraulic cylinder unit 519 for operation of the hydraulic cylinder ram 518. The hydraulic cylinder ram 518 is connected with a piston (not shown) internal of the hydraulic cylinder unit 519, whereby (and as the skilled reader would understand) opposite sides of the piston serve to define, with portions of the interior wall of the hydraulic cylinder unit 519, first and second chambers. In this manner, the first and second fluid circuits fluidly connect with respective chambers (by way of the appropriate fluid transfer conduit) for the transfer of hydraulic fluid thereto/from depending on the direction (direction $D_1$, or direction $D_2$) the hydraulic cylinder ram 518 is intended to be moved.

Each of the fluid transfer conduits 615, 620 fluidly connect with respective fluid ports 617, 621 of the hydraulic cylinder unit 519, ie. the fluid transfer conduit 615 fluidly connects with fluid port 617, and the fluid transfer conduit 620 fluidly connects with fluid port 621. On the hydraulic axial piston pump unit 605 receiving an input force from the handle portion 580 (from a user) by way of the shaft 625, operation of the hydraulic actuation assembly 509 is caused by way of the hydraulic fluid being driven, under pressure, through the relevant fluid transfer conduit (615, 620) (as appropriately directed by the hydraulic axial piston pump unit 605) to the hydraulic cylinder unit 519 causing the desired movement of the hydraulic ram 518. Hydraulic fluid driven through the fluid transfer conduit 620 toward and through the fluid port 621 into the first chamber of the hydraulic cylinder unit 519 (and therefore to act against one side of the piston internal of the hydraulic cylinder unit 519) serves to cause the hydraulic cylinder ram 518 to move in direction $D_1$ (as shown in FIGS. 27, 31, 33 and 35), and hydraulic fluid driven through the fluid transfer conduit 615 toward and through the fluid port 617 into the second chamber of the hydraulic cylinder unit 519 (and therefore to act against the alternate side of the piston) serves to cause the hydraulic cylinder ram 518 to move in direction $D_2$. Of course, as the hydraulic axial piston pump unit 605 is configured with the hydraulic cylinder assembly 509 as a closed system, hydraulic fluid, when driven through one of the fluid transfer cables in one direction (expanding the relevant chamber into which hydraulic fluid is being introduced), will cause hydraulic fluid to be driven in the reverse direction through the alternate fluid transfer conduit as a result of movement of the piston (as the alternate chamber is reduced in volume).

The hydraulic axial piston pump unit 605 comprises a built-in lock valve (not shown in the Figures) as, in part, a safety device to prevent any adverse load that might be applied to the actuator interface assembly 512 by the tracking frame $\mathbf{525}_R$ being directed or fed back to the hydraulic assembly 509 and, possibly, handle portion 580. In this manner, as with the arrangement 5 described above, this functionality serves to provide the 'uni-directional' aspect of the transmission of any input load (for example, a step/spike load provided by the tracking frame $\mathbf{525}_R$) applied to the output/supply end of the arrangement 500.

Figure 37:
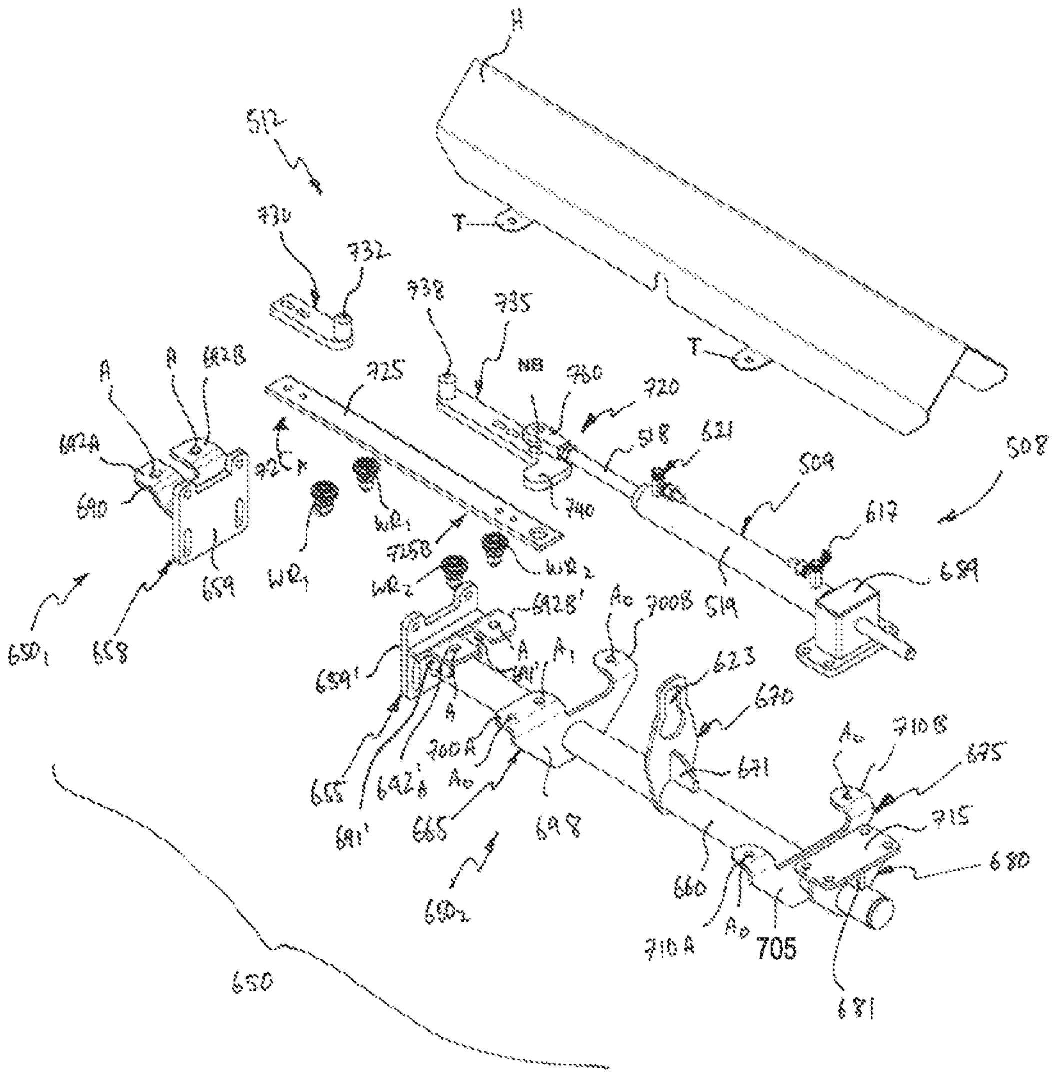
FIG. 37 shows an exploded perspective view of that shown in FIGS. 34 to 36.

As shown in FIGS. 25 to 28 and FIG. 31, the hydraulic cylinder unit 519 is attached to, and supported by, the elongate support member 560 at a region between the supporting member 530 and the axis P about which the tracking frame $\mathbf{525}_R$ pivots. With specific reference to FIG. 37, the hydraulic cylinder unit 519 is supported by the supporting member 530 by way of a two-part support bracket arrangement 650 (see FIG. 37 showing an exploded view of the constituent parts/components of the bracket arrangement 650): a first part $\mathbf{650}_1$ which is positioned so as to locate against a first side $\mathbf{560}_1$ (see FIG. 27) of the elongate support member 560, and a second part $\mathbf{650}_2$ which is positioned so as to locate against a second side $\mathbf{560}_2$ (opposite the first side $\mathbf{650}_1$) (see FIG. 28) of the elongate support member 560.

The first part $\mathbf{650}_1$ comprises a mounting bracket 658 having a planar plate portion 659, one side of which positions flush against the first side $\mathbf{560}_1$ of the elongate support member 560. Extending away/outward of the planar plate portion 659 is a shaped support portion 690 (receiving structural support from two parallel and spaced apart vertically aligned web elements 691, more readily visible in FIG. 27) configured/shaped so as to provide spaced support portions 692A, 692B each having formed therein a respective aperture A (see FIG. 37). Each of the apertures A of respective support portions 692A, 692B provide a location point for securing a respective roller wheel assembly $WR_1$ (such as for example, a studded wheel) which is rotatable about its respective vertically aligned axis, the purpose of which is described below.

The second part $\mathbf{650}_2$ comprises a mounting bracket 655 which is positioned on the second side $\mathbf{650}_2$ of the elongate support member 560. The mounting bracket 655 is formed so as to be of substantially similar form as the mounting bracket 658—to this end, reference numerals as described in relation to the mounting bracket 658 are retained for ease of description; the mounting bracket 655 therefore being comprised of planar plate portion 659' which positions flush against the side $\mathbf{560}_2$ of the elongate support member 560, and, extending away/outward of the planar plate portion 659' is a support portion 690' (receiving structural support from two parallel and spaced apart vertically aligned web elements 691', more readily visible in FIG. 28) configured/shaped so as to provide spaced support portions 692A', 692B' each having formed therein a respective aperture A (see FIG. 37). As with the mounting bracket 658, each of the apertures A of respective support portions 692A', 692B' provide a location point for securing a respective roller wheel assembly $WR_2$ (such as for example, a studded wheel) which is rotatable about its respective vertically aligned axis, the purpose of which is described below.

As shown in FIGS. 25 to 28 and 31 to 34, the mounting brackets 658 and 655 are arranged so as to be fastened together (using 4×nut/bolt assemblies NB as shown in FIGS. 31 to 34) with each positioning flush against opposite sides 560$_1$, 560$_2$ of the elongate support member 560 so as to clamp each mounting bracket 658, 655 and, consequentially, the two-part support bracket arrangement 650 thereto. In this manner, the hydraulic cylinder unit 519 can be supported in the intended position, as will be described below. Both mounting brackets 658, 655 comprise respective holes for receiving respective bolts whereby the lower disposed holes are elongated in the vertical plane so as to allow the brackets to be fastened against elongate support members of varying heights.

Figure 34:
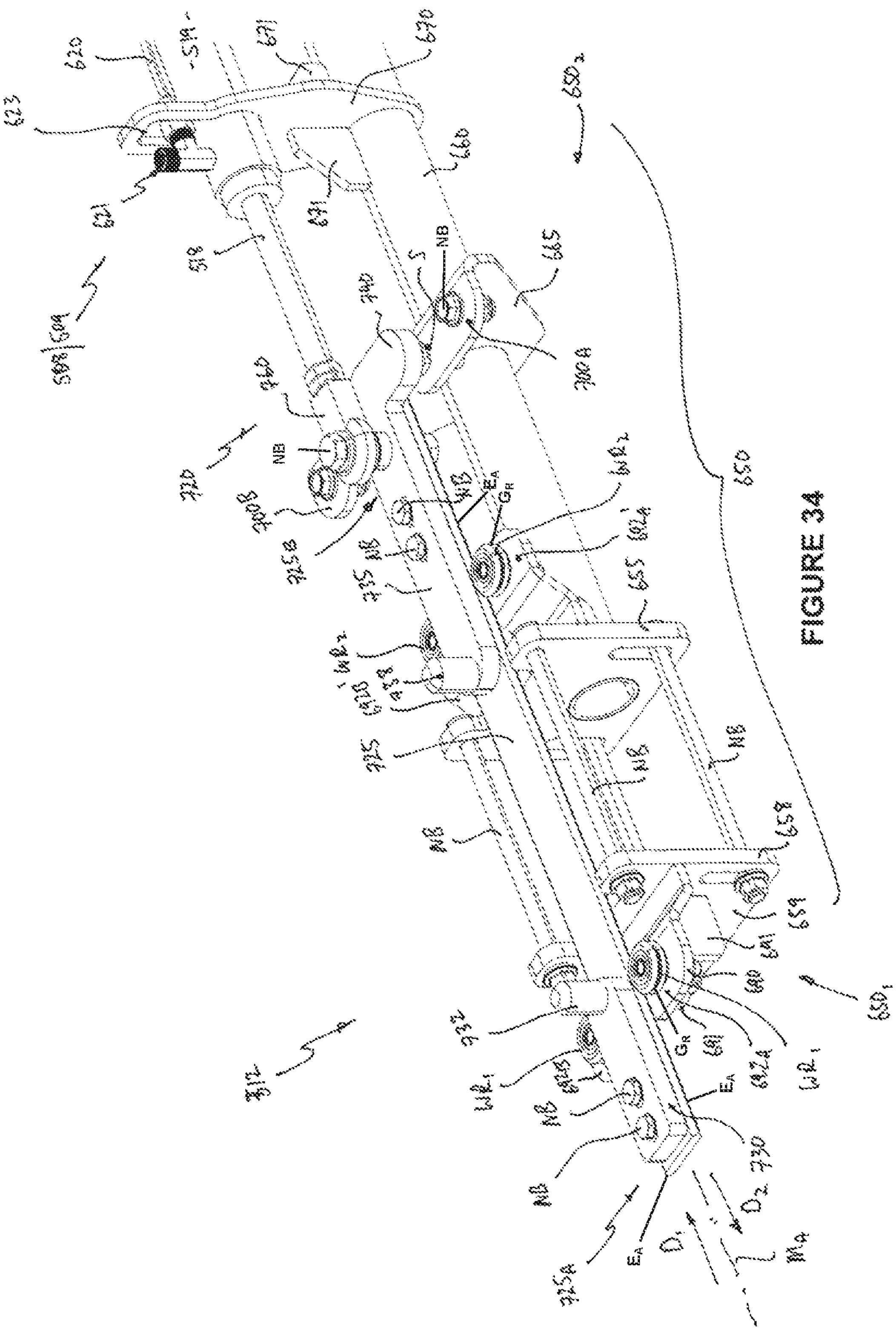
FIG. 34 shows a further close up perspective view of that shown in FIG. 31.
Figure 35:
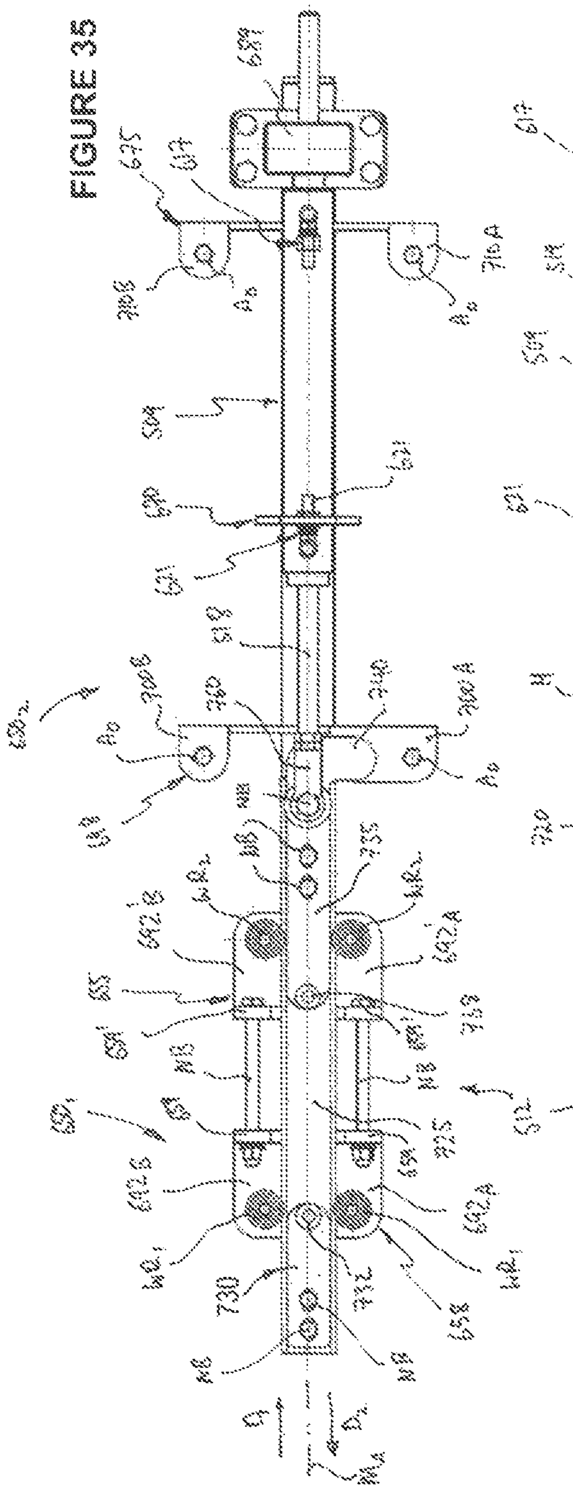
FIG. 35 shows a top down view of the embodiment shown in FIG. 34.
Figure 36:
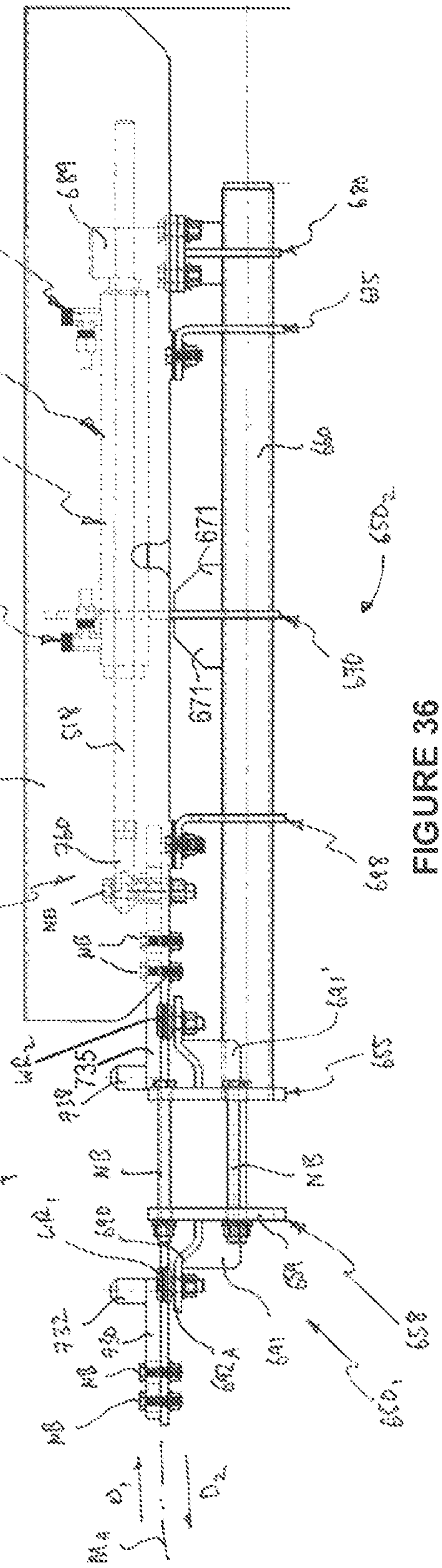
FIG. 36 shows a side view of that shown in FIG. 35, with cover omitted.

Extending away from an outward facing side of the planar portion 659' of the mounting bracket 655 is an elongate rod member 660 which extends outward substantially at 90 degrees (or orthogonally) therefrom. As best shown in FIG. 34, the mounting bracket 655 is provided with an aperture (of circular form) into which an end of the elongate rod member 660 slots for location purposes, and is welded in position in its intended alignment condition (ie. such that the elongate rod member 660 extends substantially 90 degrees away from the planar face of the planar plate portion 659'). The elongate rod member 660 is configured for supporting/carrying along its length, in spaced relation, mounting brackets 665, 670, 675, and 680. As shown in the FIGS. 25 to 28, the elongate rod member 660 extends so as to align substantially transverse with/to the elongate support member 560 to which the two-part support bracket arrangement 650 is attached. Thus, as seen in FIG. 36, the elongate rod member 660 with the mounting brackets 665, 670, 675, and 680 are configured so as to support the hydraulic cylinder unit 519 in a generally cantilevered manner outward from the side of the elongate support member 560 so that the hydraulic cylinder unit 519 is aligned substantially transverse or orthogonal with/to the elongate support member 560 (such alignment of the hydraulic cylinder unit 519 also being substantially parallel with the central 'running' axis $R_C$ of the belt 511$_R$). Consequentially, movement of the hydraulic ram 518 (and, indeed, that of the actuator interface assembly 512) of the hydraulic cylinder unit 519 is also substantially transverse (orthogonal) with/to the elongate support member 560 to which the two-part support bracket arrangement 650 is attached.

Spaced from the mounting bracket 655 along the elongate rod member 660, is the mounting bracket 665. With reference to FIG. 37, the mounting bracket 665 comprises a planar portion 698 shaped at one end (an end distal of the elongate rod member 660) so as to provide spaced support portions 700A, 700B, the support portion 700A providing two spaced apart apertures $A_I$ (innermost disposed aperture), $A_O$ (outermost disposed aperture), and the support portion 700B providing a single aperture $A_O$ (outermost disposed aperture). The apertures of both support portions 700A, 700B being aligned in an axis substantially transverse to the direction of axial extension of the elongate rod member 660. The outermost disposed apertures $A_O$ of the support portions 700A, 700B are both used for securing (with corresponding tabs T using a selected fastening system, for example, a nut/bolt fastening system shown) a housing H in position over the hydraulic cylinder unit 519 (so as to shield, to the extent possible, the hydraulic cylinder unit 519 from the weather and material that may fall from the conveyor belt 511).

The innermost disposed aperture $A_I$ provided on the support portion 700A is configured so as to support an inductive sensor unit S (such as for example, an inductive sensor manufactured and supplied by NAMUR) that is operable for registering a condition of the actuator interface assembly 512 (for example, a known position of the actuator interface assembly 512—such as, for example, a 'neutral' position). The inductive sensor unit S is a 2-wire proximity sensor usually powered by way of a low voltage power source (such as for example, 8 volts direct current) used to detect and register the proximity of a tab like shaped portion 740 provided with the second contact element 735 of the actuator interface assembly 512.

Spaced from the mounting bracket 655 along the elongate rod member 660, is the mounting bracket 670. The mounting bracket 670 is supported on the elongate rod member 660 and extends upwards for supporting a portion of the hydraulic cylinder unit 519. In achieving this, and with reference to FIG. 34, the mounting bracket 670 is formed providing an aperture 623 through which said portion of the hydraulic cylinder unit 519 projects and is supported. As shown in FIG. 34, the aperture 623 comprises a first (lower) portion shaped so as to receive and support said portion of the hydraulic cylinder unit 519, and a second portion, above the first portion, shaped so as to allow sufficient space for the fluid transfer conduit 620 to fluidly connect with the fluid port 621 (which is positioned proximal said portion of the hydraulic cylinder unit 519 as shown in FIG. 34). The mounting bracket 670 is also supported in position on the elongate rod member 660 by way of web elements 671 aligned in the vertical plane as shown.

Spaced from the mounting bracket 670 along the elongate rod member 660, is the mounting bracket 675. The mounting bracket 675 comprises a planar portion 705 shaped at one end (an end distal of the elongate rod member 660) so as to provide spaced support portions 710A, 710B, each providing a respective aperture $A_O$. The apertures $A_O$ of both support portions 710A, 710B are aligned in an axis substantially transverse to the direction of axial extension of the elongate rod member 660, and used for assisting in securing (with corresponding tabs T using a selected fastening system, for example, a nut/bolt fastening system shown) the housing H in position over the hydraulic cylinder unit 519.

Located proximal the mounting bracket 675 is the mounting bracket 680. The mounting bracket 680 is configured so as to provide support to a planar support portion 715 distal of the elongate rod member 660. The planar support portion 715 serves to provide support to a spherical bearing unit 689 of the hydraulic cylinder unit 519. The mounting bracket 680 is also supported in position on the elongate rod member 660 by way of a web element 681 aligned in the vertical plane. The spherical bearing unit 689 is used to accommodate any lateral movement of the hydraulic cylinder unit 519 that might occur transverse to the axis of movement $M_A$.

All mounting brackets 665, 670, 675, and 680, and their respective supporting web elements are welded in the appropriate position to the elongate rod member 660. Of course, other means or arrangements of fixing could be used, eg. mechanical fastening systems.

As shown in at least FIGS. 31 to 36, the actuator interface assembly 512 is operably connected with an end 720 of the hydraulic ram 518 by way of a coupling attachment 760 using a nut/bolt fastening assembly NB. The actuator interface assembly 512 comprises an elongate member 725 (of generally rectangular cross-section uniform along its length—sometimes referred to as 'flat' bar) having a first end region 725A (distal of the hydraulic cylinder ram 518) intended for operable movement below and to one side (adjacent side 550$_1$) of the elongate support member 550 of the tracking frame 525$_R$. As will be seen in FIG. 34, the elongate member 725 comprises parallel opposite edges which are configured so as to provide an apex edge $E_A$ which registers with a grooved region $G_R$ provided by the roller wheel assemblies $WR_1$, $WR_2$ (described below).

Connected/fastened (by way of nut/bolt fastening assemblies NB) to first end region 725A of the elongate member 725 is a first contact arrangement 730 which operates as a 'pull' plate for pulling (in for example, an urging like manner) on/against a portion of the side $550_1$ (see FIG. 27) of the elongate support member 550 when the hydraulic cylinder ram 518 moves in direction $D_1$.

The elongate member 725 further comprises a second end region 725B, generally opposite to the first end region 725A, and to which is connected/fastened (by way of nut/bolt fastening assemblies NB) a second contact arrangement 735 which operates as a 'push' plate, for pushing (in for example, an urging like manner) on/against a portion of the side $550_2$ (see FIG. 28) of the elongate support member 550 when the hydraulic cylinder ram 518 moves in direction $D_2$. The end 720 of the hydraulic cylinder ram 518 couples with both the second element 735 and the end region 725B of the elongate member 725 by way of the coupling attachment 760.

Each of the first 730 and second 735 contact arrangements comprise respective projecting portions (hereinafter, projections 732, 738) which extend upwards away from the actuator interface assembly 512 from at or near respective ends of respective (generally elongate) bodies of respective first 730 and second 735 contact arrangements a sufficient distance so as to be operable for interacting with respective sides of the elongate member 550 of the tracking frame $525_R$. Interaction between the projections 732, 738 of the respective contact arrangements 730, 735 with respective sides ($550_1$, $550_2$) the elongate member 550 of the tracking frame $525_R$ serves to cause the tracking frame to rotate or pivot about the axis P in directions of rotation $R_C$, $R_{CC}$ as required when selectively caused to do so via operation of the arrangement 500. The projections 732, 738 of the respective contact arrangements 730, 735 are spaced from each other along the elongate member 725 at a desired distance so as to allow room for the elongate member 550 of the tracking frame $525_R$ to be operable therebetween as shown in FIG. 33. As with the arrangements 5, 5' described above, the spacing of the projections 732, 738 of the arrangement 500 is configured so as to allow the tracking frame $525_R$ sufficient freedom to move within the spatial region provided between the projections 732, 738 as required for its normal operation without interference (from the projections 732, 738) when the arrangement 500 is positioned in its neutral position in which no adjustment of the tracking frame $525_R$ is offered.

As will be seen in FIG. 34, each of the roller wheel assemblies $WR_1$, $WR_2$ comprise upper and lower portions shaped at their periphery so as to define a centrally located (between the upper and lower portions) respective grooved region $G_R$ which receives and registrably rolls against the apex shaped edge $E_A$ of the elongate member 725 (as described below). Such interaction assists in reducing any risk that the elongate member 725 loses registration causing it to stray from its intended scope of movement during operation.

As will be clear from at least FIGS. 31, 33, 34, and 35, movement of the actuator interface assembly 512 is along the axis of movement $M_A$ in either of directions $D_1$, $D_2$. The actuator interface assembly 512 operates (as required) substantially between the spaced apart roller wheels $WR_1$ as well as the spaced apart roller wheels $WR_2$. In this manner, the spacing between roller wheels $WR_1$, and that of roller wheels $WR_2$, defines a path or channel along or through which the elongate member 725 operates/moves along the axis of movement $M_A$ in either of directions $D_1$, $D_2$.

Each of the roller wheels $WR_1$, $WR_2$ are in rolling contact with respective side edges of the elongate member 725, whereby such rolling contact serves to provide a rolling guiding influence on the actuator interface assembly 512 and for seeking to provide for a smooth relative movement and/or to prevent the elongate member 725 from moving (eg. rotating) about or relative to the axis of movement $M_A$ so as to limit (as much as possible) any freedom (or 'play') that might provide basis for the hydraulic cylinder ram 518 to rotate within or relative with/to the hydraulic cylinder unit 519.

As noted above, the second element 735 is configured at an end thereof for providing a 'tab' like shaped portion 740 which overhangs the end region 725B of the elongate member 725 so as to be exposed (for sensing purposes) to the position of the inductive sensor unit S, which is operable for detecting (and registering) a proximity of the tab like shaped portion 740 thereto. In this manner, registration of the proximity of the tab like portion 740 by the inductive sensor unit S (in the configuration shown in FIG. 31) provides an affirmative indication that the arrangement 500 is in what is known as a 'neutral' condition indicating that the tracking frame $525_R$ is not subject to any adjustment action or event by the arrangement 500.

As will be clear from the description above, in operation, movement enabled by way of operation of the hydraulic cylinder ram 518 (by way of manual operation of the handwheel assembly 515) in direction $D_1$ causes the actuator interface assembly 512 to contact the tracking frame 5258 (specifically, projection 732 acting upon a portion of the first side $550_1$ of the elongate support member 550) for pulling the assembly 512 (by the ram 518) so as to cause a counter-clockwise pivot or rotation $R_{CC}$ of the tracking frame $525_R$ (refer FIG. 33) about the axis P, and movement of the hydraulic cylinder ram 518 in direction $D_2$ causes the actuator interface assembly 512 to contact the tracking frame $525_R$ (specifically, projection 738 acting upon a portion of the second side $550_2$ of the elongate support member 550) for pushing the assembly 512 (by the ram 518) so as to cause a clockwise pivot or rotation $R_C$ of the tracking frame $525_R$ about the axis P (refer FIG. 33). In this manner, the tracking frame $525_R$ can be rotated/pivoted so as to bring the relevant of the roller(s) $R_R$ into increased (frictional) engagement (consistent with the usual operation of pivoting tracking frame when correcting belt alignment) with the return belt section $511_R$ by way of the rotation/pivoting of the tracking frame $525_R$ thereby enabling selective steering of the return section of the belt to or toward a desired alignment condition when it is detected to be deviating from the intended 'running' alignment condition. Of course, the arrangement 500 could be configured so as to be operable with a moveable support or tracking frame used for providing rolling support to the 'carry' section of the conveyor belt.

Commercial forms of the embodiments based on the principles of the arrangements (5, 5', 500) as described herein, may include kits that comprise the relevant components allowing forms of the arrangements (5, 5', 500) to be installed (for example, in a retrofit like manner) on existing support and tracking frame assemblies. The skilled reader would appreciate that such kits could take many different forms, providing different combinations of components, depending on operator/user needs. In this regard, some forms of such kits may not comprise certain components if such components can be sourced (by the purchaser) from alternate sources. Accordingly, the scope of how such kits can be comprised could differ depending on a purchaser's needs.

As will be readily understood by the skilled reader, in the context provided herein, a significant market is the mining industry as it is one of the biggest users of conveyor belts utilising support/tracking frames. Such conveyor belt systems are used in extreme conditions and tend to incur high costs a result of equipment downtime, also with high standard safety systems in place. Embodiments of the arrangements (5, 5', 500) can be readily integrated or retrofitted onto the pre-existing support/tracking frame assemblies allowing embodiments of the arrangements to be applied to any other industry that utilize conveyor belt systems that feature tracking frame assemblies.

Other aspects of the principles described herein may include methods for installing or associating various embodiments of the arrangements 5, 5', 500 for operable use with a portion or region (such as for example, support or tracking frame assemblies 25, $\mathbf{525}_R$) of a conveyor belt assembly or system.

Such methods for installing or associating embodiments of the arrangements 5, 500 may involve providing such embodiments and associating same with a support or tracking frame assemblies 25, $\mathbf{525}_R$ of a conveyor belt assembly such that the arrangements 5, 500 is/are operable for facilitating or causing the relevant adjustments (position, alignment, or orientation) of the support or tracking frame assembly to be made.

Other aspects may involve methods of using embodiments of such arrangements 5, 500 for the purpose of facilitating or causing relevant adjustments (of position, alignment, or orientation) of the support or tracking frame assemblies 25, $\mathbf{525}_R$ to be made.

Advantageously, embodiments of the arrangements described herein seek to avoid the need to use ropes and manual handling practices to correct conveyor belt alignment, and/or to substantially eliminate the need for isolation to free a tracking frame when it becomes seized from product.

Accordingly, embodiments employing the principles of the arrangements described herein may serve to provide one or more of the following advantages as compared to existing systems:

- In existing systems, the reaction arm roller is subject to failure rendering the tracking frame substantially useless;
- In existing systems, tying up a tracking frame with a rope is a common practice to bias the conveyor belt back to centre even when the reaction arms and rollers are fitted and working. This is often done while the conveyor belt is running and is a dangerous practice as the person is in close proximity to rotating equipment;
- In existing systems, tracking frames can be overcome with spilt product seizing the pivoting motion of the frame. It is common practice to manually rock the tracking frame from side to side to free up the tracking frame, this is often done while the conveyor is running again putting people close to rotating equipment. The principles described herein provide a means or arrangement for allowing a user to adjust (which could significant resistance in terms of the load and force needed to make such an adjustment) a movable support or tracking frame assembly from a safe distance away from the moving conveyor belt.

Advantageously, embodiments employing the principles of the arrangements described herein also seek to increase safety for at least the following reasons:

- There is no need for isolation (ceasing operation of the conveyor assembly) for the purposes of making tracking frame assembly adjustments, thereby seeking to remove any perceived pressure there was before to do corrective works while the conveyor belt assembly is online.
- Following from the above, use of embodiments described herein may realise an increase in production and operational availability of conveyor assemblies.
- Less spillage from a conveyor belt assembly means less dropped object hazards and less manual handling hazards associated with cleaning up the spillage.

Embodiments employing the principles of the arrangements described herein may seek to increase production because of at least the following:

- There is no need for equipment downtime to make (manual) adjustments to the tracking frame assembly.
- Correct tracking of the conveyor belt lessens the wear on the conveyor assembly and related structural components.
- Reduced operational disruption. When conveyor belts shut down there is a disruption in both directions, and targets for stockpile capacities during operation is affected. Also, delivery to the plant operation for pit operations is suspended until the reason and time frame is determined, often creating a requirement for trucks and mobile machinery to be redirected to alternative requirements. The end result is a failure to meet production planning key performance indicators (KPI's).

Other variations in sensing the position or movement of the actuator interface assembly (12, 12', 512) may be possible and are to be included within the scope of the principles described herein. For example, in one possible arrangement, the sensor modules comprise one or more proximity switches, image capture devices (such as for example, cameras) arranged so as to capture/record images of the belt. In one form, static or moving images may be captured. In one arrangement, one or more of the static or video images may be processed (by way of, for example, image processing techniques) so as to determine a position and/or movement of the belt. The skilled reader would appreciate that information/data from such image capture devices could be readily communicated to an overarching controller for use in assisting in the monitoring/management of the relevant tracking frame and associated conveyor belt. Of course, such information/data could serve as an input for software or programming instructions directed to conferring autonomous control/operation of the tracking frames (and indeed, the or reach relevant conveyor belt assembly). In this manner, one or more conveyor belt assemblies could be monitored/controlled and/or operated (manually or otherwise) from a centralized location, whether this location be local to one of the conveyor belt assemblies, or remote from all of the conveyor belt assemblies.

It will be appreciated that future patent applications maybe filed in Australia or overseas on the basis of, or claiming priority from, the present application.

It is to be understood that the following claims are provided by way of example only and are not intended to limit the scope of what may be claimed in any such future application. Features may be added to or omitted from the claims at a later date so as to further define or re-define the invention or inventions.

What is claimed:

1. An arrangement for use with a conveyor belt assembly or system having one or more movable support or tracking frame assemblies operable for providing rolling support to a conveyor belt, the arrangement comprising:

a transmission assembly arranged in operable association with a movable support or tracking frame assembly, and configured having respective means or arrangement(s) for receiving a manually provided input force and to supply an output force, an actuator interface assembly configured in operable association with the output force supply means or arrangement so as to be responsive thereto, the actuator interface assembly configured having at least two spaced apart projecting portions extending therefrom so as to be operable in respect of the moveable support or tracking frame assembly, the transmission assembly configured operable for transferring a received input force for supplying an output force via the actuator interface assembly for facilitating selective interaction or engagement between either of said at least two projecting portions and a portion or region of, or provided with, the moveable support or tracking frame assembly for facilitating or causing an adjustment of the position, alignment, or orientation of a portion or region of the moveable support or tracking frame assembly.

2. An arrangement according to claim 1, wherein said at least two projecting portions are arranged so as to be operable for interacting or engaging with respective portions of, or provided with, opposite sides of the moveable support or tracking frame assembly.

3. An arrangement according to claim 1, wherein the spacing of the at least two projecting portions is configured so as to allow the moveable support or tracking frame assembly sufficient freedom to move within a spatial region defined, at least in part, by said at least two projecting portions as required for its normal operation/movement without interference from either of the projecting portions or the actuating interface assembly when the actuator interface assembly is positioned in a neutral condition or state in which no adjustment of the moveable support or tracking frame by the arrangement is undertaken or required.

4. An arrangement according to claim 1, wherein the arrangement is mounted with or relative to an existing conveyor belt assembly so as to be retrofitted and operable at, near, or adjacent an end of the relevant moveable support or tracking frame assembly with which said claimed arrangement is to be operable.

5. An arrangement according to claim 1, wherein the means or arrangement for receiving an input force comprises an input shaft rotatable about its axis of rotation in clockwise, counterclockwise directions of rotation by way of a handle portion operable by a user of the arrangement, wherein the means or arrangement for supplying an output force is provided in the form of an output shaft rotatable about its axis of rotation in clockwise, counterclockwise directions in response to movement of the input shaft.

6. An arrangement according to claim 1, wherein the transmission assembly is provided in the form of a gearbox or worm gearbox.

7. An arrangement according to claim 6, wherein the gearbox or worm gearbox is configured so as to provide a reduction gearbox.

8. An arrangement according to claim 5, wherein the actuator interface assembly is rotatable about an axis about which the output shaft rotates.

9. An arrangement according to claim 5, wherein the arrangement comprises means or device for modifying, conditioning, limiting, or adjusting movement, load, force, or torque transferred to the output shaft by way of the actuator interface assembly, wherein the means or device for modifying, conditioning, limiting or adjusting the movement, load, force, or torque transferred to the output shaft is provided in the form of a clutch or torque limiter module.

10. An arrangement according to claim 1, wherein the arrangement comprises a reaction assembly for provision with a portion or region of the moveable support or tracking frame assembly, the reaction assembly being provided at, near, or adjacent an end of the relevant moveable support or tracking frame assembly so as to be interacted with by the actuator interface assembly so as to bring about an adjustment of the position, alignment, or orientation of a portion or region of the moveable support or tracking frame assembly.

11. An arrangement according to claim 10, wherein each of said at least two projecting portions of the actuator interface assembly extend toward a respective corresponding portion or region of the moveable support or tracking frame assembly or the reaction assembly.

12. An arrangement according to claim 10, wherein each of said at least two projecting portions of the actuator interface assembly comprise a respective contact portion that interacts or engages with a respective corresponding portion of the reaction assembly for making an adjustment of a portion or region of the moveable support or tracking frame assembly, each contact portion configured operable with its respective projecting portion so that when being caused to interact or engage with its respective corresponding portion of the reaction assembly, contact therebetween comprises or involves rolling contact.

13. An arrangement according to claim 1, wherein the transmission assembly comprises a hydraulic actuation assembly comprising one or more fluid circuits each arranged operable for enabling supply of a respective output force.

14. An arrangement according to claim 13, wherein the hydraulic actuation assembly comprises a hydraulic cylinder assembly comprising a hydraulic cylinder ram and piston arrangement operable as part of a hydraulic cylinder unit.

15. An arrangement according to claim 13, wherein the means or arrangement for receiving the input force is provided in the form of a hydraulic axial piston pump unit configured in operable association with a manually operable handle portion such that the hydraulic axial piston pump unit is responsive to an input force received by way of the handle portion.

16. An arrangement according to claim 15, wherein the hydraulic axial piston pump unit is configured in operable association with the hydraulic cylinder assembly by way of first and second fluid circuits, operation of the first fluid circuit configured operable for enabling supply of a first output force, and operation of the second fluid circuit configured operable for enabling supply of a second output force.

17. An arrangement according to claim 16, wherein the hydraulic axial piston pump unit is configured so as to receive an input force from the handle portion for enabling operation of the hydraulic cylinder assembly in the supply of an output force by way of causing a quantity of hydraulic fluid to pass through, under pressure, one of the first, second fluid circuits into a chamber internal of the hydraulic cylinder unit so as to act upon a piston operable within the chamber for enabling movement of the hydraulic cylinder ram.

18. An arrangement according to claim 15, wherein the handle portion, the hydraulic actuation assembly, and the actuator interface assembly (and components thereof, either individually or in combination) is/are configured so as to be retrofittable with the conveyor belt assembly or system for operable use with an existing moveable support or tracking frame assembly thereof.

19. An arrangement according to claim 14, wherein movement of the hydraulic cylinder ram is along an axis of movement that is substantially parallel with but spaced from a central axis of the conveyor belt.

20. An arrangement according to claim 14, wherein the flow of hydraulic fluid through one of the first, second fluid circuits facilitates movement of the hydraulic cylinder ram in a first direction, and the flow of hydraulic fluid through the other of the first, second fluid circuits facilitates movement of the hydraulic cylinder ram in a second direction.

21. An arrangement according to claim 14, wherein supply of an output force for facilitating or causing an adjustment of the position, alignment, or orientation of a portion or region of the moveable support or tracking frame assembly is by way of the actuator interface assembly arranged operable with the hydraulic cylinder assembly so that movement of the hydraulic cylinder ram causes or enables movement of the actuator interface assembly.

22. An arrangement according to claim 1, wherein the actuator interface assembly is provided in rolling contact with a bracket assembly mounted with structure providing rotatable support to the moveable support or tracking frame assembly.

23. An arrangement according to claim 22, wherein rolling contact between said bracket assembly and the actuator interface assembly is provided by way of a plurality of roller wheel units positioned so as to, at least in part, define a path substantially along which the actuator interface assembly is caused to move or operate.

24. A method for facilitating or causing an adjustment to be made to the position, alignment, or orientation of a moveable support or tracking frame assembly of a conveyor belt assembly or system, the method comprising:

operating, or causing to be operated, an embodiment of an arrangement operably configured in accordance with an arrangement according to claim 1 arranged operable with said moveable support or tracking frame assembly for facilitating or causing an adjustment to be made to the position, alignment, or orientation of a portion or region of said moveable support or tracking frame assembly.

25. An arrangement for use with a conveyor belt assembly or system having one or more movable support or tracking frame assemblies operable for providing rolling support to a conveyor belt, the arrangement comprising:

an actuator interface assembly arranged in operable association with a movable support or tracking frame assembly, and configured having at least two spaced apart projecting portions extending therefrom so as to be operable in respect of the moveable support or tracking frame assembly, a transmission assembly configured having a means or arrangement for receiving a manually provided input force and a means or arrangement for supplying an output force, the output force supply means or arrangement operably associated with the actuator interface assembly so that the actuator interface assembly is responsive to the output force supply means or arrangement, the means or arrangement for receiving the manually provided input force and the means or arrangement for supplying an output force configured operable for transferring a received input force for supplying an output force to the actuator interface assembly for facilitating or causing an adjustment of the position, alignment, or orientation of the moveable support or tracking frame assembly by way of selective interaction or engagement by either of said at least two projecting portions with one or more portions of, or provided with, said moveable support or tracking frame assembly.

* * * * *